US010945301B2

(12) United States Patent
Yun et al.

(10) Patent No.: US 10,945,301 B2
(45) Date of Patent: Mar. 9, 2021

(54) METHOD FOR TRANSMITTING AND RECEIVING A SIGNAL BASED ON A CHANNEL AGGREGATION TRANSMISSION IN A WIRELESS LOCAL ACCESS NETWORK SYSTEM AND DEVICES SUPPORTING THE SAME

(71) Applicant: LG ELECTRONICS INC., Seoul (KR)

(72) Inventors: Sunwoong Yun, Seoul (KR); Jinmin Kim, Seoul (KR); Sungjin Park, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 16/175,593

(22) Filed: Oct. 30, 2018

(65) Prior Publication Data

US 2019/0159272 A1 May 23, 2019

Related U.S. Application Data

(60) Provisional application No. 62/588,934, filed on Nov. 21, 2017.

(51) Int. Cl.
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
CPC . H04W 84/12; H04W 72/04; H04W 72/0413; H04W 72/0453; H04W 72/1278; H04W 74/004; H04W 74/006; H04W 76/15; H04B 17/11; H04B 7/04; H04B 7/0634; H04L 1/1664; H04L 1/1861; H04L 27/2613; H04L 27/2666; H04L 5/0007; H04L 5/001
See application file for complete search history.

(56) References Cited

U.S. PATENT DOCUMENTS 8,218,690 B1 * 7/2012 Zhang ................ H04L 25/0204 375/150
2019/0044781 A1 * 2/2019 Lomayev ............ H04L 27/2617

* cited by examiner

*Primary Examiner* — Yemane Mesfin
*Assistant Examiner* — Mon Cheri S Davenport
(74) *Attorney, Agent, or Firm* — Lee, Hong, Degerman, Kang & Waimey PC

(57) ABSTRACT

Disclosed herein are a method for transmitting and receiving a signal based on a channel aggregation transmission in a wireless local access network system and devices supporting the same. Particularly, disclosed herein are a method for transmitting and receiving a signal comprising a training field based on a channel aggregation transmission in a wireless local access network system and operation of devices supporting the same.

17 Claims, 30 Drawing Sheets

| CH 1 | L - STF | L - CE | L - Header | ay Header A | ay STF | ay CE | ay Header B | ay payload |
|---|---|---|---|---|---|---|---|---|
|  | GF-STF | GF-CE |  |  |  |  |  |  |
| CH 2 | L - STF | L - CE | L - Header | ay Header A |  |  |  |  |

(L: legacy, GF: gap filling, ay: 802.11ay)

FIG. 11

| The Sequence $Seq^{1}_{left}$ , 176(k), to be transmitted from left to right, up to down |
|---|
| -1 -j -j +1 +j -j +1 -1 +1 -j -1 +1 -1 +1 -j -1 -1 +j +j +j -1 -1 +1 +j +j -1 -j +j -1 +1 -1 +j +1 +1 -1 +1 -j -1 -1 +j +j +j -1 -<br>1 +j -1 -1 -j +1 -1 -j +j -j -1 +j -j +j -j -1 +j +j +1 +1 +1 +j +j +j -1 -1 -j +1 -1 -j +j -j -1 +j +j -j +j +1 -j -j -1 -1 -1 -j -j +j<br>-1 -1 -j +1 -1 -j +j -j -1 +j -j +j -j -1 +j +j +1 +1 +1 +j +j -j +1 +1 +j -1 +1 +j -j +j +1 -j -j +j -j -1 +j +j +1 +1 +1 +j +j -1<br>-j -j +1 +j -j +1 -1 +1 -j -1 +1 -1 +1 -j -1 -1 +j +j +j -1 -1 -1 -j -j +1 +j -j +1 -1 +1 -j -1 -1 +1 -1 +j +1 +1 -j -j -j +1 +1 |
| The Sequence $Seq^{2}_{left}$ , 176(k), to be transmitted from left to right, up to down |
| +1 -j -j -1 +j -j -1 +1 -1 -j +1 +1 -j -j -1 +j -j -1 +1 -1 -j +1 +j +1 +1 -j -1 +1 -j +j -j +1 +j -j -1 -1 +j +1 -1 +j -j +j -1 -j<br>+1 -1 +1 +j -1 -1 -j -j -j -1 -1 +1 -1 +1 +j -1 -1 -j -j -j -1 -1 +j -j +j -1 -j -j +1 +1 +1 -j -j -j +j -j +1 +j +j -1 -1 -1 +j +j +j<br>+1 +1 -j -1 +1 -j +j -j +1 +j -j -1 -1 +j +1 -1 +j -j +j -1 -j -1 +j +j +1 -j +j +1 -1 +1 +j -1 -1 +j +j +1 -j +j +1 -1 +1 +j -1 -<br>j +j -j +1 +j +j -1 -1 -1 +j +j +j -j +j -1 -j -j +1 +1 +1 -j -j +1 -1 +1 +j -1 -1 -j -j -j -1 -1 +1 -1 +1 +j -1 -1 -j -j -j -1 -1 |
| The Sequence $Seq^{3}_{left}$ , 176(k), to be transmitted from left to right, up to down |
| +1 +1 +j +j +j +1 +1 -j -1 +1 -1 +1 +1 +j +j +j +1 +1 -j -1 +1 -1 +j +j -1 -1 -1 +j +j +1 -j +j -j -j -j +1 +1 +1 -j -j -1 +j -j<br>+j +j +j -1 -1 -1 +j +j +1 -j +j -j +j +j -1 -1 -1 +j +j +1 -j +j -j +1 +1 +j +j +j +1 +1 -j -1 +1 -1 -1 -1 -j -j -j -1 -1 +j +1 -1<br>+1 -j -1 +j -j +j -1 +1 +j -1 -1 -j +j +1 -j +j -j +1 -1 -j +1 +1 +j +1 -j -1 +1 -1 -j +j -1 -j -j +1 +1 -j -1 +1 -1 -j +j -1 -j -j<br>+1 +1 -j -1 +1 -1 -j +j -1 -j -j +1 -1 +j +1 -1 +1 +j -j +1 +j +j -1 -j -1 +j -j +j -1 +1 +j -1 -1 -j -j -1 +j -j +j -1 +1 +j -1 -1 -j |
| The Sequence $Seq^{4}_{left}$ , 176(k), to be transmitted from left to right, up to down |
| -1 +j +j +1 -j +j +1 -1 +1 +j -1 -j -1 -1 +j +1 -1 +j -j +j -1 -j +j -j +j -1 -j -j +1 +1 +1 -j -j -1 +1 -1 -j +1 +1 +j +j +j +1 +1<br>-1 +j +j +1 -j +j +1 -1 +1 +j -1 -j -1 -1 +j +1 -1 +j -j +j -1 -j -j +j -j +1 +j +j -1 -1 -1 +j +j +1 -1 +1 +j -1 -1 -j -j -j -1 -1 +1<br>-j -j -1 +j -j -1 +1 -1 -j +1 -j -1 -1 +j +1 -1 +j -j +j -1 -j -j +j -j +1 +j +j -1 -1 -1 +j +j -1 +1 -1 -j +1 +1 +j +j +j +1 +1 -1 +j<br>+j +1 -j +j +1 -1 +1 +j -1 +j +1 +1 -j -1 +1 -j +j -j +1 +j -j +j -j +1 +j +j -1 -1 -1 +j +j -1 +1 -1 -j +1 +1 +j +j +j +1 +1 |
| The Sequence $Seq^{5}_{left}$ , 176(k), to be transmitted from left to right, up to down |
| +1 -1 +1 -j -1 -1 +j +j +j -1 -1 +1 +j +j -1 -j +j -1 +1 -1 +j +1 +1 -1 +1 -j -1 -1 +j +j +j -1 -1 +1 +j +j -1 -j +j -1 +1 -1 +j<br>+1 +j -j +j +1 -j -j -1 -1 -1 -j -j +j -1 -1 -j +1 -1 -j +j -j -1 +j -j +j -j -1 +j +j +1 +1 +1 +j +j -j +1 +1 +j -1 +1 +j -j +j +1 -<br>j -j +j -j -1 +j +j +1 +1 +1 +j +j +j -1 -1 -j +1 -1 -j +j -j -1 +j +j -j +j +1 -j -j -1 -1 -1 -j -j -j +1 +1 +j -1 +1 +j -j +j +1 -j<br>+1 -1 +1 -j -1 -1 +j +j +j -1 -1 -1 -j -j +1 +j -j +1 -1 +1 -j -1 +1 -1 +1 -j -1 -1 +j +j +j -1 -1 -1 -j -j +1 +j -j +1 -1 +1 -j -1 |
| The Sequence $Seq^{6}_{left}$ , 176(k), to be transmitted from left to right, up to down |
| +1 +j -1 +1 -1 +j -j -1 +j +j +1 -1 -j +1 -1 +1 -j +j +1 -j -j -1 +j -1 -j +j -j -1 +1 -j -1 -1 +j -j +1 +j -j +j +1 -1 +j +1 +1 -j<br>+j +j +1 +1 +1 +j +j -1 -j +j -j +j +j +1 +1 +1 +j +j -1 -j +j -j -1 -1 +j +j +j -1 -1 -j +1 -1 +1 -1 -1 +j +j +j -1 -1 -j +1 -1<br>+1 +j -1 -j +j -j -1 +1 -j -1 -1 +j +j -1 -j +j -j -1 +1 -j -1 -1 +j +1 +j -1 +1 -1 +j -j -1 +j +j +1 +1 +j -1 +1 -1 +j -j -1 +j +j<br>+1 -1 -1 +j +j +j -1 -1 -j +1 -1 +1 +1 +1 -j -j -j +1 +1 +j -1 +1 -1 +j +j +1 +1 +1 +j +j -1 -j +j -j -j -j -1 -1 -1 -j -j +1 +j -j<br>+j |
| The Sequence $Seq^{7}_{left}$ , 176(k), to be transmitted from left to right, up to down |
| -j -1 +j -j +j -1 +1 +j -1 -1 -j +j +j -1 -1 -1 +j +j +1 -j +j -j +1 -j -1 +1 -1 -j +j -1 -j -j +1 -1 -1 -j -j -j -1 -1 +j +1 -1 +1 +1<br>-j -1 +1 -1 -j +j -1 -j -j +1 -1 -1 -j -j -j -1 -1 +j +1 -1 +1 -j -1 +j -j +j -1 +1 +j -1 -1 -j +j +j -1 -1 -1 +j +j +1 -j +j -j +1 -j -<br>1 +1 -1 -j +j -1 -j -j +1 +1 +1 +j +j +j +1 +1 -j -1 +1 -1 -j -1 +j -j +j -1 +1 +j -1 -1 -j -j -j +1 +1 +1 -j -j -1 +j -j +j +j +1 -<br>j +j -j +1 -1 -j +1 +1 +j +j +j -1 -1 -1 +j +j +1 -j +j -j -1 +j +1 -1 +1 +j -j +1 +j +j -1 -1 -1 -j -j -j -1 -1 +j +1 -1 +1 |
| The Sequence $Seq^{8}_{left}$ , 176(k), to be transmitted from left to right, up to down |
| +1 -1 +1 +j -1 -1 -j -j -j -1 -1 +j -j +j -1 -j -j +1 +1 +1 -j -j -j +j -j +1 +j +j -1 -1 -1 +j +j +1 -1 +1 +j -1 -1 -j -j -j -1 -1 +1<br>-1 +1 +j -1 -1 -j -j -j -1 -1 -j +j -j +1 +j +j -1 -1 -1 +j +j +j -j +j -1 -j -j +1 +1 +1 -j -j +1 -1 +1 +j -1 -1 -j -j -j -1 -1 +j +1<br>+1 -j -1 +1 -j +j -j +1 +j -1 +j +j +1 -j +j +1 -1 +1 +j -1 -1 +j +j +1 -j +j +1 -1 +1 +j -1 -j -1 -1 +j +1 -1 +j -j +j -1 -j +j<br>+1 +1 -j -1 +1 -j +j -j +1 +j +1 -j -j -1 +j -j -1 +1 -1 -j +1 +1 -j -j -1 +j -j -1 +1 -1 -j +1 -j -1 -1 +j +1 -1 +j -j +j -1 -j |

FIG. 12

The Sequence $Seq^{1}_{right}$, 176(k), to be transmitted from left to right, up to down -1 -j -j +1 +j -j +1 -1 +1 -j -1 +1 -1 +1 -j -1 -1 +j +j +j -1 -1 +1 +j +j -1 -j +j -1 +1 -1 +j +1 +1 -1 +1 -j -1 -1 +j +j +j -1 -
1 +j -1 -1 -j +1 -1 -j +j -j -1 +j -j +j -j -1 +j +j +1 +1 +1 +j +j +j -1 -1 -j +1 -1 -j +j -j -1 +j +j -j +j +1 -j -j -1 -1 -1 -j -j -j
+1 +1 +j -1 +1 +j -j +j +1 -j +j -j +j +1 -j -j -1 -1 -1 -j -j +j -1 -1 -j +1 -1 -j +j -j -1 +j +j -j +j +1 -j -j -1 -1 -1 -j -j +1 +j
+j -1 -j +j -1 +1 -1 +j +1 -1 +1 -1 +j +1 +1 -j -j -j +1 +1 +1 +j +j -1 -j +j -1 +1 -1 +j +1 +1 -1 +1 -j -1 -1 +j +j +j -1 -1

The Sequence $Seq^{2}_{right}$, 176(k), to be transmitted from left to right, up to down -1 +j +j +1 -j +j +1 -1 +1 +j -1 -1 +j +j +1 -j +j +1 -1 +1 +j -1 +j +1 +1 -j -1 +1 -j +j -j +1 +j -j -1 -1 +j +1 -1 +j -j +j -1
-j -1 +1 -1 -j +1 +1 +j +j +j +1 +1 -1 +1 -1 -j +1 +1 +j +j +j +1 +1 +j -j +j -1 -j -j +1 +1 +1 -j -j -j +j -j +1 +j +j -1 -1 -1
+j +j -j -1 -1 +j +1 -1 +j -j +j -1 -j +j +1 +1 -j -1 +1 -j +j -j +1 +j -1 +j +j +1 -j +j +1 -1 +1 +j -1 -1 +j +j +1 -j +j +1 -1
+1 +j -1 +j -j +j -1 -j -j +1 +1 +1 -j -j -j +j -j +1 +j +j -1 -1 -1 +j +j +1 -1 +1 +j -1 -1 -j -j -j -1 -1 +1 -1 +1 +j -1 -1 -j -j -j
-1 -1

The Sequence $Seq^{3}_{right}$, 176(k), to be transmitted from left to right, up to down -1 -1 -j -j -j -1 -1 +j +1 -1 +1 -1 -1 -j -j -j -1 -1 +j +1 -1 +1 -j -j +1 +1 +1 -j -j -1 +j -j +j +j +j -1 -1 -1 +j +j +1 -j +j -j +j
+j -1 -1 -1 +j +j +1 -j +j -j +j +j -1 -1 -1 +j +j +1 -j +j -j +1 +1 +j +j +j +1 +1 -j -1 +1 -1 -1 -1 -j -j -j -1 -1 +j +1 -1 +1 +j
+1 -j +j -j +1 -1 -j +1 +1 +j -j -1 +j -j +j -1 +1 +j -1 -1 -j -1 +j +1 -1 +1 +j -j +1 +j +j -1 -1 +j +1 -1 +1 +j -j +1 +j +j -1
+1 -j -1 +1 -1 -j +j -1 -j -j +1 -1 +j +1 -1 +1 +j -j +1 +j +j -1 -j -1 +j -j +j -1 +1 +j -1 -1 -j -j -1 +j -j +j -1 +1 +j -1 -1 -j The Sequence $Seq^{4}_{right}$, 176(k), to be transmitted from left to right, up to down +1 -j -j -1 +j -j -1 +1 -1 -j +1 -j -1 -1 +j +1 -1 +j -j +j -1 -j -j +j -j +1 +j +j -1 -1 -1 +j +j -1 +1 -1 -j +1 +1 +j +j +j +1 +1
+1 -j -j -1 +j -j -1 +1 -1 -j +1 -j -1 -1 +j +1 -1 +j -j +j -1 -j +j -j +j -1 -j -j +1 +1 +1 -j -j +1 -1 +1 +j -1 -1 -j -j -j -1 -1 -1
+j +j +1 -j +j +1 -1 +1 +j -1 -j -1 -1 +j +1 -1 +j -j +j -1 -j +j -j +j -1 -j -j +1 +1 +1 -j -j -1 +1 -1 -j +1 +1 +j +j +j +1 +1
+1 -j -j -1 +j -j -1 +1 -1 -j +1 +j +1 +1 -j -1 +1 -j +j -j +1 +j +j -j +j -1 -j -j +1 +1 +1 -j -j -1 +1 -1 -j +1 +1 +j +j +j +1
+1

The Sequence $Seq^{5}_{right}$, 176(k), to be transmitted from left to right, up to down -1 +1 -1 +j +1 +1 -j -j -j +1 +1 -1 -j -j +1 +j -j +1 -1 +1 -j -1 -1 +1 -1 +j +1 +1 -j -j -j +1 +1 -1 -j -j +1 +j -j +1 -1 +1 -j -
1 +j -j +j +1 -j -j -1 -1 -1 -j -j +j -1 -1 -j +1 -1 -j +j -j -1 +j -j +j -j -1 +j +j +1 +1 +1 +j +j -j +1 +1 +j -1 +1 +j -j +j +1 -j
+j -j +j +1 -j -j -1 -1 -1 -j -j -j +1 +1 +j -1 +1 +j -j +j +1 -j -j +j -j -1 +j +j +1 +1 +1 +j +j +j -1 -1 -j +1 -1 -j +j -j -1 +j
+1 -1 +1 -j -1 -1 +j +j +j -1 -1 -1 -j -j +1 +j -j +1 -1 +1 -j -1 +1 -1 +1 -j -1 -1 +j +j +j -1 -1 -1 -j -j +1 +j -j +1 -1 +1 -j -1

The Sequence $Seq^{6}_{right}$, 176(k), to be transmitted from left to right, up to down -1 -j +1 -1 +1 -j +j +1 -j -j -1 +1 +j -1 +1 -1 +j -j -1 +j +j +1 +j -1 -j +j -j -1 +1 -j -1 -1 +j -j +1 +j -j +j +1 -1 +j +1 +1 -j
-j -j -1 -1 -1 -j -j +1 +j -j +j -j -j -1 -1 -1 -j -j +1 +j -j +j -1 -1 +j +j +j -1 -1 -j +1 -1 +1 -1 -1 +j +j +j -1 -1 -j +1 -1 +1 -j
+1 +j -j +j +1 -1 +j +1 +1 -j -j +1 +j -j +j +1 -1 +j +1 +1 -j +1 +j -1 +1 -1 +j -j -1 +j +j +1 +1 +j -1 +1 -1 +j -j -1 +j +j
+1 +1 +1 -j -j -j +1 +1 +j -1 +1 -1 -1 -1 +j +j +j -1 -1 -j +1 -1 +1 +j +j +1 +1 +1 +j +j -1 -j +j -j -j -j -1 -1 -1 -j -j +1 +j -j
+j The Sequence $Seq^{7}_{right}$, 176(k), to be transmitted from left to right, up to down +j +1 -j +j -j +1 -1 -j +1 +1 +j -j -j +1 +1 +1 -j -j -1 +j -j +j -1 +j +1 -1 +1 +j -j +1 +j +j -1 +1 +1 +j +j +j +1 +1 -j -1 +1
-1 +1 -j -1 +1 -1 -j +j -1 -j -j +1 -1 -1 -j -j -j -1 -1 +j +1 -1 +1 -j -1 +j -j +j -1 +1 +j -1 -1 -j +j +j -1 -1 -1 +j +j +1 -j +j -j
-1 +j +1 -1 +1 +j -j +1 +j +j -1 -1 -1 -j -j -j -1 -1 +j +1 -1 +1 +j +1 -j +j -j +1 -1 -j +1 +1 +j +j +j -1 -1 -1 +j +j +1 -j +j -j
+j +1 -j +j -j +1 -1 -j +1 +1 +j +j +j -1 -1 -1 +j +j +1 -j +j -j -1 +j +1 -1 +1 +j -j +1 +j +j -1 -1 -1 -j -j -j -1 -1 +j +1 -1 +1

The Sequence $Seq^{8}_{right}$, 176(k), to be transmitted from left to right, up to down -1 +1 -1 -j +1 +1 +j +j +j +1 +1 +j -j +j -1 -j -j +1 +1 +1 -j -j +j -j +j -1 -j -j +1 +1 +1 -j -j +1 -1 +1 +j -1 -1 -j -j -j -1 -1 -
1 +1 -1 -j +1 +1 +j +j +j +1 +1 -j +j -j +1 +j +j -1 -1 -1 +j +j -j +j -j +1 +j +j -1 -1 -1 +j +j +1 -1 +1 +j -1 -1 -j -j -j -1 -1
-j -1 -1 +j +1 -1 +j -j +j -1 -j -1 +j +j +1 -j +j +1 -1 +1 +j -1 +1 -j -j -1 +j -j -1 +1 -1 -j +1 -j -1 -1 +j +1 -1 +j -j +j -1 -j -j
-1 -1 +j +1 -1 +j -j +j -1 -j +1 -j -j -1 +j -j -1 +1 -1 -j +1 -1 +j +j +1 -j +j +1 -1 +1 +j -1 -j -1 -1 +j +1 -1 +j -j +j -1 -j

FIG. 13

The Sequence $Seq^{1}_{left}$ , 385(k), to be transmitted from left to right, up to down -1 -1 +j -1 +1 +1 -1 +j +1 +j +j +j -j -j -1 -j +j +j -j +1 -j +1 +1 +1 -1 -1 +j -1 +1 +1 -1 +j +1 +j +j +j -j +j +1 +j -j -j +j -
1 +j -1 -1 -1 +1 +1 -j +1 -1 -1 +1 -j -1 -j -j -j +j +j +1 +j -j -j +j -1 +j -1 -1 -1 +1 -1 +j -1 +1 +1 -1 +j +1 +j +j +j -j +j +1
+j -j -j +j -1 +j -1 -1 -1 +1 -1 +j -1 +1 +1 -1 +j +1 +j +j +j -j -j -1 -j +j +j -j +1 -j +1 +1 +1 -1 -1 +j -1 +1 +1 -1 +j +1 +j
+j +j -j +j +1 +j -j -j +j -1 +j -1 -1 -1 +1 -1 +j -1 +1 +1 -1 +j +1 +j +j +j -j -j -1 -j +j +j -j +1 -j +1 +1 +1 -1 +1 -j +1 -1 -
1 +1 -j -1 -j -j -j +j -j -1 -j +j +j -j +1 -j +1 +1 +1 -1 -j -1 -j +j +j -j -1 +j -1 -1 -1 +1 +1 -j +1 -1 -1 +1 +j +1 +j +j +j -j -j
-1 -j +j +j -j -1 +j -1 -1 -1 +1 -1 +j -1 +1 +1 -1 -j -1 -j -j -j +j +j +1 +j -j -j +j +1 -j +1 +1 +1 -1 -1 +j -1 +1 +1 -1 -j -1 -j -
j -j +j -j -1 -j +j +j -j -1 +j -1 -1 -1 +1 -1 +j -1 +1 +1 -1 -j -1 -j -j -j +j +j +1 +j -j -j +j +1 -j +1 +1 +1 -1 -1 +j -1 +1 +1 -1
-j -1 -j -j -j +j +j +1 +j -j -j +j +1 -j +1 +1 +1 -1 +1 -j +1 -1 -1 +1 +j +1 +j +j +j -j +j +1 +j -j -j +j +1 -j +1 +1 +1 -1 -1
+j -1 +1 +1 -1 -j -1 -j -j -j +j -j -1 -j +j +j -j -1 +j -1 -1 -1 +1 -1 +j -1 +1 +1 -1 -j -1 -j -j -j +j The Sequence $Seq^{2}_{left}$ , 385(k), to be transmitted from left to right, up to down -j +1 -1 -1 -1 +j -1 -j +j +j +j +1 +j +j -j -j +j +1 +j -1 +1 +1 -1 +j -1 -1 +1 +1 +1 -j +1 +j -j -j -j -1 -j -j +j +j -j -1 -j +1 -
1 -1 +1 -j +1 +1 -1 -1 -1 +j -1 -j +j +j +j +1 +j +j -j -j +j +1 +j -1 +1 +1 -1 +j -1 +1 -1 -1 -1 +j -1 -j +j +j +j +1 +j +j -j -j
+j +1 +j -1 +1 +1 -1 +j -1 +1 -1 -1 -1 +j -1 -j +j +j +j +1 +j +j -j -j +j +1 +j -1 +1 +1 -1 +j -1 +1 -1 -1 -1 +j -1 -j +j +j +j
+1 +j +j -j -j +j +1 +j -1 +1 +1 -1 +j -1 +1 -1 -1 -1 +j -1 -j +j +j +j +1 +j +j -j -j +j +1 +j -1 +1 +1 -1 +j -1 -1 +1 +1 +1 -j
+1 +j -j -j -j -1 -j -j +j +j -j -1 -j +1 -1 -1 +1 -j +1 +j -j -j -j -1 -j -1 +1 +1 +1 -j +1 -1 +1 +1 -1 +j -1 +j -j -j +j +1 +j -j +j
+j +j +1 +j +1 -1 -1 -1 +j -1 +1 -1 -1 +1 -j +1 -j +j +j -j -1 -j +j -j -j -j -1 -j -1 +1 +1 +1 -j +1 -1 +1 +1 -1 +j -1 +j -j -j +j
+1 +j +j -j -j -j -1 -j -1 +1 +1 +1 -j +1 -1 +1 +1 -1 +j -1 +j -j -j +j +1 +j -j +j +j +j +1 +j +1 -1 -1 -1 +j -1 +1 -1 -1 +1 -j
+1 -j +j +j -j -1 -j -j +j +j +j +1 +j +1 -1 -1 -1 +j -1 +1 -1 -1 +1 -j +1 -j +j +j -j -1 -j -j +j +j +j +1 +j +1 -1 -1 -1 +j -1 +1
-1 -1 +1 -j +1 -j +j +j -j -1 -j +j -j -j -j -1 -j -1 +1 +1 +1 -j +1 -1 +1 +1 -1 +j -1 +j -j -j +j +1 +j The Sequence $Seq^{3}_{left}$ , 385(k), to be transmitted from left to right, up to down +1 -1 +j -1 +1 -j +1 +j +1 +j -j -1 -j +1 -j +1 -1 +j -1 +j +1 +j -j -1 -j +1 -j +1 -1 +j -1 +j +1 +j -j -1 -j -1 +j -1 +1 -j +1
+j +1 +j -j -1 -j +1 +1 -1 -1 -1 +1 -j -j +j +j +j -j +1 +1 -1 -1 -1 +1 +j +j -j -j -j +j -1 -1 +1 +1 +1 -1 -j -j +j +j +j -j -1 -1
+1 +1 +1 -1 +j +j -j -j -j +j +j +1 +j -j -1 -j +1 -j +1 -1 +j -1 -j -1 -j +j +1 +j +1 -j +1 -1 +j -1 +j +1 +j -j -1 -j -1 +j -1 +1
-j +1 -j -1 -j +j +1 +j -1 +j -1 +1 -j +1 -j -j +j +j +j -j -1 -1 +1 +1 +1 -1 -j -j +j +j +j -j +1 +1 -1 -1 -1 +1 -j -j +j +j +j -j
+1 +1 -1 -1 -1 +1 -j -j +j +j +j -j -1 -1 +1 +1 +1 -1 +j +1 +j +j +1 +j +1 -j +1 +1 -j +1 -j -1 -j -j -1 -j +1 -j +1 +1 -j +1 -j -
1 -j -j -1 -j +1 -j +1 +1 -j +1 +j +1 +j +j +1 +j +1 -j +1 +1 -j +1 -j -j +j -j -j +j -1 -1 +1 -1 -1 +1 -j -j +j -j -j +j +1 +1 -1
+1 +1 -1 +j +j -j +j +j -j -1 -1 +1 -1 -1 +1 +j +j -j +j +j -j +1 +1 -1 +1 +1 -1 -1 +j -1 -1 +j -1 +j +1 +j +j +1 +j +1 -j +1
+1 -j +1 +j +1 +j +j +1 +j -1 +j -1 -1 +j -1 -j -1 -j -j -1 -j +1 -j +1 +1 -j +1 -j -1 -j -j -1 -j +1 +1 -1 +1 +1 -1 -j -j +j -j -j +j
+1 +1 -1 +1 +1 -1 +j +j -j +j +j -j +1 +1 -1 +1 +1 -1 +j +j -j +j +j -j +1 +1 -1 +1 +1 -1 -j -j +j -j -j +j The Sequence $Seq^{4}_{left}$ , 385(k), to be transmitted from left to right, up to down -1 -1 +j -1 +j +1 +j +1 +1 -1 -j -j +j -j -1 -j +1 -j +1 +j +j -j -1 -1 +1 +1 -j +1 -j -1 -j -1 -1 +1 +j +j -j +j +1 +j -1 +j -1 -j -
j +j +1 +1 -1 -j -1 -j -1 +j -1 -j -j +j -1 -1 +1 +1 -j +1 +j +1 +j +1 +1 -1 +j +j -j +j +1 +j +1 -j +1 +j +j -j +1 +1 -1 -1 +j
-1 -j -1 -j -1 -1 +1 -j -j +j -1 +j -1 +j +1 +j +1 +1 -1 -j -j +j -j -1 -j +1 -j +1 +j +j -j -1 -1 +1 -1 +j -1 +j +1 +j +1 +1 -1 -j
-j +j -j -1 -j +1 -j +1 +j +j -j -1 -1 +1 +j +1 +j +1 -j +1 +j +j -j +1 +1 -1 -1 +j -1 -j -1 -j -1 -1 +1 -j -j +j +j +1 +j +1 -j +1
+j +j -j +1 +1 -1 -1 +j -1 -j -1 -j -1 -1 +1 -j -j +j +j +1 +j -1 +j -1 -j -j +j +1 +1 -1 -1 +j -1 +j +1 +j +1 +1 -1 -j -j +j +j +1
+j -1 +j -1 -j -j +j +1 +1 -1 -1 +j -1 +j +1 +j +1 +1 -1 -j -j +j -1 +j -1 -j -1 -j -1 -1 +1 -j -j +j -j -1 -j -1 +j -1 -j -j +j -1 -1
+1 -1 +j -1 -j -1 -j -1 -1 +1 -j -j +j -j -1 -j -1 +j -1 -j -j +j -1 -1 +1 +j +1 +j -1 +j -1 -j -j +j +1 +1 -1 -1 +j -1 +j +1 +j +1 +1
-1 -j -j +j -j -1 -j +1 -j +1 +j +j -j -1 -1 +1 +1 -j +1 -j -1 -j -1 -1 +1 +j +j -j +1 -j +1 +j +1 +j +1 +1 -1 +j +j -j +j +1 +j +1
-j +1 +j +j -j +1 +1 -1 -1 +j -1 -j -1 -j -1 -1 +1 -j -j +j -j -1 -j -1 +j -1 -j -j +j -1 -1 +1

FIG. 14

The Sequence $Seq^{5}_{left}$, 385(k), to be transmitted from left to right, up to down -j -1 +1 +1 -1 +1 +1 +j -j -j +j -j -j -j +j +j +j -j -j -1 +1 +1 +1 -1 -1 -1 +1 +1 +1 -1 -1 +j -j -j -j +j +j -j +j +j -j +j +j -1 +1
+1 -1 +1 +1 +1 -1 -1 +1 -1 -1 +j -j -j +j -j -j +j -j -j -j +j +j -1 +1 +1 +1 -1 -1 +1 -1 -1 -1 +1 +1 +j -j -j -j +j +j +j -j -j +j
-j -j -1 +1 +1 -1 +1 +1 -j +j +j -j +j +j +1 -1 -1 +1 -1 -1 +1 -1 -1 -1 +1 +1 +j -j -j -j +j +j +j -j -j -j +j +j -1 +1 +1 +1 -1 -1
-1 +1 +1 -1 +1 +1 -j +j +j -j +j +j +j -j -j +j -j -j +1 -1 -1 +1 -1 -1 -1 +1 +1 +1 -1 -1 +j -j -j -j +j +j -j +j +j +j -j -j -1 +1 +1
+1 -1 -1 +1 -1 -1 +1 -1 -1 -j +j +j -j +j +j +1 -j +1 +1 -j +1 -j -1 -j -j -1 -j +j +1 +j -j -1 -j +1 -j +1 -1 +j -1 +1 -j
+1 -1 +j -1 -j -1 -j +j +1 +j +j +1 +j +j +1 +j +1 -j +1 +1 -j +1 +1 -j +1 +1 -j +1 +j +1 +j +j +1 +j +j +1 +j -j -1 -j -1 +j -1
+1 -j +1 +1 -j +1 -1 +j -1 +j +1 +j -j -1 -j +j +1 +j +j +1 +j -1 +j -1 -1 +j -1 +j +1 +j +j +1 +j -1 +j -1 -1 +j -1 -1 +j -1 +1
-j +1 -j -1 -j +j +1 +j -j -1 -j +j +1 +j +1 -j +1 -1 +j -1 +1 -j +1 +1 -j +1 +j +1 +j +j +1 +j +j +1 +j +j +1 +j +1 -j +1 +1 -j
+1 -1 +j -1 +1 -j +1 +j +1 +j -j -1 -j -j -1 -j +j +1 +j -1 +j -1 +1 -j +1 +1 -j +1 +1 -j +1 -j -1 -j -j -1 -j The Sequence $Seq^{6}_{left}$, 385(k), to be transmitted from left to right, up to down +j -1 +j -1 +j +1 +j -1 +j -1 +j +1 +j -j -1 -j -1 +j -1 -j -1 -j -1 +j -1 -1 +j -1 -j -1 -j -1 +j -1 -j -1 -j +j +1 +j -1 +j -1 +j +1
+j -1 +j -1 -j -1 -j -1 +j -1 +j +1 +j +1 -j +1 +1 -j +1 -j -1 -j -1 +j -1 +j +1 +j -j -1 -j +1 -j +1 +j +1 +j -1 +j -1 -1 +j -1 -j -1
-j +1 -j +1 +j +1 +j -j +j +j -1 +1 +1 -j +j +j -1 +1 +1 +1 -1 -1 -j +j +j +1 -1 -1 -j +j +j -j +j +j +1 -1 -1 -j +j +j +1 -1 -1
-1 +1 +1 -j +j +j -1 +1 +1 -j +j +j -1 +1 +1 +j -j -j +1 -1 -1 -j +j +j -j +j +j -1 +1 +1 +j -j -j +1 -1 -1 -1 +1 +1 -j +j +j +1 -1
-1 +j -j -j +j -j -j -1 +1 +1 -j +j +j +1 -1 -1 +1 -j +1 +j +1 +j -1 +j -1 -j -1 -j +j +1 +j -1 +j -1 -j -1 -j +1 -j +1 +1 -j +1 -j -1
-j -1 +j -1 +j +1 +j -j -1 -j -1 +j -1 +j +1 +j +1 -j +1 +j +1 +j -1 +j -1 +j +1 +j -1 +j -1 -1 +j -1 -j -1 -j -1 +j -1 -j -1 -j +j
+1 +j +1 -j +1 +j +1 +j +1 -j +1 +1 -j +1 -j -1 -j +1 -j +1 -j -1 -j +j -j -j -1 +1 +1 -j +j +j +1 -1 -1 -1 +1 +1 -j +j +j +1 -1
-1 +j -j -j +j -j -j +1 -1 -1 -j +j +j -1 +1 +1 +1 -1 -1 -j +j +j -1 +1 +1 +j -j -j +1 -1 -1 +j -j -j +1 -1 -1 +j -j -j +j -j -j -1 +1
+1 +j -j -j -1 +1 +1 +1 -1 -1 -j +j +j +1 -1 -1 -j +j +j -j +j +j -1 +1 +1 -j +j +j -1 +1 +1

The Sequence $Seq^{7}_{left}$, 385(k), to be transmitted from left to right, up to down -1 +1 -1 -1 +j -j -j +1 -1 -1 +j -j -j +1 -1 -1 -j +j +j +1 -1 -1 -j +j +j +j +1 +j -1 +j -1 +j +1 +j -1 +j -1 +j +1 +j +1 -j +1
+j +1 +j +1 -j +1 +j -j -j -1 +1 +1 -j +j +j +1 -1 -1 +j -j -j +1 -1 -1 -j +j +j -1 +1 +1 +1 -j +1 +j +1 +j -1 +j -1 -j -1 -j +1 -
j +1 -j -1 -j -1 +j -1 +j +1 +j -1 +1 +1 +j -j -j -1 +1 +1 +j -j -j -1 +1 +1 -j +j +j -1 +1 +1 -j +j +j -j -1 -j -1 +j -1 -j -1 -j -1
+j -1 -j -1 -j +1 -j +1 -j -1 -j +1 -j +1 -j +j +j -1 +1 +1 +j -j -j +1 -1 -1 -j +j +j +1 -1 -1 +j -j -j -1 +1 +1 -1 +j -1 +j +1 +j
+1 -j +1 -j -1 -j -1 +j -1 -j -1 -j +1 -j +1 +j +1 +j +j -j -j -1 +1 +1 -j +j +j +1 -1 -1 -j +j +j -1 +1 +1 +j -j -j +1 -1 -1 -1 +j
-1 -j -1 -j +1 -j +1 +j +1 +j +1 -j +1 -j -1 -j -1 +j -1 +j +1 +j -1 +1 +1 -j +j +j -1 +1 +1 -j +j +j +1 -1 -1 -j +j +j +1 -1 -1
-j +j +j +j +1 +j -1 +j -1 +j +1 +j -1 +j -1 -j -1 -j -1 +j -1 -j -1 -j -1 +j -1 -j +j +j -1 +1 +1 +j -j -j +1 -1 -1 +j -j -j -1 +1 +1
-j +j +j +1 -1 -1 +1 -j +1 -j -1 -j -1 +j -1 +j +1 +j -1 +j -1 -j -1 -j +1 -j +1 +j +1 +j +1 -1 -1 -j +j +j +1 -1 -1 -j +j +j -1 +1
+1 -j +j +j -1 +1 +1 -j +j +j -j -1 -j -1 +j -1 -j -1 -j -1 +j -1 +j +1 +j -1 +j -1 +j +1 +j -1 +j -1

The Sequence $Seq^{8}_{left}$, 385(k), to be transmitted from left to right, up to down +1 +1 -j +1 -j -1 -j +1 -j +1 +j +1 +j -1 +1 +1 +j -j -j -1 +1 +1 -j +j +j -1 +j -1 -j -1 -j -1 +j -1 +j +1 +j +1 -1 -1 +j -j -j +1
-1 -1 -j +j +j -1 +j -1 +j +1 +j -1 +j -1 -j -1 -j +1 -1 -1 -j +j +j +1 -1 -1 +j -j -j +1 -j +1 +j +1 +j +1 -j +1 -j -1 -j -1 +1 +1
-j +j +j -1 +1 +1 +j -j -j -1 +j -1 +j +1 +j +1 -j +1 +j +1 +j -1 +1 +1 +j -j -j +1 -1 -1 +j -j -j +1 -j +1 +j +1 +j -1 +j -1 +j +1
+j +1 -1 -1 +j -j -j -1 +1 +1 +j -j -j +1 -j +1 -j -1 -j -1 +j -1 -j -1 -j +1 -1 -1 -j +j +j -1 +1 +1 -j +j +j -1 +j -1 -j -1 -j +1 -j
+1 -j -1 -j -1 +1 +1 -j +j +j +1 -1 -1 -j +j +j -j -1 -j -1 +j -1 -j -1 -j +1 -j +1 +j -j -j +1 -1 -1 +j -j -j -1 +1 +1 -j -1 -j +1 -j
+1 -j -1 -j -1 +j -1 +j -j -j -1 +1 +1 +j -j -j +1 -1 -1 -j -1 -j -1 +j -1 -j -1 -j +1 -j +1 +j -j -j +1 -1 -1 +j -j -j -1 +1 +1 -j -1 -j
+1 -j +1 -j -1 -j -1 +j -1 +j -j -j -1 +1 +1 +j -j -j +1 -1 -1 +j +1 +j +1 -j +1 -j -1 -j +1 -j +1 +j -j -j +1 -1 -1 -j +j +j +1 -1 -1
+j +1 +j -1 +j -1 -j -1 -j -1 +j -1 +j -j -j -1 +1 +1 -j +j +j -1 +1 +1 +j +1 +j +1 -j +1 -j -1 -j +1 -j +1 +j -j -j +1 -1 -1 -j +j
+j +1 -1 -1 +j +1 +j -1 +j -1 -j -1 -j -1 +j -1 +j -j -j -1 +1 +1 -j +j +j -1 +1 +1

FIG. 15

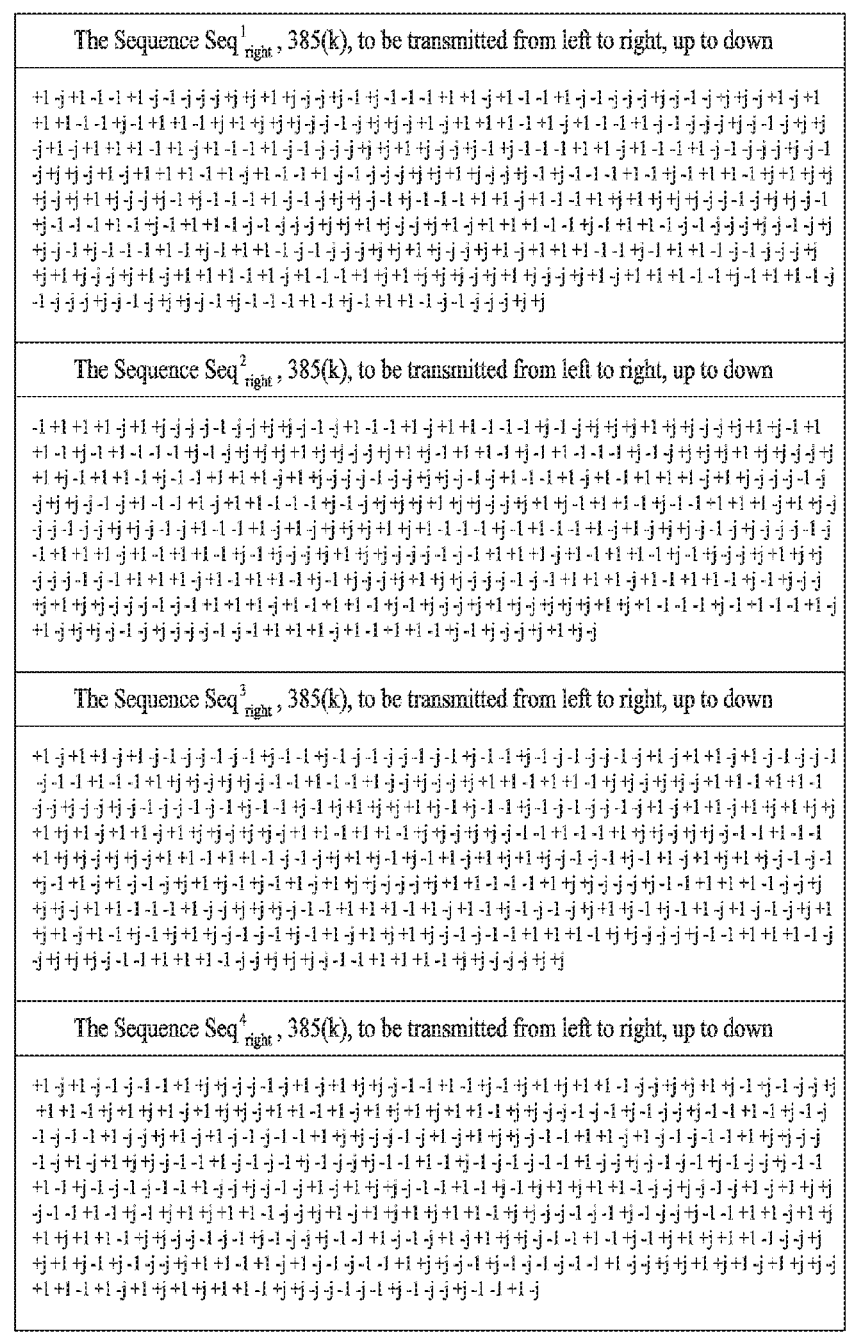

| The Sequence $Seq^{1}_{right}$, 385(k), to be transmitted from left to right, up to down |
|---|
| +1 -j +1 -1 -1 +1 -j -1 -j -j -j +j +j +1 +j -j -j +j -1 +j -1 -1 -1 +1 +1 -j +1 -1 -1 +1 -j -1 -j -j -j +j -j -1 -j +j +j -j +1 -j +1<br>+1 +1 -1 -1 +j -1 +1 +1 -1 +j +1 +j +j +j -j -j -1 -j +j +j -j +1 -j +1 +1 +1 -1 +1 -j +1 -1 -1 +1 -j -1 -j -j -j +j -j -1 -j +j +j<br>-j +1 -j +1 +1 +1 -1 +1 -j +1 -1 -1 +1 -j -1 -j -j -j +j +j +1 +j -j -j +j -1 +j -1 -1 -1 +1 +1 -j +1 -1 -1 +1 -j -1 -j -j -j +j -j -1<br>-j +j +j -j +1 -j +1 +1 +1 -1 +1 -j +1 -1 -1 +1 -j -1 -j -j -j +j +j +1 +j -j -j +j -1 +j -1 -1 -1 +1 -1 +j -1 +1 +1 -1 +j +1 +j +j<br>+j -j +j +1 +j -j -j +j -1 +j -1 -1 -1 +1 -j -1 -j +j +j -j -1 +j -1 -1 -1 +1 +1 -j +1 -1 -1 +1 +j +1 +j +j +j -j -j -1 -j +j +j -j -1<br>+j -1 -1 -1 +1 -1 +j -1 +1 +1 -1 -j -1 -j -j -j +j +j +1 +j -j -j +j +1 -j +1 +1 +1 -1 -1 +j -1 +1 +1 -1 -j -1 -j -j -j +j -j -1 -j +j<br>+j -j -1 +j -1 -1 -1 +1 -1 +j -1 +1 +1 -1 -j -1 -j -j -j +j +j +1 +j -j -j +j +1 -j +1 +1 +1 -1 -1 +j -1 +1 +1 -1 -j -1 -j -j -j +j<br>+j +1 +j -j -j +j +1 -j +1 +1 +1 -1 +1 -j +1 -1 -1 +1 +j +1 +j +j +j -j +j +1 +j -j -j +j +1 -j +1 +1 +1 -1 -1 +j -1 +1 +1 -1 -j<br>-1 -j -j -j +j -j -1 -j +j +j -j -1 +j -1 -1 -1 +1 -1 +j -1 +1 +1 -1 -j -1 -j -j -j +j +j |

| The Sequence $Seq^{2}_{right}$, 385(k), to be transmitted from left to right, up to down |
|---|
| -1 +1 +1 +1 -j +1 +j -j -j -j -1 -j -j +j +j -j -1 -j +1 -1 -1 +1 -j +1 +1 -1 -1 -1 +j -1 -j +j +j +j +1 +j +j -j -j +j +1 +j -1 +1<br>+1 -1 +j -1 +1 -1 -1 -1 +j -1 -j +j +j +j +1 +j +j -j -j +j +1 +j -1 +1 +1 -1 +j -1 +1 -1 -1 -1 +j -1 -j +j +j +j +1 +j +j -j -j +j<br>+1 +j -1 +1 +1 -1 +j -1 -1 +1 +1 +1 -j +1 +j -j -j -j -1 -j -j +j +j -j -1 -j +1 -1 -1 +1 -j +1 -1 +1 +1 +1 -j +1 +j -j -j -j -1 -j<br>-j +j +j -j -1 -j +1 -1 -1 +1 -j +1 +1 -1 -1 -1 +j -1 -j +j +j +j +1 +j +j -j -j +j +1 +j -1 +1 +1 -1 +j -1 -1 +1 +1 +1 -j +1 +j -j<br>-j -j -1 -j -j +j +j -j -1 -j +1 -1 -1 +1 -j +1 -j +j +j +j +1 +j +1 -1 -1 -1 +j -1 +1 -1 -1 +1 -j +1 -j +j +j -j -1 -j +j -j -j -j -1 -j<br>-1 +1 +1 +1 -j +1 -1 +1 +1 -1 +j -1 +j -j -j +j +1 +j +j -j -j -j -1 -j -1 +1 +1 +1 -j +1 -1 +1 +1 -1 +j -1 +j -j -j +j +1 +j +j<br>-j -j -j -1 -j -1 +1 +1 +1 -j +1 -1 +1 +1 -1 +j -1 +j -j -j +j +1 +j +j -j -j -j -1 -j -1 +1 +1 +1 -j +1 -1 +1 +1 -1 +j -1 +j -j -j<br>+j +1 +j +j -j -j -j -1 -j -1 +1 +1 +1 -j +1 -1 +1 +1 -1 +j -1 +j -j -j +j +1 +j -j +j +j +j +1 +j +1 -1 -1 -1 +j -1 +1 -1 -1 +1 -j<br>+1 -j +j +j -j -1 -j +j -j -j -j -1 -j -1 +1 +1 +1 -j +1 -1 +1 +1 -1 +j -1 +j -j -j +j +1 +j -j |

| The Sequence $Seq^{3}_{right}$, 385(k), to be transmitted from left to right, up to down |
|---|
| +1 -j +1 +1 -j +1 -j -1 -j -j -1 -j -1 +j -1 -1 +j -1 -j -1 -j -j -1 -j -1 +j -1 -1 +j -1 -j -1 -j -j -1 -j +1 -j +1 +1 -j +1 -j -1 -j -j -1<br>-j -1 -1 +1 -1 -1 +1 +j +j -j +j +j -j -1 -1 +1 -1 -1 +1 -j -j +j -j -j +j +1 +1 -1 +1 +1 -1 +j +j -j +j +j -j +1 +1 -1 +1 +1 -1<br>-j -j +j -j -j +j -j -1 -j -j -1 -j -1 +j -1 -1 +j -1 +j +1 +j +j +1 +j -1 +j -1 -1 +j -1 -j -1 -j -j -1 -j +1 -j +1 +1 -j +1 +j +1 +j +j<br>+1 +j +1 -j +1 +1 -j +1 +j +j -j +j +j -j +1 +1 -1 +1 +1 -1 +j +j -j +j +j -j -1 -1 +1 -1 -1 +1 +j +j -j +j +j -j -1 -1 +1 -1 -1<br>+1 +j +j -j +j +j -j +1 +1 -1 +1 +1 -1 -j -1 -j +j +1 +j -1 +j -1 +1 -j +1 +j +1 +j -j -1 -j -1 +j -1 +1 -j +1 +j +1 +j -j -1 -j -1<br>+j -1 +1 -j +1 -j -1 -j +j +1 +j -1 +j -1 +1 -j +1 +j +j -j -j -j +j +1 +1 -1 -1 -1 +1 +j +j -j -j -j +j -1 -1 +1 +1 +1 -1 -j -j +j<br>+j +j -j +1 +1 -1 -1 -1 +1 -j -j +j +j +j -j -1 -1 +1 +1 +1 -1 +1 -j +1 -1 +j -1 -j -1 -j +j +1 +j -1 +j -1 +1 -j +1 -j -1 -j +j +1<br>+j +1 -j +1 -1 +j -1 +j +1 +j -j -1 -j -1 +j -1 +1 -j +1 +j +1 +j -j -1 -j -1 -1 +1 +1 +1 -1 +j +j -j -j -j +j -1 -1 +1 +1 +1 -1 -j<br>-j +j +j +j -j -1 -1 +1 +1 +1 -1 -j -j +j +j +j -j -1 -1 +1 +1 +1 -1 +j +j -j -j -j +j +j |

| The Sequence $Seq^{4}_{right}$, 385(k), to be transmitted from left to right, up to down |
|---|
| +1 -j +1 -j -1 -j -1 -1 +1 +j +j -j -j -1 -j +1 -j +1 +j +j -j -1 -1 +1 -1 +j -1 +j +1 +j +1 +1 -1 -j -j +j +j +1 +j -1 +j -1 -j -j +j<br>+1 +1 -1 +j +1 +j +1 -j +1 +j +j -j +1 +1 -1 +1 -j +1 +j +1 +j +1 +1 -1 +j +j -j -j -1 -j -1 +j -1 -j -j +j -1 -1 +1 -1 +j -1 -j<br>-1 -j -1 -1 +1 -j -j +j +1 -j +1 -j -1 -j -1 -1 +1 +j +j -j -j -1 -j +1 -j +1 +j +j -j -1 -1 +1 +1 -j +1 -j -1 -j -1 -1 +1 +j +j -j -j<br>-1 -j +1 -j +1 +j +j -j -1 -1 +1 -j -1 -j -1 +j -1 -j -j +j -1 -1 +1 -1 +j -1 -j -1 -j -1 -1 +1 -j -j +j -j -1 -j -1 +j -1 -j -j +j -1 -1<br>+1 -1 +j -1 -j -1 -j -1 -1 +1 -j -j +j -j -1 -j +1 -j +1 +j +j -j -1 -1 +1 -1 +j -1 +j +1 +j +1 +1 -1 -j -j +j -j -1 -j +1 -j +1 +j +j<br>-j -1 -1 +1 -1 +j -1 +j +1 +j +1 +1 -1 -j -j +j +1 -j +1 +j +1 +j +1 +1 -1 +j +j -j -j -1 -j -1 +j -1 -j -j +j -1 -1 +1 +1 -j +1 +j<br>+1 +j +1 +1 -1 +j +j -j -j -1 -j -1 +j -1 -j -j +j -1 -1 +1 -j -1 -j +1 -j +1 +j +j -j -1 -1 +1 -1 +j -1 +j +1 +j +1 +1 -1 -j -j +j<br>+j +1 +j -1 +j -1 -j -j +j +1 +1 -1 +1 -j +1 -j -1 -j -1 -1 +1 +j +j -j -1 +j -1 -j -1 -j -1 -1 +1 -j -j +j +j +1 +j +1 -j +1 +j +j -j<br>+1 +1 -1 +1 -j +1 +j +1 +j +1 +1 -1 +j +j -j -j -1 -j -1 +j -1 -j -j +j -1 -1 +1 -j |

FIG. 16

The Sequence $Seq^{5}_{right}$, 385(k), to be transmitted from left to right, up to down +1 -1 -1 +1 -1 -1 -j +j +j -j +j +j -j +j +j +j -j -j -1 +1 +1 +1 -1 -1 +1 -1 -1 -1 +1 +1 -j +j +j +j -j -j -j +j +j -j +j +j -1 +1
+1-1 +1 +1 -1 +1 +1 -1 +1 +1 -j +j +j -j +j +j +j -j -j -j +j +j -1 +1 +1 +1 -1 -1 -1 +1 +1 +1 -1 -1 -j +j +j +j -j -j +j -j -j +j
-j -j -1 +1 +1 -1 +1 +1 +j -j -j +j -j -j -1 +1 +1 -1 +1 +1 +1 -1 -1 -1 +1 +1 +j -j -j -j +j +j -j +j +j +j -j -j +1 -1 -1 -1 +1 +1
-1 +1 +1 -1 +1 +1 -j +j +j -j +j +j -j +j +j -j +j +j -1 +1 +1 -1 +1 +1 -1 +1 +1 +1 -1 -1 +j -j -j -j +j +j +j -j -j -j +j +j
+1 -1 -1 -1 +1 +1 +1 -1 -1 +1 -1 -1 -j +j +j -j +j +j -1 +j -1 -1 +j -1 +j +1 +j +j +1 +j +j +1 +j -j -1 -j +1 -j +1 -1 +j -1 -1
+j -1 +1 -j +1 +j +1 +j -j -1 -j +j +1 +j +j +1 +j +1 -j +1 +1 -j +1 -1 +j -1 -1 +j -1 -j -1 -j -j -1 -j +j +1 +j -j -1 -j -1 +j -1
+1 -j +1 -1 +j -1 +1 -j +1 -j -1 -j +j +1 +j +j +1 +j +j +1 +j -1 +j -1 -1 +j -1 -j -1 -j -j -1 -j +1 -j +1 +1 -j +1 -1 +j -1 +1 -j
+1 -j -1 -j +j +1 +j +j +1 +j -j -1 -j -1 +j -1 +1 -j +1 +1 -j +1 +1 -j +1 +j +1 +j +j +1 +j -j -1 -j -j -1 -j -1 +j -1 -1 +j -1 -1
+j -1 +1 -j +1 +j +1 +j -j -1 -j +j +1 +j -j -1 -j +1 -j +1 -1 +j -1 +1 -j +1 +1 -j +1 -j -1 -j -j -1 -j -j The Sequence $Seq^{6}_{right}$, 385(k), to be transmitted from left to right, up to down +1 -j +1 -j -1 -j +1 -j +1 -j -1 -j -j -1 -j -1 +j -1 -j -1 -j -1 +j -1 +1 -j +1 +j +1 +j +1 -j +1 +j +1 +j +j +1 +j -1 +j -1 +j +1
+j -1 +j -1 +j +1 +j +1 -j +1 -j -1 -j -1 +j -1 +1 -j +1 -j -1 -j -1 +j -1 +j +1 +j +j +1 +j -1 +j -1 -j -1 -j +1 -j +1 -1 +j -1 -j
-1 -j +1 -j +1 +j +1 +j +j -j -j +1 -1 -1 +j -j -j +1 -1 -1 +1 -1 -1 -j +j +j +1 -1 -1 -j +j +j +j -j -j -1 +1 +1 +j -j -j -1 +1 +1
-1 +1 +1 -j +j +j -1 +1 +1 -j +j +j +1 -1 -1 -j +j +j -1 +1 +1 +j -j -j -j +j +j -1 +1 +1 +j -j -j +1 -1 -1 +1 -1 -1 +j -j -j -1 +1
+1 -j +j +j +j -j -j -1 +1 +1 -j +j +j +1 -1 -1 -1 +j -1 -j -1 -j +1 -j +1 +j +1 +j +j +1 +j -1 +j -1 -j -1 -j +1 -j +1 -1 +j -1 +j
+1 +j +1 -j +1 -j -1 -j -j -1 -j -1 +j -1 +j +1 +j +1 -j +1 -j -1 -j +1 -j +1 -j -1 -j +1 -j +1 -1 +j -1 -j -1 -j -1 +j -1 -j -1 -j -j
-1 -j -1 +j -1 -j -1 -j -1 +j -1 +1 -j +1 -j -1 -j +1 -j +1 -j -1 -j -j +j +j +1 -1 -1 +j -j -j -1 +1 +1 -1 +1 +1 -j +j +j +1 -1 -1 +j
-j -j -j +j +j -1 +1 +1 +j -j -j +1 -1 -1 +1 -1 -1 -j +j +j -1 +1 +1 +j -j -j -1 +1 +1 -j +j +j -1 +1 +1 -j +j +j +j -j -j -1 +1 +1
+j -j -j -1 +1 +1 -1 +1 +1 +j -j -j -1 +1 +1 +j -j -j -j +j +j -1 +1 +1 -j +j +j -1 +1 +1 -j The Sequence $Seq^{7}_{right}$, 385(k), to be transmitted from left to right, up to down -1 +1 +1 -j +j +j -1 +1 +1 -j +j +j -1 +1 +1 +j -j -j -1 +1 +1 +j -j -j -j -1 -j +1 -j +1 -j -1 -j +1 -j +1 -j -1 -j -1 +j -1 -j -1 -j
-1 +j -1 -j +j +j +1 -1 -1 +j -j -j -1 +1 +1 -j +j +j -1 +1 +1 +j -j -j +1 -1 -1 -1 +j -1 -j -1 -j +1 -j +1 +j +1 +j -1 +j -1 +j +1
+j +1 -j +1 -j -1 -j -1 +1 +1 +j -j -j -1 +1 +1 +j -j -j -1 +1 +1 -j +j +j -1 +1 +1 -j +j +j -j -1 -j -1 +j -1 -j -1 -j -1 +j -1 -j -1
-j +1 -j +1 -j -1 -j +1 -j +1 -j +j +j -1 +1 +1 +j -j -j +1 -1 -1 -j +j +j +1 -1 -1 +j -j -j -1 +1 +1 -1 +j -1 +j +1 +j +1 -j +1 -j
-1 -j -1 +j -1 -j -1 -j +1 -j +1 +j +1 +j -j +j +j +1 -1 -1 +j -j -j -1 +1 +1 +j -j -j +1 -1 -1 -j +j +j -1 +1 +1 +1 -j +1 +j +1 +j
-1 +j -1 -j -1 -j -1 +j -1 +j +1 +j +1 -j +1 -j -1 -j +1 -1 -1 +j -j -j +1 -1 -1 +j -j -j -1 +1 +1 +j -j -j -1 +1 +1 +j -j -j -j -1 -j
+1 -j +1 -j -1 -j +1 -j +1 +j +1 +j +1 -j +1 +j +1 +j +1 -j +1 -j +j +j -1 +1 +1 +j -j -j +1 -1 -1 +j -j -j -1 +1 +1 -j +j +j +1
-1 -1 +1 -j +1 -j -1 -j -1 +j -1 +j +1 +j -1 +j -1 -j -1 -j +1 -j +1 +j +1 +j +1 -1 -1 -j +j +j +1 -1 -1 -j +j +j -1 +1 +1 -j +j +j
-1 +1 +1 -j +j +j -j -1 -j -1 +j -1 -j -1 -j -1 +j -1 +j +1 +j -1 +j -1 +j +1 +j -1 +j -1 +1

The Sequence $Seq^{8}_{right}$, 385(k), to be transmitted from left to right, up to down -1 +j -1 +j +1 +j -1 +j -1 -j -1 -j +1 -1 -1 -j +j +j +1 -1 -1 +j -j -j +1 -j +1 +j +1 +j +1 -j +1 -j -1 -j -1 +1 +1 -j +j +j -1 +1
+1 +j -j -j -1 +j -1 +j +1 +j -1 +j -1 -j -1 -j +1 -1 -1 -j +j +j +1 -1 -1 +j -j -j +1 -j +1 +j +1 +j +1 -j +1 -j -1 -j -1 +1 +1 -j
+j +j -1 +1 +1 +j -j -j +1 -j +1 -j -1 -j -1 +j -1 -j -1 -j +1 -1 -1 -j +j +j -1 +1 +1 -j +j +j -1 +j -1 -j -1 -j +1 -j +1 -j -1 -j -1
+1 +1 -j +j +j +1 -1 -1 -j +j +j +1 -j +1 -j -1 -j -1 +j -1 -j -1 -j +1 -1 -1 -j +j +j -1 +1 +1 -j +j +j -1 +j -1 -j -1 -j +1 -j +1 -j
-1 -j -1 +1 +1 -j +j +j +1 -1 -1 -j +j +j +j +1 +j +1 -j +1 +j +1 +j -1 +j -1 -j +j +j -1 +1 +1 -j +j +j +1 -1 -1 +j +1 +j -1 +j
-1 +j +1 +j +1 -j +1 -j +j +j +1 -1 -1 -j +j +j -1 +1 +1 -j -1 -j -1 +j -1 -j -1 -j +1 -j +1 +j -j -j +1 -1 -1 +j -j -j -1 +1 +1 -j
-1 -j +1 -j +1 -j -1 -j -1 +j -1 +j -j -j -1 +1 +1 +j -j -j +1 -1 -1 -j -1 -j -1 +j -1 +j +1 +j -1 +j -1 -j +j +j -1 +1 +1 +j -j -j -1
+1 +1 -j -1 -j +1 -j +1 +j +1 +j +1 -j +1 -j +j +j +1 -1 -1 +j -j -j +1 -1 -1 +j +1 +j +1 -j +1 -j -1 -j +1 -j +1 +j -j -j +1 -1 -1
-j +j +j +1 -1 -1 +j +1 +j -1 +j -1 -j -1 -j -1 +j -1 +j -j -j -1 +1 +1 -j +j +j -1 +1 +1 +1

FIG. 17

| The Sequence $Seq^{1}_{left}$, 595(k), to be transmitted from left to right, up to down |
| --- |
| +j +1 -1 +j +1 +j -j -1 -1 +j +j -1 -1 +1 +1 +1 -j -j -1 +1 -j +1 -1 -1 +1 -j -1 -j -j -j +j +j +1 +j -j -j +j -1 +j -1 -1 -1 +1 +1<br>-j +1 -1 -1 +1 -j -1 -j -j -j +j -j -1 -j +j +j -j +1 -j +1 +1 +1 -1 -1 +j -1 +1 +1 -1 +j +1 +j +j +j -j -j -1 -j +j +j -j +1 -j +1 +1<br>+1 -1 +1 -j +1 -1 -1 +1 -j -1 -j -j -j +j -j -1 -j +j +j -j +1 -j +1 +1 +1 -1 -j -1 -j +j +j -j -1 +j -1 -1 -1 +1 +1 -j +1 -1 -1 +1<br>+j +1 +j +j +j -j -j -1 -j +j +j -j -1 +j -1 -1 -1 +1 -1 +j -1 +1 +1 -1 -j -1 -j -j -j +j -j -1 -j +j +j -j -1 +j -1 -1 -1 +1 +1 -j +1<br>-1 -1 +1 +j +1 +j +j +j -j +j +1 +j -j -j +j +1 -j +1 +1 +1 -1 +1 -j +1 -1 -1 +1 +j +1 +j +j +j -j +1 -j +1 -1 -1 +1 -j -1 -j -j<br>-j +j +j +1 +j -j -j +j -1 +j -1 -1 -1 +1 +1 -j +1 -1 -1 +1 -j -1 -j -j -j +j -j -1 -j +j +j -j +1 -j +1 +1 +1 -1 -1 +j -1 +1 +1 -1<br>+j +1 +j +j +j -j -j -1 -j +j +j -j +1 -j +1 +1 +1 -1 +1 -j +1 -1 -1 +1 -j -1 -j -j -j +j -j -1 -j +j +j -j +1 -j +1 +1 +1 -1 -j -1 -j<br>+j +j -j -1 +j -1 -1 -1 +1 +1 -j +1 -1 -1 +1 +j +1 +j +j +j -j -j -1 -j +j +j -j -1 +j -1 -1 -1 +1 -1 +j -1 +1 +1 -1 -j -1 -j -j -j +j<br>-j -1 -j +j +j -j -1 +j -1 -1 -1 +1 +1 -j +1 -1 -1 +1 +j +1 +j +j +j -j +j +1 +j -j -j +j +1 -j +1 +1 +1 -1 +1 -j +1 -1 -1 +1 +j<br>+1 +j +j +j -j -1 +j -1 +1 +1 -1 +j +1 +j +j +j -j -j -1 -j +j +j -j +1 -j +1 +1 +1 -1 -1 +j -1 +1 +1 -1 +j +1 +j +j +j -j +j +1<br>+j -j -j +j -1 +j -1 -1 -1 +1 +1 -j +1 -1 -1 +1 -j -1 -j -j -j +j +j +1 +j -j -j +j -1 +j -1 -1 -1 +1 -1 +j -1 +1 +1 -1 +j +1 +j +j<br>+j -j +j +1 +j -j -j +j -1 +j -1 -1 -1 +1 +j +1 +j -j -j +j +1 -j +1 +1 +1 -1 -1 +j -1 +1 +1 -1 -j -1 -j -j -j +j +j +1 +j -j -j +j<br>+1 -j +1 +1 +1 -1 +1 -j +1 -1 -1 +1 +j +1 +j +j +j -j +j +1 +j -j -j +j +1 -j +1 +1 +1 -1 -1 +j -1 +1 +1 -1 -j -1 -j -j -j +j -j<br>-1 -j +j +j -j -1 +j -1 -1 -1 +1 -1 +j -1 +1 +1 -1 -j -1 -j -j -j +j |

| The Sequence $Seq^{2}_{left}$, 595(k), to be transmitted from left to right, up to down |
| --- |
| -1 +1 -j +1 -j -1 +j +j +j -1 -1 +1 -1 -1 +j +1 +j -j -1 +1 -j +1 -1 +j -1 +1 -j +1 +1 -j +1 +1 -j +1 -1 +j -1 -1 +j -1 -1 +j<br>-1 -j -1 -j +j +1 +j -j -1 -j -j -1 -j +j +1 +j -j -1 -j -j -1 -j -j -1 -j -1 +j -1 +1 -j +1 -1 +j -1 -1 +j -1 -1 +j -1 +1 -j +1 +1 -j<br>+1 +1 -j +1 -j -1 -j +j +1 +j -j -1 -j -j -1 -j +j +1 +j -j -1 -j -j -1 -j -j -1 -j +j +j -j -j -j +j +j +j -j +j +j -j +j +j -j -j -j +j -j -j<br>+j -j -j +j +1 +1 -1 -1 -1 +1 +1 +1 -1 +1 +1 -1 -1 -1 +1 +1 +1 -1 +1 +1 -1 +1 +1 -1 +j +j -j -j -j +j +j +j -j +j +j -j +j +j -j<br>-j -j +j -j -j +j -j -j +j -1 -1 +1 +1 +1 -1 -1 -1 +1 -1 -1 +1 +1 +1 -1 -1 -1 +1 -1 -1 +1 -1 -1 +1 +1 -j +1 -1 +j -1 +1 -j +1 +1<br>-j +1 +1 -j +1 -1 +j -1 -1 +j -1 -1 +j -1 -j -1 -j +j +1 +j -j -1 -j -j -1 -j +j +1 +j -j -1 -j -j -1 -j -j -1 -j -1 +j -1 +1 -j +1 -1 +j<br>-1 -1 +j -1 -1 +j -1 +1 -j +1 +1 -j +1 +1 -j +1 -j -1 -j +j +1 +j -j -1 -j -j -1 -j +j +1 +j -j -1 -j -j -1 -j -j -1 -j +j +j -j -j -j +j<br>+j +j -j +j +j -j +j +j -j -j -j +j -j -j +j -j -j +j +1 +1 -1 -1 -1 +1 +1 +1 -1 +1 +1 -1 -1 -1 +1 +1 +1 -1 +1 +1 -1 +1 +1 -1 +j<br>+j -j -j -j +j +j +j -j +j +j -j +j +j -j -j -j +j -j -j +j -j -j +j -1 -1 +1 +1 +1 -1 -1 -1 +1 -1 -1 +1 +1 +1 -1 -1 -1 +1 -1 -1 +1 -1<br>-1 +1 -1 +j -1 +1 -j +1 -1 +j -1 -1 +j -1 -1 +j -1 +1 -j +1 +1 -j +1 +1 -j +1 +j +1 +j -j -1 -j +j +1 +j +j +1 +j -j -1 -j +j +1<br>+j +j +1 +j +j +1 +j +1 -j +1 -1 +j -1 +1 -j +1 +1 -j +1 +1 -j +1 -1 +j -1 -1 +j -1 -1 +j -1 +j +1 +j -j -1 -j +j +1 +j +j +1 +j<br>-j -1 -j +j +1 +j +j +1 +j +j +1 +j -j -j +j +j +j -j -j -j +j -j -j +j -j -j +j +j +j -j +j +j -j +j +j -j -1 -1 +1 +1 +1 -1 -1 -1 +1 -1<br>-1 +1 +1 +1 -1 -1 -1 +1 -1 -1 +1 -1 -1 +1 -j -j +j +j +j -j -j -j +j -j -j +j -j -j +j +j +j -j +j +j -j +j +j -j +1 +1 -1 -1 -1 +1 +1<br>+1 -1 +1 +1 -1 -1 -1 +1 +1 +1 -1 +1 +1 -1 +1 +1 -1 |

| The Sequence $Seq^{3}_{left}$, 595(k), to be transmitted from left to right, up to down |
| --- |
| -j -j -j -j -j +j -j +1 -j -j -j +j +j +j +1 -1 +j -1 +1 +1 -j +1 +j +1 +j +1 -j +1 -j -1 -j -j -1 -j -1 +j -1 -j -1 -j +1 -j +1 -1 +j -1<br>-j -1 -j -1 +j -1 +j +1 +j -j -1 -j -1 +j -1 -j -1 -j +1 -j +1 -1 -1 +1 -j -j +j -1 -1 +1 +j +j -j +j +j -j +1 +1 -1 +j +j -j -1 -1 +1<br>-1 -1 +1 -j -j +j -1 -1 +1 +j +j -j -j -j +j -1 -1 +1 -j -j +j +1 +1 -1 +j +1 +j -1 +j -1 -j -1 -j -1 +j -1 +1 -j +1 -j -1 -j -1 +j -1<br>-j -1 -j -j -1 -j +1 -j +1 +j +1 +j +1 -j +1 +1 -j +1 -j -1 -j -1 +j -1 -j -1 -j -j -j +j +1 +1 -1 +j +j -j +1 +1 -1 -1 -1 +1 +j +j -j<br>+1 +1 -1 +j +j -j -j -j +j +1 +1 -1 +j +j -j +1 +1 -1 +1 +1 -1 -j -j +j -1 -1 +1 -j -j +j +j +1 +j -1 +j -1 +j +1 +j +1 -j +1 +1<br>-j +1 -j -1 -j +1 -j +1 +j +1 +j -j -1 -j +1 -j +1 -j -1 -j -1 +j -1 +1 -j +1 -j -1 -j +1 -j +1 +j +1 +j -j -j +j +1 +1 -1 -j -j +j -1<br>-1 +1 -1 -1 +1 +j +j -j -1 -1 +1 -j -j +j -j -j +j +1 +1 -1 -j -j +j -1 -1 +1 +1 +1 -1 -j -j +j +1 +1 -1 +j +j -j -1 +j -1 -j -1 -j +1<br>-j +1 -j -1 -j +j +1 +j +1 -j +1 -j -1 -j +1 -j +1 +1 -j +1 +j +1 +j -1 +j -1 +j +1 +j +j +1 +j +1 -j +1 -j -1 -j +1 -j +1 +1 +1<br>-1 +j +j -j -1 -1 +1 +j +j -j -j -j +j -1 -1 +1 +j +j -j -1 -1 +1 +1 +1 -1 +j +j -j -1 -1 +1 +j +j -j +j +j -j +1 +1 -1 -j -j +j +1<br>+1 -1 +1 -j +1 +j +1 +j +1 -j +1 -j -1 -j -j -1 -j -1 +j -1 -j -1 -j +1 -j +1 -1 +j -1 -j -1 -j -1 +j -1 +j +1 +j -j -1 -j -1 +j -1 -j<br>-1 -j +1 -j +1 -1 -1 +1 -j -j +j -1 -1 +1 +j +j -j +j +j -j +1 +1 -1 +j +j -j -1 -1 +1 -1 -1 +1 -j -j +j -1 -1 +1 +j +j -j -j -j +j -1<br>-1 +1 -j -j +j +1 +1 -1 +j +1 +j -1 +j -1 -j -1 -j -1 +j -1 +1 -j +1 -j -1 -j -1 +j -1 -j -1 -j -j -1 -j +1 -j +1 +j +1 +j +1 -j +1 +1<br>-j +1 -j -1 -j -1 +j -1 -j -1 -j -j -j +j +1 +1 -1 +j +j -j +1 +1 -1 -1 -1 +1 +j +j -j +1 +1 -1 +j +j -j -j -j +j +1 +1 -1 +j +j -j<br>+1 +1 -1 +1 +1 -1 -j -j +j -1 -1 +1 -j -j +j |

FIG. 18

| The Sequence $Seq^{4}_{left}$, 595(k), to be transmitted from left to right, up to down |
| --- |
| +1 +1 +1 -1 -j -1 +1 -1 -j -1 -j -j -1 -j +j +1 +j -1 +1 +1 -j +1 +j +1 +j +j +1 +j +1 -j +1 +1 +1 -1 +j +j -j +j +j -j +1 +1 -1<br>+j +1 +j +1 -j +1 -1 +j -1 -j -1 -j -j -j +j -1 -1 +1 +1 +1 -1 +j +j -j -1 +j -1 -j -1 -j -j -1 -j -1 +j -1 -1 -1 +1 -j -j +j -j -j +j -1<br>-1 +1 -j -1 -j -1 +j -1 +1 -j +1 +j +1 +j +j +j -j +1 +1 -1 -1 -1 +1 -j -j +j +1 -j +1 +j +1 +j -j -1 -j -1 +j -1 +1 +1 -1 +j<br>+j -j -j -j +j -1 -1 +1 +j +1 +j +1 -j +1 +1 -j +1 +j +1 +j -j -j +j -1 -1 +1 -1 -1 +1 -j -j +j +1 -j +1 +j +1 +j -j -1 -j -1 +j -1<br>+1 +1 -1 +j +j -j -j -j +j -1 -1 +1 +j +1 +j +1 -j +1 +1 -j +1 +j +1 +j -j -j +j -1 -1 +1 -1 -1 +1 -j -j +j +j +1 +j -1 +j -1 -1<br>+j -1 +j +1 +j +j +j -j -1 -1 +1 -1 -1 +1 +j +j -j -1 +j -1 +j +1 +j -j -1 -j +1 -j +1 +1 +1 -1 -j -j +j +j +j -j -1 -1 +1 -j -1 -j<br>+1 -j +1 +1 -j +1 -j -1 -j -j -j +j +1 +1 -1 +1 +1 -1 -j -j +j +1 -j +1 -j -1 -j +j +1 +j -1 +j -1 -1 -1 +1 +j +j -j -j -j +j +1 +1<br>-1 +j +1 +j -1 +j -1 +1 -j +1 -j -1 -j +j +j -j -1 -1 +1 +1 +1 -1 -j -j +j -1 +j -1 +j +1 +j +j +1 +j -1 +j -1 +1 +1 -1 -j -j +j -j<br>-j +j +1 +1 -1 +j +1 +j -1 +j -1 +1 -j +1 -j -1 -j +j +j -j -1 -1 +1 +1 +1 -1 -j -j +j -1 +j -1 +j +1 +j +j +1 +j -1 +j -1 +1 +1<br>-1 -j -j +j -j -j +j +1 +1 -1 +1 -j +1 +j +1 +j +j +1 +j +1 -j +1 +1 +1 -1 +j +j -j +j +j -j +1 +1 -1 +j +1 +j +1 -j +1 -1 +j -1<br>-j -1 -j -j -j +j -1 -1 +1 +1 +1 -1 +j +j -j -1 +j -1 -j -1 -j -j -1 -j -1 +j -1 -1 -1 +1 -j -j +j -j -j +j -1 -1 +1 -j -1 -j -1 +j -1 +1<br>-j +1 +j +1 +j +j +j -j +1 +1 -1 -1 -1 +1 -j -j +j +1 -j +1 +j +1 +j -j -1 -j -1 +j -1 +1 +1 -1 +j +j -j -j -j +j -1 -1 +1 +j +1<br>+j +1 -j +1 +1 -j +1 +j +1 +j -j -j +j -1 -1 +1 -1 -1 +1 -j -j +j +1 -j +1 +j +1 +j -j -1 -j -1 +j -1 +1 +1 -1 +j +j -j -j -j +j -1<br>-1 +1 +j +1 +j +1 -j +1 +1 -j +1 +j +1 +j -j -j +j -1 -1 +1 -1 -1 +1 -j -j +j |

| The Sequence $Seq^{5}_{left}$, 595(k), to be transmitted from left to right, up to down |
| --- |
| +1 -j +1 -1 +1 -j -j -1 -j +j -1 +j +1 +1 +j +1 -j +1 +1 +1 -1 -1 +1 -1 -1 +1 -1 -1 -1 +1 +1 +j -j -j +j -j -j +j -j -j -j +j +j -j<br>-1 -j -j -1 -j +j +1 +j -j -1 -j +1 -j +1 +1 -j +1 -1 +j -1 +1 -j +1 -j +j +j -j +j +j -j +j +j +j -j -j -1 +1 +1 -1 +1 +1 -1 +1 +1<br>+1 -1 -1 -1 +j -1 -1 +j -1 +1 -j +1 -1 +j -1 +j +1 +j +j +1 +j -j -1 -j +j +1 +j -1 +1 +1 +1 -1 -1 -1 +1 +1 -1 +1 +1 -j +j +j<br>+j -j -j -j +j +j -j +j +j +j +1 +j -j -1 -j -j -1 -j -j -1 -j -1 +j -1 +1 -j +1 +1 -j +1 +1 -j +1 -j +j +j +j -j -j -j +j +j -j +j +j -1<br>+1 +1 +1 -1 -1 -1 +1 +1 -1 +1 +1 -1 +j -1 +1 -j +1 +1 -j +1 +1 -j +1 +j +1 +j -j -1 -j -j -1 -j -j -1 -j +j -j -j +j -j -j +j -j -j<br>-j +j +j -1 +1 +1 -1 +1 +1 -1 +1 +1 +1 -1 -1 +1 -j +1 +1 -j +1 -1 +j -1 +1 -j +1 +j +1 +j +j +1 +j -j -1 -j +j +1 +j +1 -1 -1<br>+1 -1 -1 +1 -1 -1 -1 +1 +1 -j +j +j -j +j +j -j +j +j +j -j -j -j -1 -j -j -1 -j +j +1 +j -j -1 -j -1 +j -1 -1 +j -1 +1 -j +1 -1 +j -1<br>-j +j +j +j -j -j -j +j +j -j +j +j +1 -1 -1 -1 +1 +1 +1 -1 -1 +1 -1 -1 -1 +j -1 +1 -j +1 +1 -j +1 +1 -j +1 -j -1 -j +j +1 +j +j<br>+1 +j +j +1 +j +1 -1 -1 -1 +1 +1 +1 -1 -1 +1 -1 -1 -j +j +j +j -j -j -j +j +j -j +j +j -j -1 -j +j +1 +j +j +1 +j +j +1 +j -1 +j -<br>1 +1 -j +1 +1 -j +1 +1 -j +1 +1 -1 -1 +1 -1 -1 +1 -1 -1 -1 +1 +1 +j -j -j +j -j -j +j -j -j -j +j +j -j -1 -j -j -1 -j +j +1 +j -j -1<br>-j +1 -j +1 +1 -j +1 -1 +j -1 +1 -j +1 -j +j +j -j +j +j -j +j +j +j -j -j -1 +1 +1 -1 +1 +1 -1 +1 +1 +1 -1 -1 -1 +j -1 -1 +j -1<br>+1 -j +1 -1 +j -1 +j +1 +j +j +1 +j -j -1 -j +j +1 +j -1 +1 +1 +1 -1 -1 -1 +1 +1 -1 +1 +1 -j +j +j +j -j -j -j +j +j -j +j +j +j<br>+1 +j -j -1 -j -j -1 -j -j -1 -j -1 +j -1 +1 -j +1 +1 -j +1 +1 -j +1 -j +j +j +j -j -j -j +j +j -j +j +j -1 +1 +1 +1 -1 -1 -1 +1 +1 -<br>1 +1 +1 -1 +j -1 +1 -j +1 +1 -j +1 +1 -j +1 +j +1 +j -j -1 -j -j -1 -j -j -1 -j |

| The Sequence $Seq^{6}_{left}$, 595(k), to be transmitted from left to right, up to down |
| --- |
| +1 -j +1 +1 -j +j +1 -1 -j +j -j -1 +j +j +1 -1 +1 +1 -1 +1 -1 -1 -j +j +j -1 +j -1 +j +1 +j -j +j +j -1 +1 +1 +j +1 +j +1 -j<br>+1 +1 -1 -1 -j +j +j -1 +j -1 +j +1 +j +j -j -j +1 -1 -1 -j -1 -j -1 +j -1 +j -j -j -1 +1 +1 -j -1 -j +1 -j +1 -1 +1 +1 -j +j +j +1<br>-j +1 +j +1 +j +j -j -j -1 +1 +1 -j -1 -j +1 -j +1 +1 -1 -1 +j -j -j -1 +j -1 -j -1 -j -1 +1 +1 -j +j +j -1 +j -1 -j -1 -j +j -j -j -1<br>+1 +1 +j +1 +j -1 +j -1 -1 +1 +1 -j +j +j -1 +j -1 -j -1 -j -j +j +j +1 -1 -1 -j -1 -j +1 -j +1 -j +j +j -1 +1 +1 -j -1 -j -1 +j -1<br>+1 -1 -1 -j +j +j +1 -j +1 -j -1 -j -j +j +j -1 +1 +1 -j -1 -j -1 +j -1 -1 +1 +1 +j -j -j -1 +j -1 +j +1 +j +j -j -j +1 -1 -1 -j -1 -j<br>-1 +j -1 +1 -1 -1 -j +j +j -1 +j -1 +j +1 +j +j -j -j +1 -1 -1 -j -1 -j -1 +j -1 -1 +1 +1 +j -j -j +1 -j +1 -j -1 -j -1 +1 +1 -j +j<br>+j +1 -j +1 +j +1 +j -j +j +j +1 -1 -1 +j +1 +j -1 +j -1 -1 +1 +1 -j +j +j +1 -j +1 +j +1 +j +j -j -j -1 +1 +1 -j -1 -j +1 -j +1<br>-j +j +j +1 -1 -1 -j -1 -j +1 -j +1 -1 +1 +1 -j +j +j -1 +j -1 -j -1 -j -j +j +j +1 -1 -1 -j -1 -j +1 -j +1 +1 -1 -1 +j -j -j +1 -j +1<br>+j +1 +j +1 -1 -1 -j +j +j +1 -j +1 -j -1 -j +j -j -j +1 -1 -1 +j +1 +j +1 -j +1 +1 -1 -1 -j +j +j +1 -j +1 -j -1 -j -j +j +j -1 +1<br>+1 -j -1 -j -1 +j -1 +1 -1 -1 -j +j +j -1 +j -1 +j +1 +j -j +j +j -1 +1 +1 +j +1 +j +1 -j +1 +1 -1 -1 -j +j +j -1 +j -1 +j +1 +j<br>+j -j -j +1 -1 -1 -j -1 -j -1 +j -1 +j -j -j -1 +1 +1 -j -1 -j +1 -j +1 -1 +1 +1 -j +j +j +1 -j +1 +j +1 +j +j -j -j -1 +1 +1 -j -1 -j<br>+1 -j +1 +1 -1 -1 +j -j -j -1 +j -1 -j -1 -j -1 +1 +1 -j +j +j -1 +j -1 -j -1 -j +j -j -j -1 +1 +1 +j +1 +j -1 +j -1 -1 +1 +1 -j +j<br>+j -1 +j -1 -j -1 -j -j +j +j +1 -1 -1 -j -1 -j +1 -j +1 -j +j +j -1 +1 +1 -j -1 -j -1 +j -1 +1 -1 -1 -j +j +j +1 -j +1 -j -1 -j -j +j<br>+j -1 +1 +1 -j -1 -j -1 +j -1 -1 +1 +1 +j -j -j -1 +j -1 +j +1 +j |

FIG. 19

The Sequence $Seq^{7}_{left}$ , 595(k), to be transmitted from left to right, up to down +j -j +j -1 -1 +1 +j +1 -1 -j +j -j -j -j -j -1 +1 +1 +1 +1 -1 -1 -1 +1 +1 -j +j +j +j -j -j +j -j -j +j -j -j +1 -1 -1 +1 -1 -1 -j +j
+j +j -j -j +1 -1 -1 -1 +1 +1 +1 -1 -1 +1 -1 -1 +j -j -j +j -j -j +j -j -j -j +j +j -1 +1 +1 +1 -1 -1 +1 -1 -1 +1 -1 -1 +j -j -j +j -
j -j +1 -1 -1 -1 +1 +1 -j +j +j +j -j -j -j +j +j -j +j +j -1 +1 +1 -1 +1 +1 +1 -j +1 +1 -j +1 -j -1 -j -j -1 -j +j +1 +j -j -1 -j +1
-j +1 -1 +j -1 -j -1 -j -j -1 -j +1 -j +1 +1 -j +1 +1 -j +1 -1 +j -1 +j +1 +j -j -1 -j +j +1 +j +j +1 +j -1 +j -1 -1 +j -1 +1 -j +1
-1 +j -1 +j +1 +j -j -1 -j +1 -j +1 +1 -j +1 -j -1 -j -j -1 -j -j -1 -j +j +1 +j -1 +j -1 +1 -j +1 +1 -1 -1 -1 +1 +1 -j +j +j +j -j -j
+j -j -j +j -j -j +1 -1 -1 +1 -1 -1 -j +j +j +j -j -j +1 -1 -1 -1 +1 +1 +1 -1 -1 +1 -1 -1 +j -j -j +j -j -j +j -j -j -j +j +j -1 +1 +1
+1 -1 -1 +1 -1 -1 +1 -1 -1 +j -j -j +j -j -j +1 -1 -1 -1 +1 +1 -j +j +j +j -j -j -j +j +j -j +j +j -1 +1 +1 -1 +1 +1 +1 -j +1 +1 -j
+1 -j -1 -j -j -1 -j +j +1 +j -j -1 -j +1 -j +1 -1 +j -1 -j -1 -j -j -1 -j +1 -j +1 +1 -j +1 +1 -j +1 -1 +j -1 +j +1 +j -j -1 -j +j +1
+j +j +1 +j -1 +j -1 -1 +j -1 +1 -j +1 -1 +j -1 +j +1 +j -j -1 -j +1 -j +1 +1 -j +1 -j -1 -j -j -1 -j -j -1 -j +j +1 +j -1 +j -1 +1
-j +1 -1 +1 +1 +1 -1 -1 +j -j -j -j +j +j -j +j +j -j +j +j -1 +1 +1 -1 +1 +1 +j -j -j -j +j +j -1 +1 +1 +1 -1 -1 -1 +1 +1 -1
+1 +1 -j +j +j -j +j +j -j +j +j +j -j -j +1 -1 -1 -1 +1 +1 -1 +1 +1 -1 +1 +1 -j +j +j -j +j +j -1 +1 +1 +1 -1 -1 +j -j -j -j +j
+j +j -j -j +j -j -j +1 -1 -1 +1 -1 -1 -1 +j -1 -1 +j -1 +j +1 +j +j +1 +j -j -1 -j +j +1 +j -1 +j -1 +1 -j +1 +j +1 +j +j +1 +j -1
+j -1 -1 +j -1 -1 +j -1 +1 -j +1 -j -1 -j +j +1 +j -j -1 -j -j -1 -j +1 -j +1 +1 -j +1 -1 +j -1 +1 -j +1 -j -1 -j +j +1 +j -1 +j -1
-1 +j -1 +j +1 +j +j +1 +j +j +1 +j -j -1 -j +1 -j +1 -1 +j -1

The Sequence $Seq^{8}_{left}$ , 595(k), to be transmitted from left to right, up to down -1 +j +j +1 +1 -1 -j +j -j -1 -j +j -1 +j -j +j -1 +j +1 +1 -1 -1 -1 +1 +1 +j -j -j -j +j +j -1 +j -1 -1 +j -1 -j -1 -j -j -1 -j -j +j
+j +j -j -j -1 +1 +1 +1 -1 -1 +j +1 +j +j +1 +j +1 -j +1 +1 -j +1 -j +j +j -j +j +j -1 +1 +1 -1 +1 +1 +j +1 +j -j -1 -j +1 -j
+1 -1 +j -1 -1 +1 +1 -1 +1 +1 -j +j +j -j +j +j +1 -j +1 -1 +j -1 +j +1 +j -j -1 -j +1 -1 -1 -1 +1 +1 +j -j -j -j +j +j -1 +j -1 -
1 +j -1 -j -1 -j -j -1 -j +j -j -j -j +j +j +1 -1 -1 -1 +1 +1 -j -1 -j -j -1 -j -1 +j -1 -1 +j -1 -j +j +j -j +j +j -1 +1 +1 -1 +1 +1
+j +1 +j -j -1 -j +1 -j +1 -1 +j -1 +1 -1 -1 +1 -1 -1 +j -j -j +j -j -j -1 +j -1 +1 -j +1 -j -1 -j +j +1 +j +1 -1 -1 -1 +1 +1 +j -j
-j -j +j +j -1 +j -1 -1 +j -1 -j -1 -j -j -1 -j -j +j +j +j -j -j -1 +1 +1 +1 -1 -1 +j +1 +j +j +1 +j +1 -j +1 +1 -j +1 -j +j +j -j +j
+j -1 +1 +1 -1 +1 +1 +j +1 +j -j -1 -j +1 -j +1 -1 +j -1 -1 +1 +1 -1 +1 +1 -j +j +j -j +j +j +1 -j +1 -1 +j -1 +j +1 +j -j -1 -j
+1 -1 -1 -1 +1 +1 +j -j -j -j +j +j -1 +j -1 -1 +j -1 -j -1 -j -j -1 -j +j -j -j -j +j +j +1 -1 -1 -1 +1 +1 -j -1 -j -j -1 -j -1 +j -1 -1
+j -1 -j +j +j -j +j +j -1 +1 +1 -1 +1 +1 +j +1 +j -j -1 -j +1 -j +1 -1 +j -1 +1 -1 -1 +1 -1 -1 +j -j -j +j -j -j -1 +j -1 +1 -j +1
-j -1 -j +j +1 +j -1 +1 +1 +1 -1 -1 -j +j +j +j -j -j +1 -j +1 +1 -j +1 +j +1 +j +j +1 +j +j -j -j -j +j +j +1 -1 -1 -1 +1 +1 -j -
1 -j -j -1 -j -1 +j -1 -1 +j -1 +j -j -j +j -j -j +1 -1 -1 +1 -1 -1 -j -1 -j +j +1 +j -1 +j -1 +1 -j +1 +1 -1 -1 +1 -1 -1 +j -j -j +j -
j -j -1 +j -1 +1 -j +1 -j -1 -j +j +1 +j -1 +1 +1 +1 -1 -1 -j +j +j +j -j -j +1 -j +1 +1 -j +1 +j +1 +j +j +1 +j -j +j +j +j -j -j -
1 +1 +1 +1 -1 -1 +j +1 +j +j +1 +j +1 -j +1 +1 -j +1 +j -j -j +j -j -j +1 -1 -1 +1 -1 -1 -j -1 -j +j +1 +j -1 +j -1 +1 -j +1 -1
+1 +1 -1 +1 +1 -j +j +j -j +j +j +1 -j +1 -1 +j -1 +j +1 +j -j -1 -j

FIG. 20

The Sequence $Seq^{1}_{right}$, 595(k), to be transmitted from left to right, up to down -j -1 -j +j +j -j -1 +j -1 -1 -1 +1 +1 -j +1 -1 -1 +1 +j +1 +j +j +j -j -j -1 -j +j +j -j -1 +j -1 -1 -1 +1 -1 +j -1 +1 +1 -1 -j -1 -j
-j -j +j +j +1 +j -j -j +j +1 -j +1 +1 +1 -1 -1 +j -1 +1 +1 -1 -j -1 -j -j -j +j -j -1 -j +j +j -j -1 +j -1 -1 -1 +1 -1 +j -1 +1 +1 -1
-j -1 -j -j -j +j +1 -j +1 -1 -1 +1 -j -1 -j -j -j +j +j +1 +j -j -j +j -1 +j -1 -1 -1 +1 +1 -j +1 -1 -1 +1 -j -1 -j -j -j +j -j -1 -j +j
+j -j +1 -j +1 +1 +1 -1 +1 -j +1 -1 -1 +1 -j -1 -j -j -j +j +j +1 +j -j -j +j -1 +j -1 -1 -1 +1 -1 +j -1 +1 +1 -1 +j +1 +j +j +j -j
+j +1 +j -j -j +j -1 +j -1 -1 -1 +1 +1 -j +1 -1 -1 +1 -j -1 -j -j -j +j +j +1 +j -j -j +j -1 +j -1 -1 -1 +1 +1 -j +1 -1 -1 +1 -j -1 -j
-j -j +j -j -1 -j +j +j -j +1 -j +1 +1 +1 -1 -1 +j -1 +1 +1 -1 +j +1 +j +j +j -j -j -1 -j +j +j -j +1 -j +1 +1 +1 -1 +1 -j +1 -1 -1
+1 -j -1 -j -j -j +j -j -1 -j +j +j -j +1 -j +1 +1 +1 -1 +j +1 +j -j -j +j +1 -j +1 +1 +1 -1 -1 +j -1 +1 +1 -1 -j -1 -j -j -j +j +j +1
+j -j -j +j +1 -j +1 +1 +1 -1 +1 -j +1 -1 -1 +1 +j +1 +j +j +j -j +j +1 +j -j -j +j +1 -j +1 +1 +1 -1 -1 +j -1 +1 +1 -1 -j -1 -j
-j -j +j -j -1 -j +j +j -j -1 +j -1 -1 -1 +1 -1 +j -1 +1 +1 -1 -j -1 -j -j -j +j -j -1 -j +j +j -j -1 +j -1 -1 -1 +1 +1 -j +1 -1 -1 +1
+j +1 +j +j +j -j -j -1 -j +j +j -j -1 +j -1 -1 -1 +1 -1 +j -1 +1 +1 -1 -j -1 -j -j -j +j +j +1 +j -j -j +j +1 -j +1 +1 +1 -1 -1 +j -1
+1 +1 -1 -j -1 -j -j -j +j -j -1 -j +j +j -j -1 +j -1 -1 -1 +1 -1 +j -1 +1 +1 -1 -j -1 -j -j -j +j +1 -j +1 -1 -1 +1 -j -1 -j -j -j +j +j
+1 +j -j -j +j -1 +j -1 -1 -1 +1 +1 -j +1 -1 -1 +1 -j -1 -j -j -j +j -j -1 -j +j +j -j +1 -j +1 +1 +1 -1 +1 -j +1 -1 -1 +1 -j -1 -j -j
-j +j +j +1 +j -j -j +j -1 +j -1 -1 -1 +1 -1 +j -1 +1 +1 -1 +j +1 +j +j +j -j +j +1 +j -j -j +j -1 +j -1 -1 -1 +1 -1 +1 +j +j -1
+1 +1 +j -j +j -1 +j +1 +1 +j +1 +j -1 -j The Sequence $Seq^{2}_{right}$, 595(k), to be transmitted from left to right, up to down -j -1 -j -j -1 -j -j -1 -j +j +1 +j -j -1 -j -j -1 -j +j +1 +j -j -1 -j -1 +j -1 -1 +j -1 -1 +j -1 +1 -j +1 +1 -j +1 +1 -j +1 -1 +j -1
+1 -j +1 +j +1 +j +j +1 +j +j +1 +j -j -1 -j +j +1 +j +j +1 +j -j -1 -j +j +1 +j -1 +j -1 -1 +j -1 -1 +j -1 +1 -j +1 +1 -j +1 +1
-j +1 -1 +j -1 +1 -j +1 +1 +1 -1 +1 +1 -1 +1 +1 -1 -1 -1 +1 +1 +1 -1 +1 +1 -1 -1 -1 +1 +1 +1 -1 -j -j +j -j -j +j -j -j +j +j
+j -j +j +j -j +j +j -j -j -j +j +j +j -j +1 +1 -1 +1 +1 -1 +1 +1 -1 -1 -1 +1 +1 +1 -1 +1 +1 -1 -1 -1 +1 +1 +1 -1 +j +j -j +j +j
-j +j +j -j -j -j +j -j -j +j -j -j +j +j +j -j -j -j +j +1 -j +1 +1 -j +1 +1 -j +1 -1 +j -1 +1 -j +1 +1 -j +1 -1 +j -1 +1 -j +1 -j -1
-j -j -1 -j -j -1 -j +j +1 +j +j +1 +j +j +1 +j -j -1 -j +j +1 +j -1 +j -1 -1 +j -1 -1 +j -1 +1 -j +1 -1 +j -1 -1 +j -1 +1 -j +1 -1
+j -1 -j -1 -j -j -1 -j -j -1 -j +j +1 +j +j +1 +j +j +1 +j -j -1 -j +j +1 +j +j +j -j +j +j -j +j +j -j -j -j +j +j +j -j +j +j -j -j -j +j
+j +j -j +1 +1 -1 +1 +1 -1 +1 +1 -1 -1 -1 +1 -1 -1 +1 -1 -1 +1 +1 +1 -1 -1 -1 +1 +j +j -j +j +j -j +j +j -j -j -j +j +j +j -j +j
+j -j -j -j +j +j +j -j -1 -1 +1 -1 -1 +1 -1 -1 +1 +1 +1 -1 +1 +1 -1 +1 +1 -1 -1 -1 +1 +1 +1 -1 -j -1 -j -j -1 -j -j -1 -j +j +1
+j -j -1 -j -j -1 -j +j +1 +j -j -1 -j -1 +j -1 -1 +j -1 -1 +j -1 +1 -j +1 +1 -j +1 +1 -j +1 -1 +j -1 +1 -j +1 +j +1 +j +j +1 +j +j
+1 +j -j -1 -j +j +1 +j +j +1 +j -j -1 -j +j +1 +j -1 +j -1 -1 +j -1 -1 +j -1 +1 -j +1 +1 -j +1 +1 -j +1 -1 +j -1 +1 -j +1 +1 +1
-1 +1 +1 -1 +1 +1 -1 -1 -1 +1 +1 +1 -1 +1 +1 -1 -1 -1 +1 +1 +1 -1 -j -j +j -j -j +j -j -j +j +j +j -j +j +j -j +j +j -j -j -j +j +j
+j -j +1 +1 -1 +1 +1 -1 +1 +1 -1 -1 -1 +1 +1 +1 -1 +1 +1 -1 -1 -1 +1 +1 +1 -1 +j +j -j +j +j -j +j +j -j -j -j +j -j -j +j -j -j
+j +j +j -j -j -j +j -1 -j +j -1 +1 -1 -1 +j -1 +j -j -1 +1 +1 -1 +1 -j -j +1

The Sequence $Seq^{3}_{right}$, 595(k), to be transmitted from left to right, up to down +1 -j +1 +j +1 +j +1 -j +1 -j -1 -j -j -1 -j -1 +j -1 -j -1 -j +1 -j +1 -1 +j -1 -j -1 -j -1 +j -1 +j +1 +j -j -1 -j -1 +j -1 -j -1 -j
+1 -j +1 -1 -1 +1 -j -j +j -1 -1 +1 +j +j -j +j +j -j +1 +1 -1 +j +j -j -1 -1 +1 -1 -1 +1 -j -j +j -1 -1 +1 +j +j -j -j -j +j -1 -1
+1 -j -j +j +1 +1 -1 -j -1 -j +1 -j +1 +j +1 +j +1 -j +1 -1 +j -1 +j +1 +j +1 -j +1 +j +1 +j +j +1 +j -1 +j -1 -j -1 -j -1 +j -1
-1 +j -1 +j +1 +j +1 -j +1 +j +1 +j +j +j -j -1 -1 +1 -j -j +j -1 -1 +1 +1 +1 -1 -j -j +j -1 -1 +1 -j -j +j +j +j -j -1 -1 +1 -j -j
+j -1 -1 +1 -1 -1 +1 +j +j -j +1 +1 -1 +j +j -j -1 +j -1 -j -1 -j -1 +j -1 +j +1 +j +j +1 +j +1 -j +1 +j +1 +j -1 +j -1 +1 -j +1
+j +1 +j +1 -j +1 -j -1 -j +j +1 +j +1 -j +1 +j +1 +j -1 +j -1 +1 +1 -1 +j +j -j +1 +1 -1 -j -j +j -j -j +j -1 -1 +1 -j -j +j +1 +1
-1 +1 +1 -1 +j +j -j +1 +1 -1 -j -j +j +j +j -j +1 +1 -1 +j +j -j -1 -1 +1 +j +1 +j -1 +j -1 -j -1 -j -1 +j -1 +1 -j +1 -j -1 -j -1
+j -1 -j -1 -j -j -1 -j +1 -j +1 +j +1 +j +1 -j +1 +1 -j +1 -j -1 -j -1 +j -1 -j -1 -j -j -j +j +1 +1 -1 +j +j -j +1 +1 -1 -1 -1 +1 +j
+j -j +1 +1 -1 +j +j -j -j -j +j +1 +1 -1 +j +j -j +1 +1 -1 +1 +1 -1 -j -j +j -1 -1 +1 -j -j +j -1 +j -1 -j -1 -j -1 +j -1 +j +1 +j
+j +1 +j +1 -j +1 +j +1 +j -1 +j -1 +1 -j +1 +j +1 +j +1 -j +1 -j -1 -j +j +1 +j +1 -j +1 +j +1 +j -1 +j -1 +1 +1 -1 +j +j -j
+1 +1 -1 -j -j +j -j -j +j -1 -1 +1 -j -j +j +1 +1 -1 +1 +1 -1 +j +j -j +1 +1 -1 -j -j +j +j +j -j +1 +1 -1 +j +j -j -1 -1 +1 +j +1
+j -1 +j -1 -j -1 -j -1 +j -1 +1 -j +1 -j -1 -j -1 +j -1 -j -1 -j -j -1 -j +1 -j +1 +j +1 +j +1 -j +1 +1 -j +1 -j -1 -j -1 +j -1 -j -1
-j -j -j +j +1 +1 -1 +j +j -j +1 +1 -1 -1 -1 +1 +j +j -j +1 +1 -1 +j +j -j -j -j +j +1 +1 -1 +j +j -j +1 +1 -1 +1 +1 -1 -j -j +j -1
-1 +1 -j -j +j -j -j +j +1 -1 -1 -j +j -j +j -1 +j +1 +1 +1 -1 +1 -1 -j

FIG. 21

| The Sequence $Seq^{4}_{right}$, 595(k), to be transmitted from left to right, up to down |
| --- |
| +1 -j +1 +j +1 +j +j +1 +j +1 -j +1 +1 +1 -1 +j +j -j +j +j -j +1 +1 -1 +j +1 +j +1 -j +1 -1 +j -1 -j -1 -j -j -j +j -1 -1 +1 +1<br>+1 -1 +j +j -j +1 -j +1 +j +1 +j +j +1 +j +1 -j +1 +1 +1 -1 +j +j -j +j +j -j +1 +1 -1 +j +1 +j +1 -j +1 -1 +j -1 -j -1 -j -j -j<br>+j -1 -1 +1 +1 +1 -1 +j +j -j +1 -j +1 +j +1 +j -j -1 -j -1 +j -1 +1 +1 -1 +j +j -j -j -j +j -1 -1 +1 +j +1 +j +1 -j +1 +1 -j +1<br>+j +1 +j -j -j +j -1 -1 +1 -1 -1 +1 -j -j +j -1 +j -1 -j -1 -j +j +1 +j +1 -j +1 -1 -1 +1 -j -j +j +j +j -j +1 +1 -1 -j -1 -j -1 +j -1<br>-1 +j -1 -j -1 -j +j +j -j +1 +1 -1 +1 +1 -1 +j +j -j -1 +j -1 -j -1 -j -j -1 -j -1 +j -1 -1 -1 +1 -j -j +j -j -j +j -1 -1 +1 -j -1 -j -1<br>+j -1 +1 -j +1 +j +1 +j +j +j -j +1 +1 -1 -1 -1 +1 -j -j +j -1 +j -1 -j -1 -j -j -1 -j -1 +j -1 -1 -1 +1 -j -j +j -j -j +j -1 -1 +1 -j<br>-1 -j -1 +j -1 +1 -j +1 +j +1 +j +j +j -j +1 +1 -1 -1 -1 +1 -j -j +j -1 +j -1 -j -1 -j +j +1 +j +1 -j +1 -1 -1 +1 -j -j +j +j +j -j<br>+1 +1 -1 -j -1 -j -1 +j -1 -1 +j -1 -j -1 -j +j +j -j +1 +1 -1 +1 +1 -1 +j +j -j +1 -j +1 +j +1 +j -j -1 -j -1 +j -1 +1 +1 -1 +j +j<br>-j -j -j +j -1 -1 +1 +j +1 +j +1 -j +1 +1 -j +1 +j +1 +j -j -j +j -1 -1 +1 -1 -1 +1 -j -j +j -1 +j -1 -j -1 -j -j -1 -j -1 +j -1 -1 -1<br>+1 -j -j +j -j -j +j -1 -1 +1 -j -1 -j -1 +j -1 +1 -j +1 +j +1 +j +j +j -j +1 +1 -1 -1 -1 +1 -j -j +j -1 +j -1 -j -1 -j -j -1 -j -1 +j -1<br>-1 -1 +1 -j -j +j -j -j +j -1 -1 +1 -j -1 -j -1 +j -1 +1 -j +1 +j +1 +j +j +j -j +1 +1 -1 -1 -1 +1 -j -j +j -1 +j -1 -j -1 -j +j +1 +j<br>+1 -j +1 -1 -1 +1 -j -j +j +j +j -j +1 +1 -1 -j -1 -j -1 +j -1 -1 +j -1 -j -1 -j +j +j -j +1 +1 -1 +1 +1 -1 +j +j -j +1 -j +1 +j +1<br>+j -j -1 -j -1 +j -1 +1 +1 -1 +j +j -j -j -j +j -1 -1 +1 +j +1 +j +1 -j +1 +1 -j +1 +j +1 +j -j -j +j -1 -1 +1 -1 -1 +1 -j -j +j -j -<br>1 +j +1 +j -1 +1 +1 +j +1 -j -j +1 +1 +1 +j +1 -1 -1 |

| The Sequence $Seq^{5}_{right}$, 595(k), to be transmitted from left to right, up to down |
| --- |
| +1 -1 -1 +1 -1 -1 +1 -1 -1 -1 +1 +1 -j +j +j -j +j +j -j +j +j +j -j -j -j -1 -j -j -1 -j +j +1 +j -j -1 -j -1 +j -1 -1 +j -1 +1 -j +1<br>-1 +j -1 -j +j +j -j +j +j -j +j +j +j -j -j +1 -1 -1 +1 -1 -1 +1 -1 -1 -1 +1 +1 -1 +j -1 -1 +j -1 +1 -j +1 -1 +j -1 -j -1 -j -j -1 -j<br>+j +1 +j -j -1 -j -1 +1 +1 +1 -1 -1 -1 +1 +1 -1 +1 +1 +j -j -j -j +j +j +j -j -j +j -j -j +j +1 +j -j -1 -j -j -1 -j -j -1 -j +1 -j +1<br>-1 +j -1 -1 +j -1 -1 +j -1 -j +j +j +j -j -j -j +j +j -j +j +j +1 -1 -1 -1 +1 +1 +1 -1 -1 +1 -1 -1 -1 +j -1 +1 -j +1 +1 -j +1 +1 -j<br>+1 -j -1 -j +j +1 +j +j +1 +j +j +1 +j -1 +1 +1 -1 +1 +1 -1 +1 +1 +1 -1 -1 +j -j -j +j -j -j +j -j -j -j +j +j +j +1 +j +j +1 +j<br>-j -1 -j +j +1 +j +1 -j +1 +1 -j +1 -1 +j -1 +1 -j +1 +j -j -j +j -j -j +j -j -j -j +j +j -1 +1 +1 -1 +1 +1 -1 +1 +1 +1 -1 -1 +1 -j<br>+1 +1 -j +1 -1 +j -1 +1 -j +1 +j +1 +j +j +1 +j -j -1 -j +j +1 +j +1 -1 -1 -1 +1 +1 +1 -1 -1 +1 -1 -1 -j +j +j +j -j -j -j +j +j<br>-j +j +j -j -1 -j +j +1 +j +j +1 +j +j +1 +j -1 +j -1 +1 -j +1 +1 -j +1 +1 -j +1 +j -j -j -j +j +j +j -j -j +j -j -j -1 +1 +1 +1 -1<br>-1 -1 +1 +1 -1 +1 +1 +1 -j +1 -1 +j -1 -1 +j -1 -1 +j -1 +j +1 +j -j -1 -j -j -1 -j -j -1 -j -1 +1 +1 -1 +1 +1 -1 +1 +1 +1 -1 -1<br>+j -j -j +j -j -j +j -j -j -j +j +j +j +1 +j +j +1 +j -j -1 -j +j +1 +j +1 -j +1 +1 -j +1 -1 +j -1 +1 -j +1 +j -j -j +j -j -j +j -j -j -j<br>+j +j -1 +1 +1 -1 +1 +1 -1 +1 +1 +1 -1 -1 +1 -j +1 +1 -j +1 -1 +j -1 +1 -j +1 +j +1 +j +j +1 +j -j -1 -j +j +1 +j +1 -1 -1 -1<br>+1 +1 +1 -1 -1 +1 -1 -1 -j +j +j +j -j -j -j +j +j -j +j +j -j -1 -j +j +1 +j +j +1 +j +j +1 +j -1 +j -1 +1 -j +1 +1 -j +1 +1 -j<br>+1 +j -j -j -j +j +j +j -j -j +j -j -j -1 +1 +1 +1 -1 -1 -1 +1 +1 -1 +1 +1 +1 -j +1 -1 +j -1 -1 +j -1 -1 +j -1 +j +1 +j -j -1 -j -j<br>-1 -j -j -1 -j -1 -j +1 -j -1 +1 +j -j +1 +j -1 -j +1 +1 +1 -j +j +j +j |

| The Sequence $Seq^{6}_{right}$, 595(k), to be transmitted from left to right, up to down |
| --- |
| +1 -1 -1 -j +j +j -1 +j -1 +j +1 +j -j +j +j -1 +1 +1 +j +1 +j +1 -j +1 -1 +1 +1 +j -j -j +1 -j +1 -j -1 -j -j +j +j -1 +1 +1 +j<br>+1 +j +1 -j +1 +j -j -j -1 +1 +1 -j -1 -j +1 -j +1 -1 +1 +1 -j +j +j +1 -j +1 +j +1 +j -j +j +j +1 -1 -1 +j +1 +j -1 +j -1 -1 +1<br>+1 -j +j +j +1 -j +1 +j +1 +j -1 +1 +1 -j +j +j -1 +j -1 -j -1 -j +j -j -j -1 +1 +1 +j +1 +j -1 +j -1 +1 -1 -1 +j -j -j +1 -j +1 +j<br>+1 +j +j -j -j -1 +1 +1 +j +1 +j -1 +j -1 -j +j +j -1 +1 +1 -j -1 -j -1 +j -1 +1 -1 -1 -j +j +j +1 -j +1 -j -1 -j +j -j -j +1 -1 -1<br>+j +1 +j +1 -j +1 +1 -1 -1 -j +j +j +1 -j +1 -j -1 -j -1 +1 +1 +j -j -j +1 -j +1 -j -1 -j +j -j -j +1 -1 -1 -j -1 -j -1 +j -1 +1 -1 -1<br>-j +j +j -1 +j -1 +j +1 +j +j -j -j +1 -1 -1 -j -1 -j -1 +j -1 -j +j +j +1 -1 -1 +j +1 +j -1 +j -1 +1 -1 -1 +j -j -j -1 +j -1 -j -1 -j<br>+j -j -j -1 +1 +1 -j -1 -j +1 -j +1 +1 -1 -1 +j -j -j -1 +j -1 -j -1 -j +1 -1 -1 +j -j -j +1 -j +1 +j +1 +j -j +j +j +1 -1 -1 -j -1 -j<br>+1 -j +1 -1 +1 +1 -j +j +j -1 +j -1 -j -1 -j -j +j +j +1 -1 -1 -j -1 -j +1 -j +1 +j -j -j +1 -1 -1 +j +1 +j +1 -j +1 -1 +1 +1 +j -j<br>-j -1 +j -1 +j +1 +j -j +j +j -1 +1 +1 -j -1 -j -1 +j -1 -1 +1 +1 +j -j -j -1 +j -1 +j +1 +j -1 +1 +1 +j -j -j +1 -j +1 -j -1 -j +j -j<br>-j +1 -1 -1 -j -1 -j -1 +j -1 +1 -1 -1 -j +j +j -1 +j -1 +j +1 +j +j -j -j +1 -1 -1 -j -1 -j -1 +j -1 -j +j +j +1 -1 -1 +j +1 +j -1 +j<br>-1 +1 -1 -1 +j -j -j -1 +j -1 -j -1 -j +j -j -j -1 +1 +1 -j -1 -j +1 -j +1 +1 -1 -1 +j -j -j -1 +j -1 -j -1 -j +1 -1 -1 +j -j -j +1 -j +1<br>+j +1 +j -j +j +j +1 -1 -1 -j -1 -j +1 -j +1 -1 +1 +1 -j +j +j -1 +j -1 -j -1 -j -j +j +j +1 -1 -1 -j -1 -j +1 -j +1 +j -j -j +1 -1 -1<br>+j +1 +j +1 -j +1 -1 +1 +1 +j -j -j -1 +j -1 +j +1 +j -j +j +j -1 +1 +1 -j -1 -j -1 +j -1 -1 +1 +1 +j -j -j -1 +j -1 +j +1 +j +1<br>+1 +1 +j +j -1 +j +1 -j +1 +j -1 +1 +1 +1 +j -j +j +j |

FIG. 22

| The Sequence $Seq^{7}_{right}$, 595(k), to be transmitted from left to right, up to down |
|---|
| -j +j +j +j -j -j -1 +1 +1 +1 -1 -1 +1 -1 -1 +1 -1 -1 -j +j +j -j +j +j +1 -1 -1 -1 +1 +1 +j -j -j -j +j +j +j -j -j +j -j -j -1 +1 +1<br>-1 +1 +1 +1 -1 -1 -1 +1 +1 +j -j -j -j +j +j -j +j +j -j +j +j +1 -1 -1 +1 -1 -1 +j -j -j -j +j +j +1 -1 -1 -1 +1 +1 +1 -1 -1 +1<br>-1 -1 -j +j +j -j +j +j -j -1 -j -j -1 -j -1 +j -1 -1 +j -1 +1 -j +1 -1 +j -1 -j -1 -j +j +1 +j +1 -j +1 +1 -j +1 +j +1 +j +j +1 +j +j<br>+1 +j -j -1 -j -1 +j -1 +1 -j +1 +1 -j +1 +1 -j +1 +j +1 +j +j +1 +j -j -1 -j +j +1 +j +1 -j +1 -1 +j -1 +j +1 +j +j +1 +j +1 -j<br>+1 +1 -j +1 +1 -j +1 -1 +j -1 -j -1 -j +j +1 +j +1 -1 -1 -1 +1 +1 -j +j +j +j -j -j +j -j -j +j -j -j +1 -1 -1 +1 -1 -1 +j -j -j -j +j<br>+j -1 +1 +1 +1 -1 -1 -1 +1 +1 -1 +1 +1 -j +j +j -j +j +j +j -j -j -j +j +j -1 +1 +1 +1 -1 -1 +1 -1 -1 +1 -1 -1 +j -j -j +j -j -j<br>-1 +1 +1 +1 -1 -1 +j -j -j -j +j +j +j -j -j +j -j -j +1 -1 -1 +1 -1 -1 +1 -j +1 +1 -j +1 -j -1 -j -j -1 -j +j +1 +j -j -1 -j +1 -j +1<br>-1 +j -1 +j +1 +j +j +1 +j -1 +j -1 -1 +j -1 -1 +j -1 +1 -j +1 -j -1 -j +j +1 +j +j +1 +j +j +1 +j -1 +j -1 -1 +j -1 +1 -j +1 -1<br>+j -1 +j +1 +j -j -1 -j -1 +j -1 -1 +j -1 +j +1 +j +j +1 +j +j +1 +j -j -1 -j +1 -j +1 -1 +j -1 -j +j +j +j -j -j -1 +1 +1 +1 -1 -1<br>+1 -1 -1 +1 -1 -1 -j +j +j -j +j +j +1 -1 -1 -1 +1 +1 +j -j -j -j +j +j +j -j -j +j -j -j -1 +1 +1 -1 +1 +1 +1 -1 -1 -1 +1 +1 +j<br>-j -j -j +j +j -j +j +j -j +j +j +1 -1 -1 +1 -1 -1 +j -j -j -j +j +j +1 -1 -1 -1 +1 +1 +1 -1 -1 +1 -1 -1 -j +j +j -j +j +j -j -1 -j -j<br>-1 -j -1 +j -1 -1 +j -1 +1 -j +1 -1 +j -1 -j -1 -j +j +1 +j +1 -j +1 +1 -j +1 +j +1 +j +j +1 +j +j +1 +j -j -1 -j -1 +j -1 +1 -j +1<br>+1 -j +1 +1 -j +1 +j +1 +j +j +1 +j -j -1 -j +j +1 +j +1 -j +1 -1 +j -1 +j +1 +j +j +1 +j +1 -j +1 +1 -j +1 +1 -j +1 -1 +j -1<br>-j -1 -j +j +1 +j -1 +1 -1 +1 +j +j -1 -1 -j +1 -1 +j +1 +1 -1 -j +j +j +1 |

| The Sequence $Seq^{8}_{right}$, 595(k), to be transmitted from left to right, up to down |
|---|
| -j +j +j +j -j -j +1 -1 -1 -1 +1 +1 +j +1 +j +j +1 +j -1 +j -1 -1 +j -1 -1 +1 +1 +1 -1 -1 +j -j -j -j +j +j +1 -j +1 +1 -j +1 -j<br>-1 -j -j -1 -j -1 +1 +1 -1 +1 +1 +j -j -j +j -j -j +1 -j +1 -1 +j -1 -j -1 -j +j +1 +j +j -j -j +j -j -j -1 +1 +1 -1 +1 +1 -j -1 -j +j<br>+1 +j +1 -j +1 -1 +j -1 +j -j -j -j +j +j -1 +1 +1 +1 -1 -1 -j -1 -j -j -1 -j +1 -j +1 +1 -j +1 -1 +1 +1 +1 -1 -1 +j -j -j -j +j +j<br>+1 -j +1 +1 -j +1 -j -1 -j -j -1 -j +1 -1 -1 +1 -1 -1 -j +j +j -j +j +j -1 +j -1 +1 -j +1 +j +1 +j -j -1 -j +j -j -j +j -j -j -1 +1 +1<br>-1 +1 +1 -j -1 -j +j +1 +j +1 -j +1 -1 +j -1 +1 -1 -1 -1 +1 +1 +j -j -j -j +j +j -1 +j -1 -1 +j -1 -j -1 -j -j -1 -j -j +j +j +j -j -j<br>-1 +1 +1 +1 -1 -1 +j +1 +j +j +1 +j +1 -j +1 +1 -j +1 -j +j +j -j +j +j -1 +1 +1 -1 +1 +1 +j +1 +j -j -1 -j +1 -j +1 -1 +j -1<br>-1 +1 +1 -1 +1 +1 -j +j +j -j +j +j +1 -j +1 -1 +j -1 +j +1 +j -j -1 -j -1 +1 +1 +1 -1 -1 -j +j +j +j -j -j +1 -j +1 +1 -j +1 +j<br>+1 +j +j +1 +j -j +j +j +j -j -j -1 +1 +1 +1 -1 -1 +j +1 +j +j +1 +j +1 -j +1 +1 -j +1 +j -j -j +j -j -j +1 -1 -1 +1 -1 -1 -j -1 -j<br>+j +1 +j -1 +j -1 +1 -j +1 -1 +1 +1 -1 +1 +1 -j +j +j -j +j +j +1 -j +1 -1 +j -1 +j +1 +j -j -1 -j -j +j +j +j -j -j +1 -1 -1 -1 +1<br>+1 +j +1 +j +j +1 +j -1 +j -1 -1 +j -1 -1 +1 +1 +1 -1 -1 +j -j -j -j +j +j +1 -j +1 +1 -j +1 -j -1 -j -j -1 -j -1 +1 +1 -1 +1 +1<br>+j -j -j +j -j -j +1 -j +1 -1 +j -1 -j -1 -j +j +1 +j +j -j -j +j -j -j -1 +1 +1 -1 +1 +1 -j -1 -j +j +1 +j +1 -j +1 -1 +j -1 +j -j -j -j<br>+j +j -1 +1 +1 +1 -1 -1 -j -1 -j -j -1 -j +1 -j +1 +1 -j +1 -1 +1 +1 +1 -1 -1 +j -j -j -j +j +j +1 -j +1 +1 -j +1 -j -1 -j -j -1 -j<br>+1 -1 -1 +1 -1 -1 -j +j +j -j +j +j -1 +j -1 +1 -j +1 +j +1 +j -j -1 -j +j -j -j +j -j -j -1 +1 +1 -1 +1 +1 -j -1 -j +j +1 +j +1 -j<br>+1 -1 +j -1 +j +1 -1 +1 +1 -1 +1 -1 +j +j -1 -1 +1 +1 -1 -j -j -j +1 |

FIG. 23

| The Sequence $Seq^{1}_{left}$ , 804(k), to be transmitted from left to right, up to down |
| --- |
| -j +j +1 -1 +j -1 -j -j -1 +j -j +j +1 +1 +1 +j -1 -1 +j -1 +1 -1 +j +j -1 -j +1 +1 -j -1 +1 -1 +j +j -j +1 +j +j +1 +j -j +j +1<br>+1 +j -1 -j -j -1 +j -j +j +1 +1 +1 +j -1 -1 +j -1 +1 -1 +j +j +1 +j -1 -1 +j +1 -1 +1 -j -j +j -1 -j -j -1 -j +j -j -1 -1 -j +1 +j<br>+j +1 -j +j -j -1 -1 -1 -j +1 +1 -j +1 -1 +1 -j -j +1 +j -1 -1 +j +1 -1 +1 -j -j +j -1 -j -j -1 -j +j -j -1 -1 +j -1 -j -j -1 +j -j +j +1<br>+1 +1 +j -1 -1 +j -1 +1 -1 +j +j +1 +j -1 -1 +j +1 -1 +1 -j -j +j -1 -j -j -1 -j +j -j -1 -1 +j -1 -j -j -1 +j -j +j +1 +1 +1 +j -1<br>-1 +j -1 +1 -1 +j +j -1 -j +1 +1 -j -1 +1 -1 +j +j -j +1 +j +j +1 +j -j +j +1 +1 +j -1 -j -j -1 +j -j +j +1 +1 +1 +j -1 -1 +j -1<br>+1 -1 +j +j +1 +j -1 -1 +j +1 -1 +1 -j -j +j -1 -j -j -1 -j +j -j -1 -1 -j +1 +j +j +1 -j +j -j -1 -1 -1 -j +1 +1 -j +1 -1 +1 -j -j +1<br>+j -1 -1 +j +1 -1 +1 -j -j +j -1 -j -j -1 -j +j -j -1 -1 +j -1 -j -j -1 +j -j +j +1 +1 +1 +j -1 -1 +j -1 +1 -1 +j +j +1 +j -1 -1 +j<br>+1 -1 +1 -j -j +j -1 -j -j -1 -j +j -j -1 -1 +1 +j -1 -1 +j +1 -1 +1 -j -j -j +1 +j +j +1 +j -j +j +1 +1 +j -1 -j -j -1 +j -j +j +1 +1<br>-1 -j +1 +1 -j +1 -1 +1 -j -j +1 +j -1 -1 +j +1 -1 +1 -j -j -j +1 +j +j +1 +j -j +j +1 +1 -j +1 +j +j +1 -j +j -j -1 -1 +1 +j -1<br>-1 +j -1 +1 -1 +j +j -1 -j +1 +1 -j -1 +1 -1 +j +j +j -1 -j -j -1 -j +j -j -1 -1 -j +1 +j +j +1 -j +j -j -1 -1 +1 +j -1 -1 +j -1 +1<br>-1 +j +j +1 +j -1 -1 +j +1 -1 +1 -j -j -j +1 +j +j +1 +j -j +j +1 +1 -j +1 +j +j +1 -j +j -j -1 -1 +1 +j -1 -1 +j -1 +1 -1 +j +j<br>-1 -j +1 +1 -j -1 +1 -1 +j +j +j -1 -j -j -1 -j +j -j -1 -1 -j +1 +j +j +1 -j +j -j -1 -1 +1 +j -1 -1 +j -1 +1 -1 +j +j -1 -j +1 +1 -j<br>-1 +1 -1 +j +j +j -1 -j -j -1 -j +j -j -1 -1 +j -1 -j -j -1 +j -j +j +1 +1 -1 -j +1 +1 -j +1 -1 +1 -j -j +1 +j -1 -1 +j +1 -1 +1 -j -j<br>-j +1 +j +j +1 +j -j +j +1 +1 +j -1 -j -j -1 +j -j +j +1 +1 -1 -j +1 +1 -j +1 -1 +1 -j -j -1 -j +1 +1 -j -1 +1 -1 +j +j +j -1 -j -j<br>-1 -j +j -j -1 -1 +j -1 -j -j -1 +j -j +j +1 +1 -1 -j +1 +1 -j +1 -1 +1 -j -j +1 +j -1 -1 +j +1 -1 +1 -j -j -j +1 +j +j +1 +j -j +j<br>+1 +1 +j -1 -j -j -1 +j -j +j +1 +1 -1 -j +1 +1 -j +1 -1 +1 -j -j +1 +j -1 -1 +j +1 -1 +1 -j -j -j +1 +j +j +1 +j -j +j +1 +1 -j +1<br>+j +j +1 -j +j -j -1 -1 +1 +j -1 -1 +j -1 +1 -1 +j +j -1 -j +1 +1 -j -1 +1 -1 +j +j +j -1 -j -j -1 -j +j -j -1 -1 -j +1 +j +j +1 -j<br>+j -j -1 -1 +1 +j -1 -1 +j -1 +1 -1 +j +j +1 +j -1 -1 +j +1 -1 +1 -j -j -j +1 +j +j +1 +j -j +j +1 +1 -j +1 +j +j +1 -j +j -j -1<br>-1 +1 +j -1 -1 +j -1 +1 -1 +j +j |
| The Sequence $Seq^{2}_{left}$ , 804(k), to be transmitted from left to right, up to down |
| +1 -1 -1 +1 +j -1 -j -j -1 +j -1 -j -j -1 +1 +j -1 -1 +j +1 +j -1 -1 +j -j +1 +j +j +1 -j +1 +j +j +1 +1 +j -1 -1 +j +1 +j -1 -1<br>+j +j -1 -j -j -1 -j +1 +j +j +1 -1 -j +1 +1 -j +1 +j -1 -1 +j -j +1 +j +j +1 +j -1 -j -j -1 -1 -j +1 +1 -j +1 +j -1 -1 +j +1 -1 +1<br>-j -j +1 -1 +1 -j -j -j +j -j -1 -1 -j +j -j -1 -1 +1 -1 +1 -j -j +1 -1 +1 -j -j +j -j +j +1 +1 +j -j +j +1 +1 +1 -1 +1 -j -j -1 +1 -1<br>+j +j +j -j +j +1 +1 -j +j -j -1 -1 +1 -1 +1 -j -j -1 +1 -1 +j +j -j +j -j -1 -1 +j -j +j +1 +1 +j -1 -j -j -1 +j -1 -j -j -1 +1 +j -1<br>-1 +j +1 +j -1 -1 +j -j +1 +j +j +1 -j +1 +j +j +1 +1 +j -1 -1 +j +1 +j -1 -1 +j +j -1 -j -j -1 -j +1 +j +j +1 -1 -j +1 +1 -j +1<br>+j -1 -1 +j -j +1 +j +j +1 +j -1 -j -j -1 -1 -j +1 +1 -j +1 +j -1 -1 +j +1 -1 +1 -j -j +1 -1 +1 -j -j -j +j -j -1 -1 -j +j -j -1 -1 +1<br>-1 +1 -j -j +1 -1 +1 -j -j +j -j +j +1 +1 +j -j +j +1 +1 +1 -1 +1 -j -j -1 +1 -1 +j +j +j -j +j +1 +1 -j +j -j -1 -1 +1 -1 +1 -j -j<br>-1 +1 -1 +j +j -j +j -j -1 -1 +j -j +j +1 +1 +1 +j -1 -1 +j +1 +j -1 -1 +j -j +1 +j +j +1 -j +1 +j +j +1 -1 -j +1 +1 -j -1 -j +1<br>+1 -j -j +1 +j +j +1 -j +1 +j +j +1 +1 +j -1 -1 +j -1 -j +1 +1 -j +j -1 -j -j -1 -j +1 +j +j +1 -1 -j +1 +1 -j +1 +j -1 -1 +j +j -1<br>-j -j -1 -j +1 +j +j +1 -j +j -j -1 -1 -j +j -j -1 -1 -1 +1 -1 +j +j -1 +1 -1 +j +j -j +j -j -1 -1 -j +j -j -1 -1 +1 -1 +1 -j -j +1 -1<br>+1 -j -j -j +j -j -1 -1 +j -j +j +1 +1 +1 -1 +1 -j -j -1 +1 -1 +j +j -j +j -j -1 -1 +j -j +j +1 +1 -1 +1 -1 +j +j +1 -1 +1 -j -j -1 -j<br>+1 +1 -j -1 -j +1 +1 -j +j -1 -j -j -1 +j -1 -j -j -1 +1 +j -1 -1 +j +1 +j -1 -1 +j +j -1 -j -j -1 +j -1 -j -j -1 -1 -j +1 +1 -j +1 +j<br>-1 -1 +j -j +1 +j +j +1 +j -1 -j -j -1 +1 +j -1 -1 +j -1 -j +1 +1 -j -j +1 +j +j +1 +j -1 -j -j -1 +j -j +j +1 +1 +j -j +j +1 +1 +1<br>-1 +1 -j -j +1 -1 +1 -j -j +j -j +j +1 +1 +j -j +j +1 +1 -1 +1 -1 +j +j -1 +1 -1 +j +j +j -j +j +1 +1 -j +j -j -1 -1 -1 +1 -1 +j<br>+j +1 -1 +1 -j -j +j -j +j +1 +1 -j +j -j -1 -1 +1 -1 +1 -j -j -1 +1 -1 +j +j +1 +j -1 -1 +j +1 +j -1 -1 +j -j +1 +j +j +1 -j +1<br>+j +j +1 -1 -j +1 +1 -j -1 -j +1 +1 -j -j +1 +j +j +1 -j +1 +j +j +1 +1 +j -1 -1 +j -1 -j +1 +1 -j +j -1 -j -j -1 -j +1 +j +j +1<br>-1 -j +1 +1 -j +1 +j -1 -1 +j +j -1 -j -j -1 -j +1 +j +j +1 -j +j -j -1 -1 -j +j -j -1 -1 -1 +1 -1 +j +j -1 +1 -1 +j +j -j +j -j -1 -1<br>-j +j -j -1 -1 +1 -1 +1 -j -j +1 -1 +1 -j -j -j +j -j -1 -1 +j -j +j +1 +1 +1 -1 +1 -j -j -1 +1 -1 +j +j -j +j -j -1 -1 +j -j +j +1 +1<br>-1 +1 -1 +j +j +1 -1 +1 -j -j |

FIG. 24

The Sequence $Seq^{3}_{left}$, 804(k), to be transmitted from left to right, up to down -j -1 -1 -1 +j -1 -j -j -1 +j -j +j +1 +1 -1 -j +1 +1 -j -1 +1 -1 +j +j -j +1 +j +j +1 +j -j +j +1 +1 +1 +j -1 -1 +j -1 +1 -1 +j +j
+1 +j -1 -1 +j +1 -1 +1 -j -j -j +1 +j +j +1 -j +j -j -1 -1 +1 +j -1 -1 +j -1 +1 -1 +j +j -j +1 +j +j +1 +j -j +j +1 +1 +j -1 -j -j
-1 +j -j +j +1 +1 +1 +j -1 -1 +j +1 -1 +1 -j -j -j +1 +j +j +1 +j -j +j +1 +1 -1 -j +1 +1 -j +1 -1 +1 -j -j +1 +j -1 -1 +j +1 -1
+1 -j -j +j -1 -j -j -1 +j -j +j +1 +1 +1 +j -1 -1 +j -1 +1 -1 +j +j +j -1 -j -j -1 -j +j -j -1 -1 -j +1 +j +j +1 -j +j -j -1 -1 +1 +j
-1 -1 +j +1 -1 +1 -j -j +j -1 -j -j -1 -j +j -j -1 -1 -1 -j +1 +1 -j +1 -1 +1 -j -j -1 -j +1 +1 -j -1 +1 -1 +j +j +j -1 -j -j -1 +j -j +j
+1 +1 -1 -j +1 +1 -j +1 -1 +1 -j -j +j -1 -j -j -1 -j +j -j -1 -1 -j +1 +j +j +1 -j +j -j -1 -1 -1 -j +1 +1 -j -1 +1 -1 +j +j +j -1 -j
-j -1 -j +j -j -1 -1 +1 +j -1 -1 +j -1 +1 -1 +j +j -1 -j +1 +1 -j -1 +1 -1 +j +j -j +1 +j +j +1 -j +j -j -1 -1 -1 -j +1 +1 -j +1 -1
+1 -j -j -j +1 +j +j +1 +j -j +j +1 +1 +j -1 -j -j -1 +j -j +j +1 +1 -1 -j +1 +1 -j -1 +1 -1 +j +j -j +1 +j +j +1 +j -j +j +1 +1
+1 +j -1 -1 +j -1 +1 -1 +j +j +1 +j -1 -1 +j +1 -1 +1 -j -j -j +1 +j +j +1 -j +j -j -1 -1 +1 +j -1 -1 +j -1 +1 -1 +j +j -j +1 +j
+j +1 +j -j +j +1 +1 +j -1 -j -j -1 +j -j +j +1 +1 +1 +j -1 -1 +j +1 -1 +1 -j -j -j +1 +j +j +1 +j -j +j +1 +1 -1 -j +1 +1 -j +1
-1 +1 -j -j +1 +j -1 -1 +j +1 -1 +1 -j -j +j -1 -j -j -1 +j -j +j +1 +1 +1 +j -1 -1 +j -1 +1 -1 +j +j +j -1 -j -j -1 -j +j -j -1 -1 -1
-j +1 +1 -j -1 +1 -1 +j +j -j +1 +j +j +1 -j +j -j -1 -1 +1 +j -1 -1 +j -1 +1 -1 +j +j +j -1 -j -j -1 -j +j -j -1 -1 +j -1 -j -j -1 +j
-j +j +1 +1 +1 +j -1 -1 +j +1 -1 +1 -j -j +j -1 -j -j -1 -j +j -j -1 -1 +1 +j -1 -1 +j -1 +1 -1 +j +j -1 -j +1 +1 -j -1 +1 -1 +j +j
+j -1 -j -j -1 +j -j +j +1 +1 +1 +j -1 -1 +j -1 +1 -1 +j +j -j +1 +j +j +1 +j -j +j +1 +1 +j -1 -j -j -1 +j -j +j +1 +1 -1 -j +1 +1
-j -1 +1 -1 +j +j +j -1 -j -j -1 -j +j -j -1 -1 -1 -j +1 +1 -j +1 -1 +1 -j -j -1 -j +1 +1 -j -1 +1 -1 +j +j -j +1 +j +j +1 -j +j -j -1
-1 +1 +j -1 -1 +j -1 +1 -1 +j +j +j -1 -j -j -1 -j +j -j -1 -1 +j -1 -j -j -1 +j -j +j +1 +1 +1 +j -1 -1 +j +1 -1 +1 -j -j +j -1 -j -j
-1 -j +j -j -1 -1 +1 +j -1 -1 +j -1 +1 -1 +j +j -1 -j +1 +1 -j -1 +1 -1 +j +j +j -1 -j -j -1 +j -j +j +1 +1 +1 +j -1 -1 +j -1 +1 -1
+j +j -j +1 +j +j +1 +j -j +j +1 +1 +j -1 -j -j -1 +j -j +j +1 +1 -1 -j +1 +1 -j -1 +1 -1 +j +j +j -1 -j -j -1 -j +j -j -1 -1 -1 -j +1
+1 -j +1 -1 +1 -j -j The Sequence $Seq^{4}_{left}$, 804(k), to be transmitted from left to right, up to down +1 +j +j -j +j -1 -j -j -1 +j -1 -j -j -1 -j +j -j -1 -1 -j +j -j -1 -1 -1 -j +1 +1 -j -1 -j +1 +1 -j +1 -1 +1 -j -j +1 -1 +1 -j -j -1 -j
+1 +1 -j +1 +j -1 -1 +j +1 -1 +1 -j -j -1 +1 -1 +j +j +j -1 -j -j -1 -j +1 +j +j +1 -j +j -j -1 -1 +j -j +j +1 +1 -1 -j +1 +1 -j -1
-j +1 +1 -j -1 +1 -1 +j +j -1 +1 -1 +j +j +j -1 -j -j -1 +j -1 -j -j -1 +j -j +j +1 +1 +j -j +j +1 +1 -j +1 +j +j +1 +j -1 -j -j -1 -j
+j -j -1 -1 +j -j +j +1 +1 +1 +j -1 -1 +j -1 -j +1 +1 -j +1 -1 +1 -j -j -1 +1 -1 +j +j -j +1 +j +j +1 -j +1 +j +j +1 +j -j +j +1
+1 +j -j +j +1 +1 +1 +j -1 -1 +j +1 +j -1 -1 +j -1 +1 -1 +j +j -1 +1 -1 +j +j +1 +j -1 -1 +j -1 -j +1 +1 -j -1 +1 -1 +j +j +1
-1 +1 -j -j -j +1 +j +j +1 +j -1 -j -j -1 +j -j +j +1 +1 -j +j -j -1 -1 +1 +j -1 -1 +j +1 +j -1 -1 +j +1 -1 +1 -j -j +1 -1 +1 -j -j -j
+1 +j +j +1 -j +1 +j +j +1 -j +j -j -1 -1 -j +j -j -1 -1 +j -1 -j -j -1 -j +1 +j +j +1 +j -j +j +1 +1 -j +j -j -1 -1 -1 -j +1 +1 -j +1
+j -1 -1 +j -1 +1 -1 +j +j +1 -1 +1 -j -j +j -1 -j -j -1 +j -1 -j -j -1 -j +j -j -1 -1 -j +j -j -1 -1 -1 -j +1 +1 -j -1 -j +1 +1 -j +1
-1 +1 -j -j +1 -1 +1 -j -j -1 -j +1 +1 -j +1 +j -1 -1 +j +1 -1 +1 -j -j -1 +1 -1 +j +j +j -1 -j -j -1 -j +1 +j +j +1 -j +j -j -1 -1 +j
-j +j +1 +1 -1 -j +1 +1 -j -1 -j +1 +1 -j -1 +1 -1 +j +j -1 +1 -1 +j +j +j -1 -j -j -1 +j -1 -j -j -1 +j -j +j +1 +1 +j -j +j +1 +1
-j +1 +j +j +1 +j -1 -j -j -1 -j +j -j -1 -1 +j -j +j +1 +1 +1 +j -1 -1 +j -1 -j +1 +1 -j +1 -1 +1 -j -j -1 +1 -1 +j +j -1 -j +1 +1
-j -1 -j +1 +1 -j +1 -1 +1 -j -j +1 -1 +1 -j -j -j +1 +j +j +1 -j +1 +j +j +1 +j -j +j +1 +1 +j -j +j +1 +1 -j +1 +j +j +1 +j -1
-j -j -1 +j -j +j +1 +1 -j +j -j -1 -1 -1 -j +1 +1 -j +1 +j -1 -1 +j +1 -1 +1 -j -j -1 +1 -1 +j +j -j +1 +j +j +1 -j +1 +j +j +1 -j
+j -j -1 -1 -j +j -j -1 -1 -1 -j +1 +1 -j -1 -j +1 +1 -j -1 +1 -1 +j +j -1 +1 -1 +j +j +1 +j -1 -1 +j -1 -j +1 +1 -j +1 -1 +1 -j -j
-1 +1 -1 +j +j +j -1 -j -j -1 -j +1 +j +j +1 +j -j +j +1 +1 -j +j -j -1 -1 -1 -j +1 +1 -j -1 -j +1 +1 -j +1 -1 +1 -j -j +1 -1 +1 -j
-j -j +1 +j +j +1 -j +1 +j +j +1 +j -j +j +1 +1 +j -j +j +1 +1 -j +1 +j +j +1 +j -1 -j -j -1 +j -j +j +1 +1 -j +j -j -1 -1 -1 -j +1
+1 -j +1 +j -1 -1 +j +1 -1 +1 -j -j -1 +1 -1 +j +j -j +1 +j +j +1 -j +1 +j +j +1 -j +j -j -1 -1 -j +j -j -1 -1 -1 -j +1 +1 -j -1 -j
+1 +1 -j -1 +1 -1 +j +j -1 +1 -1 +j +j +1 +j -1 -1 +j -1 -j +1 +1 -j +1 -1 +1 -j -j -1 +1 -1 +j +j +j -1 -j -j -1 -j +1 +j +j +1
+j -j +j +1 +1 -j +j -j -1 -1

FIG. 25

| The Sequence $Seq^{5}_{left}$ , 804(k), to be transmitted from left to right, up to down |
| --- |
| -j -j +1 -j -1 -1 -j +j -j -1 -1 -j +j -j +1 +1 +j -j +j -1 -1 -j +j -j -j +1 +1 -j -1 -j +1 +1 -j -1 +j -1 -1 +j +1 -j +1 +1 -j -1 -1 -1<br>-j +j -j +1 +1 +j -j +j +1 +1 +j -j +j +1 +1 +j -j +j +j -1 -1 +j +1 -j +1 +1 -j -1 -j +1 +1 -j -1 -j +1 +1 -j -1 +j +j -1 +1 -1<br>+j +j -1 +1 -1 +j +j -1 +1 -1 -j -j +1 -1 +1 -1 -j -j -1 +j -1 -j -j -1 +j -1 -j -j -1 +j +1 +j +j +1 -j +j +j -1 +1 -1 -j -j +1 -1 +1<br>+j +j -1 +1 -1 +j +j -1 +1 -1 +1 +j +j +1 -j -1 -j -j -1 +j +1 +j +j +1 -j +1 +j +j +1 -j -1 -1 -j +j -j -1 -1 -j +j -j +1 +1 +j -j<br>+j -1 -1 -j +j -j -j +1 +1 -j -1 -j +1 +1 -j -1 +j -1 -1 +j +1 -j +1 +1 -j -1 -1 -1 -j +j -j +1 +1 +j -j +j +1 +1 +j -j +j +1 +1 +j<br>-j +j +j -1 -1 +j +1 -j +1 +1 -j -1 -j +1 +1 -j -1 -j +1 +1 -j -1 +j +j -1 +1 -1 +j +j -1 +1 -1 +j +j -1 +1 -1 -j -j +1 -1 +1 -1 -j<br>-j -1 +j -1 -j -j -1 +j -1 -j -j -1 +j +1 +j +j +1 -j +j +j -1 +1 -1 -j -j +1 -1 +1 +j +j -1 +1 -1 +j +j -1 +1 -1 +1 +j +j +1 -j -1<br>-j -j -1 +j +1 +j +j +1 -j +1 +j +j +1 -j +j +j -1 +1 -1 +j +j -1 +1 -1 -j -j +1 -1 +1 +j +j -1 +1 -1 -1 -j -j -1 +j -1 -j -j -1 +j<br>+1 +j +j +1 -j -1 -j -j -1 +j +j +j -1 +1 -1 -j -j +1 -1 +1 -j -j +1 -1 +1 -j -j +1 -1 +1 +1 +j +j +1 -j -1 -j -j -1 +j -1 -j -j -1 +j<br>-1 -j -j -1 +j +1 +1 +j -j +j +1 +1 +j -j +j +1 +1 +j -j +j -1 -1 -j +j -j +j -1 -1 +j +1 +j -1 -1 +j +1 +j -1 -1 +j +1 -j +1 +1 -j<br>-1 +1 +1 +j -j +j -1 -1 -j +j -j +1 +1 +j -j +j +1 +1 +j -j +j -j +1 +1 -j -1 +j -1 -1 +j +1 -j +1 +1 -j -1 -j +1 +1 -j -1 -j -j +1<br>-1 +1 -j -j +1 -1 +1 +j +j -1 +1 -1 -j -j +1 -1 +1 +1 +j +j +1 -j +1 +j +j +1 -j -1 -j -j -1 +j +1 +j +j +1 -j -j -j +1 -1 +1 +j<br>+j -1 +1 -1 +j +j -1 +1 -1 +j +j -1 +1 -1 -1 -j -j -1 +j +1 +j +j +1 -j +1 +j +j +1 -j +1 +j +j +1 -j -1 -1 -j +j -j -1 -1 -j +j -j<br>-1 -1 -j +j -j +1 +1 +j -j +j -j +1 +1 -j -1 -j +1 +1 -j -1 -j +1 +1 -j -1 +j -1 -1 +j +1 -1 -1 -j +j -j +1 +1 +j -j +j -1 -1 -j +j -j<br>-1 -1 -j +j -j +j -1 -1 +j +1 -j +1 +1 -j -1 +j -1 -1 +j +1 +j -1 -1 +j +1 +j +j -1 +1 -1 +j +j -1 +1 -1 -j -j +1 -1 +1 +j +j -1<br>+1 -1 -1 -j -j -1 +j -1 -j -j -1 +j +1 +j +j +1 -j -1 -j -j -1 +j +j +j -1 +1 -1 -j -j +1 -1 +1 -j -j +1 -1 +1 -j -j +1 -1 +1 +1 +j +j<br>+1 -j -1 -j -j -1 +j -1 -j -j -1 +j -1 -j -j -1 +j +1 +1 +j -j +j +1 +1 +j -j +j +1 +1 +j -j +j -1 -1 -j +j -j +j -1 -1 +j +1 +j -1 -1<br>+j +1 +j -1 -1 +j +1 -j +1 +1 -j -1 +1 +1 +j -j +j -1 -1 -j +j -j +1 +1 +j -j +j +1 +1 +j -j +j -j +1 +1 -j -1 +j -1 -1 +j +1 -j +1<br>+1 -j -1 -j +1 +1 -j -1 |

| The Sequence $Seq^{6}_{left}$ , 804(k), to be transmitted from left to right, up to down |
| --- |
| +j +j +1 -1 +1 +j +j +1 -j -j +1 +1 -j -1 -1 -j -j -1 +j -j +1 +1 -j -1 -j +1 +1 -j -1 -1 -j -j -1 +j +j -1 -1 +j +1 -1 -j -j -1 +j +1<br>+1 +j -j +j -j -j +1 -1 +1 +1 +1 +j -j +j +j +j -1 +1 -1 -j -j +1 -1 +1 -1 -1 -j +j -j -j -j +1 -1 +1 +1 +1 +j -j +j +j -1 -1 +j +1<br>-1 -j -j -1 +j -j +1 +1 -j -1 -1 -j -j -1 +j -1 -j -j -1 +j -j +1 +1 -j -1 +1 +j +j +1 -j -j +1 +1 -j -1 +j +j -1 +1 -1 -1 -1 -j +j -j<br>+j +j -1 +1 -1 +1 +1 +j -j +j -1 -1 -j +j -j -j -j +1 -1 +1 -1 -1 -j +j -j +j +j -1 +1 -1 +1 +j +j +1 -j -j +1 +1 -j -1 -1 -j -j -1 +j<br>-j +1 +1 -j -1 -j +1 +1 -j -1 -1 -j -j -1 +j +j -1 -1 +j +1 -1 -j -j -1 +j +1 +1 +j -j +j -j -j +1 -1 +1 +1 +1 +j -j +j +j +j -1 +1<br>-1 -j -j +1 -1 +1 -1 -1 -j +j -j -j -j +1 -1 +1 +1 +1 +j -j +j +j -1 -1 +j +1 -1 -j -j -1 +j -j +1 +1 -j -1 -1 -j -j -1 +j -1 -j -j -1<br>+j -j +1 +1 -j -1 +1 +j +j +1 -j -j +1 +1 -j -1 +j +j -1 +1 -1 -1 -1 -j +j -j +j +j -1 +1 -1 +1 +1 +j -j +j -1 -1 -j +j -j -j -j +1<br>-1 +1 -1 -1 -j +j -j +j +j -1 +1 -1 -j +1 +1 -j -1 -1 -j -j -1 +j +j -1 -1 +j +1 -1 -j -j -1 +j -1 -j -j -1 +j +j -1 -1 +j +1 +1 +j +j<br>+1 -j +j -1 -1 +j +1 -j -j +1 -1 +1 -1 -1 -j +j -j -j -j +1 -1 +1 +1 +1 +j -j +j -1 -1 -j +j -j +j +j -1 +1 -1 -1 -1 -j +j -j -j -j +1<br>-1 +1 +1 +j +j +1 -j +j -1 -1 +j +1 -1 -j -j -1 +j +j -1 -1 +j +1 +j -1 -1 +j +1 -1 -j -j -1 +j -j +1 +1 -j -1 -1 -j -j -1 +j +1 +1<br>+j -j +j +j +j -1 +1 -1 +1 +1 +j -j +j -j -j +1 -1 +1 +j +j -1 +1 -1 -1 -1 -j +j -j +j +j -1 +1 -1 +1 +1 +j -j +j +j -1 -1 +j +1<br>+1 +j +j +1 -j -j +1 +1 -j -1 +1 +j +j +1 -j +1 +j +j +1 -j -j +1 +1 -j -1 -1 -j -j -1 +j -j +1 +1 -j -1 +j +j -1 +1 -1 +1 +1 +j<br>-j +j +j +j -1 +1 -1 -1 -1 -j +j -j +1 +1 +j -j +j -j -j +1 -1 +1 +1 +1 +j -j +j +j +j -1 +1 -1 -1 -j -j -1 +j -j +1 +1 -j -1 +1 +j<br>+j +1 -j -j +1 +1 -j -1 -j +1 +1 -j -1 +1 +j +j +1 -j +j -1 -1 +j +1 +1 +j +j +1 -j -1 -1 -j +j -j -j -j +1 -1 +1 -1 -1 -j +j -j +j<br>+j -1 +1 -1 -j -j +1 -1 +1 +1 +1 +j -j +j -j -j +1 -1 +1 -1 -1 -j +j -j -j +1 +1 -j -1 -1 -j -j -1 +j +j -1 -1 +j +1 -1 -j -j -1 +j -1<br>-j -j -1 +j +j -1 -1 +j +1 +1 +j +j +1 -j +j -1 -1 +j +1 -j -j +1 -1 +1 -1 -1 -j +j -j -j -j +1 -1 +1 +1 +1 +j -j +j -1 -1 -j +j -j<br>+j +j -1 +1 -1 -1 -1 -j +j -j -j -j +1 -1 +1 +1 +j +j +1 -j +j -1 -1 +j +1 -1 -j -j -1 +j +j -1 -1 +j +1 +j -1 -1 +j +1 -1 -j -j -1<br>+j -j +1 +1 -j -1 -1 -j -j -1 +j +1 +1 +j -j +j +j +j -1 +1 -1 +1 +1 +j -j +j -j -j +1 -1 +1 +j +j -1 +1 -1 -1 -1 -j +j -j +j +j -1<br>+1 -1 +1 +1 +j -j +j |

FIG. 26

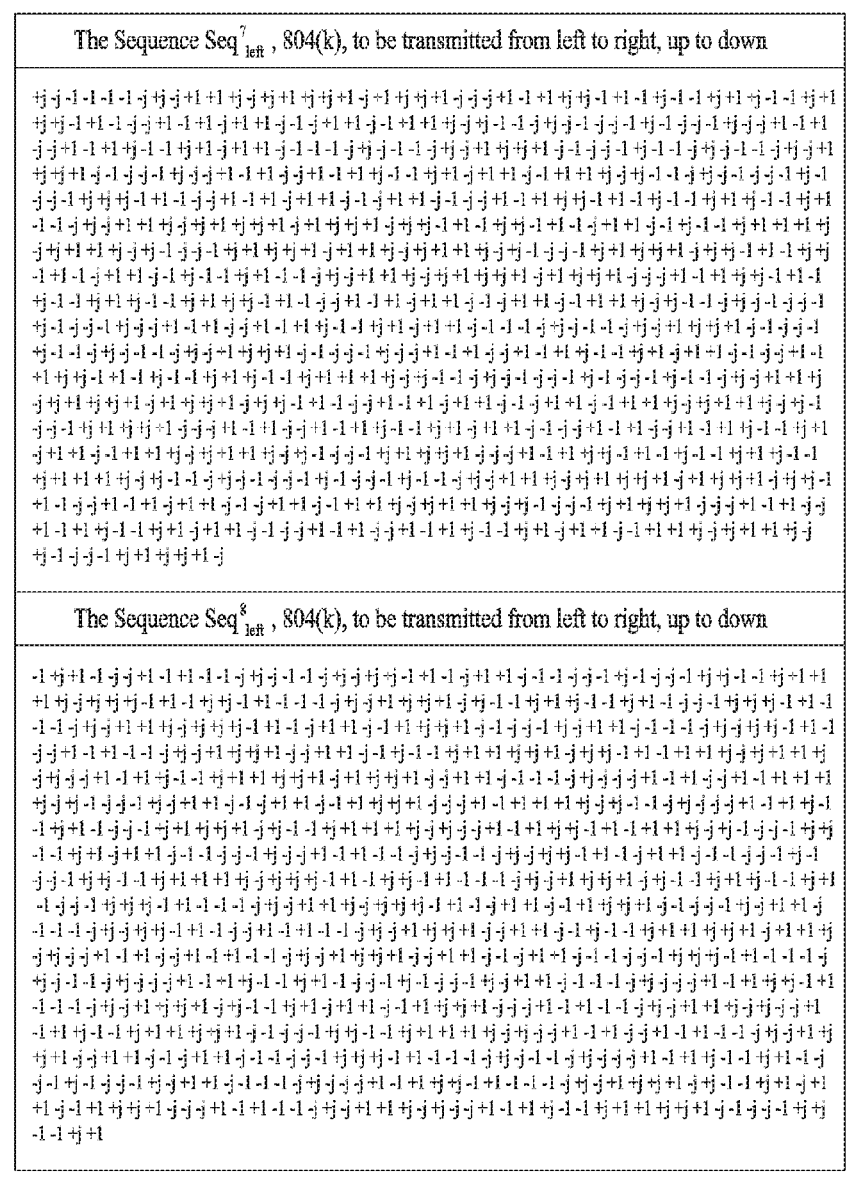

The Sequence $Seq^{7}_{left}$ , 804(k), to be transmitted from left to right, up to down +j -j -1 -1 -1 -1 -j +j -j +1 +1 +j -j +j +1 +j +j +1 -j +1 +j +j +1 -j -j -j +1 -1 +1 +j +j -1 +1 -1 +j -1 -1 +j +1 +j -1 -1 +j +1
+j +j -1 +1 -1 -j -j +1 -1 +1 -j +1 +1 -j -1 -j +1 +1 -j -1 +1 +1 +j -j +j -1 -1 -j +j -j -1 -j -j -1 +j -1 -j -j -1 +j -j -j +1 -1 +1
-j -j +1 -1 +1 +j -1 -1 +j +1 -j +1 +1 -j -1 -1 -1 -j +j -j -1 -1 -j +j -j +1 +j +j +1 -j -1 -j -j -1 +j -1 -1 -j +j -j -1 -1 -j +j -j +1
+j +j +1 -j -1 -j -j -1 +j -j -j +1 -1 +1 -j -j +1 -1 +1 +j -1 -1 +j +1 -j +1 +1 -j -1 +1 +1 +j -j +j -1 -1 -j +j -j -1 -j -j -1 +j -1
-j -j -1 +j +j +j -1 +1 -1 -j -j +1 -1 +1 -j +1 +1 -j -1 -j +1 +1 -j -1 -j -j +1 -1 +1 +j +j -1 +1 -1 +j -1 -1 +j +1 +j -1 -1 +j +1
-1 -1 -j +j -j +1 +1 +j -j +j +1 +j +j +1 -j +1 +j +j +1 -j +j +j -1 +1 -1 +j +j -1 +1 -1 -j +1 +1 -j -1 +j -1 -1 +j +1 +1 +1 +j
-j +j +1 +1 +j -j +j -1 -j -j -1 +j +1 +j +j +1 -j +1 +1 +j -j +j +1 +1 +j -j +j -1 -j -j -1 +j +1 +j +j +1 -j +j +j -1 +1 -1 +j +j
-1 +1 -1 -j +1 +1 -j -1 +j -1 -1 +j +1 -1 -1 -j +j -j +1 +1 +j -j +j +1 +j +j +1 -j +1 +j +j +1 -j -j -j +1 -1 +1 +j +j -1 +1 -1
+j -1 -1 +j +1 +j -1 -1 +j +1 +j +j -1 +1 -1 -j -j +1 -1 +1 -j +1 +1 -j -1 -j +1 +1 -j -1 +1 +1 +j -j +j -1 -1 -j +j -j -1 -j -j -1
+j -1 -j -j -1 +j -j -j +1 -1 +1 -j -j +1 -1 +1 +j -1 -1 +j +1 -j +1 +1 -j -1 -1 -1 -j +j -j -1 -1 -j +j -j +1 +j +j +1 -j -1 -j -j -1
+j -1 -1 -j +j -j -1 -1 -j +j -j +1 +j +j +1 -j -1 -j -j -1 +j -j -j +1 -1 +1 -j -j +1 -1 +1 +j -1 -1 +j +1 -j +1 +1 -j -1 -j -j +1 -1
+1 +j +j -1 +1 -1 +j -1 -1 +j +1 +j -1 -1 +j +1 +1 +1 +j -j +j -1 -1 -j +j -j -1 -j -j -1 +j -1 -j -j -1 +j -1 -1 -j +j -j +1 +1 +j
-j +j +1 +j +j +1 -j +1 +j +j +1 -j +j +j -1 +1 -1 -j -j +1 -1 +1 -j +1 +1 -j -1 -j +1 +1 -j -1 +1 +1 +j -j +j +1 +1 +j -j +j -1
-j -j -1 +j +1 +j +j +1 -j -j -j +1 -1 +1 -j -j +1 -1 +1 +j -1 -1 +j +1 -j +1 +1 -j -1 -j -j +1 -1 +1 -j -j +1 -1 +1 +j -1 -1 +j +1
-j +1 +1 -j -1 +1 +1 +j -j +j +1 +1 +j -j +j -1 -j -j -1 +j +1 +j +j +1 -j -j -j +1 -1 +1 +j +j -1 +1 -1 +j -1 -1 +j +1 +j -1 -1
+j +1 +1 +1 +j -j +j -1 -1 -j +j -j -1 -j -j -1 +j -1 -j -j -1 +j -1 -1 -j +j -j +1 +1 +j -j +j +1 +j +j +1 -j +1 +j +j +1 -j +j +j -1
+1 -1 -j -j +1 -1 +1 -j +1 +1 -j -1 -j +1 +1 -j -1 +1 +1 +j -j +j +1 +1 +j -j +j -1 -j -j -1 +j +1 +j +j +1 -j -j -j +1 -1 +1 -j -j
+1 -1 +1 +j -1 -1 +j +1 -j +1 +1 -j -1 -j -j +1 -1 +1 -j -j +1 -1 +1 +j -1 -1 +j +1 -j +1 +1 -j -1 +1 +1 +j -j +j +1 +1 +j -j
+j -1 -j -j -1 +j +1 +j +j +1 -j The Sequence $Seq^{8}_{left}$ , 804(k), to be transmitted from left to right, up to down -1 +j +1 -1 -j -j +1 -1 +1 -1 -1 -j +j -j -1 -1 -j +j -j +j +j -1 +1 -1 -j +1 +1 -j -1 -1 -j -j -1 +j -1 -j -j -1 +j +j -1 -1 +j +1 +1
+1 +j -j +j +j +j -1 +1 -1 +j +j -1 +1 -1 -1 -1 -j +j -j +1 +j +j +1 -j +j -1 -1 +j +1 +j -1 -1 +j +1 -1 -j -j -1 +j +j +j -1 +1 -1
-1 -1 -j +j -j +1 +1 +j -j +j +j +j -1 +1 -1 -j +1 +1 -j -1 +1 +j +j +1 -j -1 -j -j -1 +j -j +1 +1 -j -1 -1 -1 -j +j -j +j +j -1 +1 -1
-j -j +1 -1 +1 -1 -1 -j +j -j +1 +j +j +1 -j -j +1 +1 -j -1 +j -1 -1 +j +1 +1 +j +j +1 -j +j +j -1 +1 -1 +1 +1 +j -j +j +1 +1 +j
-j +j -j -j +1 -1 +1 +j -1 -1 +j +1 +1 +j +j +1 -j +1 +j +j +1 -j -j +1 +1 -j -1 -1 -1 -j +j -j -j -j +1 -1 +1 -j -j +1 -1 +1 +1 +1
+j -j +j -1 -j -j -1 +j -j +1 +1 -j -1 -j +1 +1 -j -1 +1 +j +j +1 -j -j -j +1 -1 +1 +1 +1 +j -j +j -1 -1 -j +j -j -j -j +1 -1 +1 +j -1
-1 +j +1 -1 -j -j -1 +j +1 +j +j +1 -j +j -1 -1 +j +1 +1 +1 +j -j +j -j -j +1 -1 +1 +j +j -1 +1 -1 +1 +1 +j -j +j -1 -j -j -1 +j +j
-1 -1 +j +1 -j +1 +1 -j -1 -1 -j -j -1 +j -j -j +1 -1 +1 -1 -1 -j +j -j -1 -1 -j +j -j +j +j -1 +1 -1 -j +1 +1 -j -1 -1 -j -j -1 +j -1
-j -j -1 +j +j -1 -1 +j +1 +1 +1 +j -j +j +j +j -1 +1 -1 +j +j -1 +1 -1 -1 -1 -j +j -j +1 +j +j +1 -j +j -1 -1 +j +1 +j -1 -1 +j +1
-1 -j -j -1 +j +j +j -1 +1 -1 -1 -1 -j +j -j +1 +1 +j -j +j +j +j -1 +1 -1 -j +1 +1 -j -1 +1 +j +j +1 -j -1 -j -j -1 +j -j +1 +1 -j
-1 -1 -1 -j +j -j +j +j -1 +1 -1 -j -j +1 -1 +1 -1 -1 -j +j -j +1 +j +j +1 -j -j +1 +1 -j -1 +j -1 -1 +j +1 +1 +j +j +1 -j +1 +1 +j
-j +j -j -j +1 -1 +1 -j -j +1 -1 +1 -1 -1 -j +j -j +1 +j +j +1 -j -j +1 +1 -j -1 -j +1 +1 -j -1 -1 -j -j -1 +j +j +j -1 +1 -1 -1 -1 -j
+j -j -1 -1 -j +j -j -j -j +1 -1 +1 +j -1 -1 +j +1 -1 -j -j -1 +j -1 -j -j -1 +j -j +1 +1 -j -1 -1 -1 -j +j -j -j -j +1 -1 +1 +j +j -1 +1
-1 -1 -1 -j +j -j +1 +j +j +1 -j +j -1 -1 +j +1 -j +1 +1 -j -1 +1 +j +j +1 -j -j -j +1 -1 +1 -1 -1 -j +j -j +1 +1 +j -j +j -j -j +1
-1 +1 +j -1 -1 +j +1 +1 +j +j +1 -j -1 -j -j -1 +j +j -1 -1 +j +1 +1 +1 +j -j +j -j -j +1 -1 +1 -j -j +1 -1 +1 -1 -1 -j +j -j +1 +j
+j +1 -j -j +1 +1 -j -1 -j +1 +1 -j -1 -1 -j -j -1 +j +j +j -1 +1 -1 -1 -1 -j +j -j -1 -1 -j +j -j -j +1 -1 +1 +j -1 -1 +j +1 -1 -j
-j -1 +j -1 -j -j -1 +j -j +1 +1 -j -1 -1 -1 -j +j -j -j -j +1 -1 +1 +j +j -1 +1 -1 -1 -1 -j +j -j +1 +j +j +1 -j +j -1 -1 +j +1 -j +1
+1 -j -1 +1 +j +j +1 -j -j -j +1 -1 +1 -1 -1 -j +j -j +1 +1 +j -j +j -j -j +1 -1 +1 +j -1 -1 +j +1 +1 +j +j +1 -j -1 -j -j -1 +j +j
-1 -1 +j +1

FIG. 27

The Sequence $Seq^{1}_{right}$, 804(k), to be transmitted from left to right, up to down -j +1 +j +j +1 -j +j -j -1 -1 -1 -j +1 +1 -j +1 -1 +1 -j -j +1 +j -1 -1 +j +1 -1 +1 -j -j +j -1 -j -j -1 -j +j -j -1 -1 -j +1 +j +j +1
-j +j -j -1 -1 -1 -j +1 +1 -j +1 -1 +1 -j -j -1 -j +1 +1 -j -1 +1 -1 +j +j -j +1 +j +j +1 +j -j +j +1 +1 -j +1 +j +j +1 -j +j -j -1
-1 -1 -j +1 +1 -j +1 -1 +1 -j -j +1 +j -1 -1 +j +1 -1 +1 -j -j +j -1 -j -j -1 -j +j -j -1 -1 +j -1 -j -j -1 +j -j +j +1 +1 +1 +j -1 -1
+j -1 +1 -1 +j +j +1 +j -1 -1 +j +1 -1 +1 -j -j +j -1 -j -j -1 -j +j -j -1 -1 -1 -j +1 +1 -j -1 +1 -1 +j +j +j -1 -j -j -1 -j +j -j -1
-1 -j +1 +j +j +1 -j +j -j -1 -1 +1 +j -1 -1 +j -1 +1 -1 +j +j -1 -j +1 +1 -j -1 +1 -1 +j +j +j -1 -j -j -1 -j +j -j -1 -1 +j -1 -j -j
-1 +j -j +j +1 +1 -1 -j +1 +1 -j +1 -1 +1 -j -j -1 -j +1 +1 -j -1 +1 -1 +j +j +j -1 -j -j -1 -j +j -j -1 -1 -j +1 +j +j +1 -j +j -j -1
-1 +1 +j -1 -1 +j -1 +1 -1 +j +j +1 +j -1 -1 +j +1 -1 +1 -j -j -j +1 +j +j +1 +j -j +j +1 +1 -j +1 +j +j +1 -j +j -j -1 -1 +1 +j
-1 -1 +j -1 +1 -1 +j +j -1 -j +1 +1 -j -1 +1 -1 +j +j +j -1 -j -j -1 -j +j -j -1 -1 -j +1 +j +j +1 -j +j -j -1 -1 +1 +j -1 -1 +j -1 +1
-1 +j +j -1 -j +1 +1 -j -1 +1 -1 +j +j +j -1 -j -j -1 -j +j -j -1 -1 +j -1 -j -j -1 +j -j +j +1 +1 -1 -j +1 +1 -j +1 -1 +1 -j -j -1 -j
+1 +1 -j -1 +1 -1 +j +j +j -1 -j -j -1 -j +j -j -1 -1 -j +1 +j +j +1 -j +j -j -1 -1 +1 +j -1 -1 +j -1 +1 -1 +j +j +1 +j -1 -1 +j +1
-1 +1 -j -j -j +1 +j +j +1 +j -j +j +1 +1 -j +1 +j +j +1 -j +j -j -1 -1 +1 +j -1 -1 +j -1 +1 -1 +j +j -j +1 +j +j +1 -j +j -j -1 -1
-1 -j +1 +1 -j +1 -1 +1 -j -j +1 +j -1 -1 +j +1 -1 +1 -j -j +j -1 -j -j -1 -j +j -j -1 -1 -j +1 +j +j +1 -j +j -j -1 -1 -1 -j +1 +1 -j
+1 -1 +1 -j -j -1 -j +1 +1 -j -1 +1 -1 +j +j -j +1 +j +j +1 +j -j +j +1 +1 -j +1 +j +j +1 -j +j -j -1 -1 -1 -j +1 +1 -j +1 -1 +1 -j
-j +1 +j -1 -1 +j +1 -1 +1 -j -j +j -1 -j -j -1 -j +j -j -1 -1 +j -1 -j -j -1 +j -j +j +1 +1 +1 +j -1 -1 +j -1 +1 -1 +j +j +1 +j -1 -1
+j +1 -1 +1 -j -j +j -1 -j -j -1 -j +j -j -1 -1 +1 +j -1 -1 +j +1 -1 +1 -j -j -j +1 +j +j +1 +j -j +j +1 +1 +j -1 -j -j -1 +j -j +j +1
+1 -1 -j +1 +1 -j +1 -1 +1 -j -j +1 +j -1 -1 +j +1 -1 +1 -j -j -j +1 +j +j +1 +j -j +j +1 +1 -j +1 +j +j +1 -j +j -j -1 -1 +1 +j
-1 -1 +j -1 +1 -1 +j +j +1 +j -1 -1 +j +1 -1 +1 -j -j -j +1 +j +j +1 +j -j +j +1 +1 +j -1 -j -j -1 +j -j +j +1 +1 -1 -j +1 +1 -j
+1 -1 +1 -j -j -1 -j +1 +1 -j -1 +1 -1 +j +j +j -1 -j -j -1 -j +j -j -1 -1 +j -1 -j -j -1 +j -j +j +1 +1 -1 -j +1 +1 -j +1 -1 +1 -j
-j +1 +1 +j -1

The Sequence $Seq^{2}_{right}$, 804(k), to be transmitted from left to right, up to down -j +1 +j +j +1 +j -1 -j -j -1 -1 -j +1 +1 -j +1 +j -1 -1 +j +j -1 -j -j -1 -j +1 +j +j +1 -1 -j +1 +1 -j +1 +j -1 -1 +j -j +1 +j +j
+1 -j +1 +j +j +1 +1 +j -1 -1 +j +1 +j -1 -1 +j +j -1 -j -j -1 +j -1 -j -j -1 +1 +j -1 -1 +j +1 +j -1 -1 +j -1 +1 -1 +j +j +1 -1
+1 -j -j +j -j +j +1 +1 -j +j -j -1 -1 -1 +1 -1 +j +j +1 -1 +1 -j -j -j +j -j -1 -1 +j -j +j +1 +1 -1 +1 -1 +j +j -1 +1 -1 +j +j -j
+j -j -1 -1 -j +j -j -1 -1 -1 +1 -1 +j +j -1 +1 -1 +j +j +j -j +j +1 +1 +j -j +j +1 +1 -1 -j +1 +1 -j +1 +j -1 -1 +j +j -1 -j -j -1
-j +1 +j +j +1 +1 +j -1 -1 +j -1 -j +1 +1 -j +j -1 -j -j -1 -j +1 +j +j +1 -1 -j +1 +1 -j -1 -j +1 +1 -j -j +1 +j +j +1 -j +1 +j +j
+1 +1 +j -1 -1 +j +1 +j -1 -1 +j -j +1 +j +j +1 -j +1 +j +j +1 +j -j +j +1 +1 -j +j -j -1 -1 +1 -1 +1 -j -j -1 +1 -1 +j +j +j -j
+j +1 +1 -j +j -j -1 -1 -1 +1 -1 +j +j +1 -1 +1 -j -j +j -j +j +1 +1 +j -j +j +1 +1 -1 +1 -1 +j +j -1 +1 -1 +j +j +j -j +j +1 +1
+j -j +j +1 +1 +1 -1 +1 -j -j +1 -1 +1 -j -j -1 -j +1 +1 -j +1 +j -1 -1 +j +j -1 -j -j -1 -j +1 +j +j +1 +1 +j -1 -1 +j -1 -j +1 +1
-j +j -1 -j -j -1 -j +1 +j +j +1 -1 -j +1 +1 -j -1 -j +1 +1 -j -j +1 +j +j +1 -j +1 +j +j +1 +1 +j -1 -1 +j +1 +j -1 -1 +j -j +1 +j
+j +1 -j +1 +j +j +1 +j -j +j +1 +1 -j +j -j -1 -1 +1 -1 +1 -j -j -1 +1 -1 +j +j +j -j +j +1 +1 -j +j -j -1 -1 -1 +1 -1 +j +j +1
-1 +1 -j -j +j -j +j +1 +1 +j -j +j +1 +1 -1 +1 -1 +j +j -1 +1 -1 +j +j +j -j +j +1 +1 +j -j +j +1 +1 +1 -1 +1 -j -j +1 -1 +1 -j
-j -j +1 +j +j +1 +j -1 -j -j -1 -1 -j +1 +1 -j +1 +j -1 -1 +j +j -1 -j -j -1 -j +1 +j +j +1 -1 -j +1 +1 -j +1 +j -1 -1 +j -j +1 +j
+j +1 -j +1 +j +j +1 +1 +j -1 -1 +j +1 +j -1 -1 +j +j -1 -j -j -1 +j -1 -j -j -1 +1 +j -1 -1 +j +1 +j -1 -1 +j -1 +1 -1 +j +j +1
-1 +1 -j -j +j -j +j +1 +1 -j +j -j -1 -1 -1 +1 -1 +j +j +1 -1 +1 -j -j -j +j -j -1 -1 +j -j +j +1 +1 -1 +1 -1 +j +j -1 +1 -1 +j +j
-j +j -j -1 -1 -j +j -j -1 -1 -1 +1 -1 +j +j -1 +1 -1 +j +j +j -j +j +1 +1 +j -j +j +1 +1 +1 +j -1 -1 +j -1 -j +1 +1 -j -j +1 +j +j
+1 +j -1 -j -j -1 -1 -j +1 +1 -j +1 +j -1 -1 +j -j +1 +j +j +1 +j -1 -j -j -1 +1 +j -1 -1 +j +1 +j -1 -1 +j +j -1 -j -j -1 +j -1 -j
-j -1 -1 -j +1 +1 -j -1 -j +1 +1 -j +j -1 -j -j -1 +j -1 -j -j -1 -j +j -j -1 -1 +j -j +j +1 +1 -1 +1 -1 +j +j +1 -1 +1 -j -j -j +j -j
-1 -1 +j -j +j +1 +1 +1 -1 +1 -j -j -1 +1 -1 +j +j -j +j -j -1 -1 -j +j -j -1 -1 +1 -1 +1 -j -j +1 -1 +1 -j -j -j +j -j -1 -1 -j +j -j
-1 -1 -1 +1 -1 +j +j -1 +1 -1 +j +j +j +j +j -j

FIG. 28

The Sequence $Seq^{3}_{right}$, 804(k), to be transmitted from left to right, up to down +1 +j -1 -1 +j +1 -1 +1 -j -j +j -1 -j -j -1 +j -j +j +1 +1 -1 -j +1 +1 -j +1 -1 +1 -j -j -j +1 +j +j +1 +j -j +j +1 +1 -j +1 +j
+j +1 -j +j -j -1 -1 -1 -j +1 +1 -j -1 +1 -1 +j +j -j +1 +j +j +1 +j -j +j +1 +1 -1 -j +1 +1 -j +1 -1 +1 -j -j -1 -j +1 +1 -j -1
+1 -1 +j +j +j -1 -j -j -1 +j -j +j +1 +1 +1 +j -1 -1 +j -1 +1 -1 +j +j -j +1 +j +j +1 +j -j +j +1 +1 +j -1 -j -j -1 +j -j +j +1
+1 -1 -j +1 +1 -j -1 +1 -1 +j +j +j -1 -j -j -1 -j +j -j -1 -1 -1 -j +1 +1 -j +1 -1 +1 -j -j -j +1 +j +j +1 -j +j -j -1 -1 +1 +j -1
-1 +j +1 -1 +1 -j -j +j -1 -j -j -1 -j +j -j -1 -1 -1 -j +1 +1 -j +1 -1 +1 -j -j -1 -j +1 +1 -j -1 +1 -1 +j +j +j -1 -j -j -1 +j -j +j
+1 +1 -1 -j +1 +1 -j +1 -1 +1 -j -j +j -1 -j -j -1 -j +j -j -1 -1 +j -1 -j -j -1 +j -j +j +1 +1 +1 +j -1 -1 +j +1 -1 +1 -j -j -j +1
+j +j +1 +j -j +j +1 +1 -1 -j +1 +1 -j +1 -1 +1 -j -j +1 +j -1 -1 +j +1 -1 +1 -j -j +j -1 -j -j -1 +j -j +j +1 +1 +1 +j -1 -1 +j -
1 +1 -1 +j +j +j -1 -j -j -1 -j +j -j -1 -1 -1 -j +1 +1 -j -1 +1 -1 +j +j -j +1 +j +j +1 -j +j -j -1 -1 +1 +j -1 -1 +j -1 +1 -1 +j +j
+j -1 -j -j -1 -j +j -j -1 -1 +j -1 -j -j -1 +j -j +j +1 +1 +1 +j -1 -1 +j +1 -1 +1 -j -j +j -1 -j -j -1 -j +j -j -1 -1 +1 +j -1 -1 +j
-1 +1 -1 +j +j +1 +j -1 -1 +j +1 -1 +1 -j -j -j +1 +j +j +1 -j +j -j -1 -1 -1 -j +1 +1 -j +1 -1 +1 -j -j +j -1 -j -j -1 -j +j -j -1 -1
-j +1 +j +j +1 -j +j -j -1 -1 +1 +j -1 -1 +j +1 -1 +1 -j -j -j +1 +j +j +1 +j -j +j +1 +1 +1 +j -1 -1 +j -1 +1 -1 +j +j -1 -j +1
+1 -j -1 +1 -1 +j +j -j +1 +j +j +1 -j +j -j -1 -1 +1 +j -1 -1 +j -1 +1 -1 +j +j +j -1 -j -j -1 -j +j -j -1 -1 +j -1 -j -j -1 +j -j +j
+1 +1 +1 +j -1 -1 +j +1 -1 +1 -j -j +j -1 -j -j -1 -j +j -j -1 -1 +1 +j -1 -1 +j -1 +1 -1 +j +j +1 +j -1 -1 +j +1 -1 +1 -j -j -j +1
+j +j +1 -j +j -j -1 -1 -1 -j +1 +1 -j +1 -1 +1 -j -j +j -1 -j -j -1 -j +j -j -1 -1 -j +1 +j +j +1 -j +j -j -1 -1 +1 +j -1 -1 +j +1
-1 +1 -j -j -j +1 +j +j +1 +j -j +j +1 +1 +1 +j -1 -1 +j -1 +1 -1 +j +j -j +1 +j +j +1 -j +j -j -1 -1 +1 +j -1 -1 +j +1 -1 +1 -j
-j +j -1 -j -j -1 -j +j -j -1 -1 -1 -j +1 +1 -j +1 -1 +1 -j -j -1 -j +1 +1 -j -1 +1 -1 +j +j +j -1 -j -j -1 +j -j +j +1 +1 -1 -j +1 +1
-j +1 -1 +1 -j -j +j -1 -j -j -1 -j +j -j -1 -1 +j -1 -j -j -1 +j -j +j +1 +1 +1 +j -1 -1 +j +1 -1 +1 -j -j -j +1 +j +j +1 +j -j +j +1
+1 -1 -j +1 +1 -j +1 -1 +1 -j -j +1 +j -1 -1 +j +1 -1 +1 -j -j +j -1 -j -j -1 +j -j +j +1 +1 +1 +j -1 -1 +j -1 +1 -1 +j +j +j -1
-j -j -1 -j +j -j -1 -1 -1 +1 -1 -j The Sequence $Seq^{4}_{right}$, 804(k), to be transmitted from left to right, up to down +1 +j -1 -1 +j -1 -j +1 +1 -j -1 +1 -1 +j +j +1 -1 +1 -j -j +j -1 -j -j -1 -j +1 +j +j +1 -j +j -j -1 -1 +j -j +j +1 +1 +j -1 -j -j
-1 +j -1 -j -j -1 -j +j -j -1 -1 -j +j -j -1 -1 +1 +j -1 -1 +j +1 +j -1 -1 +j -1 +1 -1 +j +j -1 +1 -1 +j +j +j -1 -j -j -1 -j +1 +j +j
+1 +j -j +j +1 +1 -j +j -j -1 -1 +1 +j -1 -1 +j -1 -j +1 +1 -j +1 -1 +1 -j -j -1 +1 -1 +j +j -1 -j +1 +1 -j -1 -j +1 +1 -j -1 +1
-1 +j +j -1 +1 -1 +j +j -j +1 +j +j +1 -j +1 +j +j +1 -j +j -j -1 -1 -j +j -j -1 -1 -j +1 +j +j +1 +j -1 -j -j -1 +j -j +j +1 +1 -j
+j -j -1 -1 +1 +j -1 -1 +j -1 -j +1 +1 -j -1 +1 -1 +j +j +1 -1 +1 -j -j +1 +j -1 -1 +j +1 +j -1 -1 +j -1 +1 -1 +j +j -1 +1 -1 +j
+j -j +1 +j +j +1 -j +1 +j +j +1 +j -j +j +1 +1 +j -j +j +1 +1 +1 +j -1 -1 +j -1 -j +1 +1 -j +1 -1 +1 -j -j -1 +1 -1 +j +j -j +1
+j +j +1 +j -1 -j -j -1 -j +j -j -1 -1 +j -j +j +1 +1 +j -1 -j -j -1 +j -1 -j -j -1 +j -j +j +1 +1 +j -j +j +1 +1 -1 -j +1 +1 -j -1 -j
+1 +1 -j -1 +1 -1 +j +j -1 +1 -1 +j +j -1 -j +1 +1 -j +1 +j -1 -1 +j +1 -1 +1 -j -j -1 +1 -1 +j +j -j +1 +j +j +1 +j -1 -j -j -1
+j -j +j +1 +1 -j +j -j -1 -1 -j +1 +j +j +1 -j +1 +j +j +1 +j -j +j +1 +1 +j -j +j +1 +1 -1 -j +1 +1 -j -1 -j +1 +1 -j +1 -1 +1
-j -j +1 -1 +1 -j -j -j +1 +j +j +1 +j -1 -j -j -1 -j +j -j -1 -1 +j -j +j +1 +1 -1 -j +1 +1 -j +1 +j -1 -1 +j -1 +1 -1 +j +j +1 -1
+1 -j -j +1 +j -1 -1 +j +1 +j -1 -1 +j +1 -1 +1 -j -j +1 -1 +1 -j -j +j -1 -j -j -1 +j -1 -j -j -1 +j -j +j +1 +1 +j -j +j +1 +1 -1
-j +1 +1 -j +1 +j -1 -1 +j +1 -1 +1 -j -j -1 +1 -1 +j +j -j +1 +j +j +1 +j -1 -j -j -1 +j -j +j +1 +1 -j +j -j -1 -1 -j +1 +j +j +1
-j +1 +j +j +1 +j -j +j +1 +1 +j -j +j +1 +1 -1 -j +1 +1 -j -1 -j +1 +1 -j +1 -1 +1 -j -j +1 -1 +1 -j -j -j +1 +j +j +1 +j -1 -j
-j -1 -j +j -j -1 -1 +j -j +j +1 +1 -1 -j +1 +1 -j +1 +j -1 -1 +j -1 +1 -1 +j +j +1 -1 +1 -j -j +1 +j -1 -1 +j +1 +j -1 -1 +j +1 -1
+1 -j -j +1 -1 +1 -j -j +j -1 -j -j -1 +j -1 -j -j -1 +j -j +j +1 +1 +j -j +j +1 +1 -j +1 +j +j +1 +j -1 -j -j -1 +j -j +j +1 +1 -j +j
-j -1 -1 +1 +j -1 -1 +j -1 -j +1 +1 -j -1 +1 -1 +j +j +1 -1 +1 -j -j +1 +j -1 -1 +j +1 +j -1 -1 +j -1 +1 -1 +j +j -1 +1 -1 +j +j
-j +1 +j +j +1 -j +1 +j +j +1 +j -j +j +1 +1 +j -j +j +1 +1 +1 +j -1 -1 +j -1 -j +1 +1 -j +1 -1 +1 -j -j -1 +1 -1 +j +j -j +1 +j
+j +1 +j -1 -j -j -1 -j +j -j -1 -1 +j -j +j +1 +1 +j -1 -j -j -1 +j -1 -j -j -1 +j -j +j +1 +1 +j -j +j +1 +1 -1 -j +1 +1 -j -1 -j
+1 +1 -j -1 +1 -1 +j +j -1 +1 -1 +j +j +1 +1 -1 -j

FIG. 29

| The Sequence $Seq^{5}_{right}$, 804(k), to be transmitted from left to right, up to down |
| --- |
| +1 +1 +j -j +j +1 +1 +j -j +j -1 -1 -j +j -j +1 +1 +j -j +j +j -1 -1 +j +1 +j -1 -1 +j +1 -j +1 +1 -j -1 +j -1 -1 +j +1 +1 +1 +j<br>-j +j -1 -1 -j +j -j -1 -1 -j +j -j -1 -1 -j +j -j -j +1 +1 -j -1 +j -1 -1 +j +1 +j -1 -1 +j +1 +j -1 -1 +j +1 +j +j -1 +1 -1 +j +j -1<br>+1 -1 +j +j -1 +1 -1 -j -j +1 -1 +1 -1 -j -j -1 +j -1 -j -j -1 +j -1 -j -j -1 +j +1 +j +j +1 -j +j +j -1 +1 -1 -j -j +1 -1 +1 +j +j<br>-1 +1 -1 +j +j -1 +1 -1 +1 +j +j +1 -j -1 -j -j -1 +j +1 +j +j +1 -j +1 +j +j +1 -j -j -j +1 -1 +1 -j -j +1 -1 +1 +j +j -1 +1 -1<br>-j -j +1 -1 +1 +1 +j +j +1 -j +1 +j +j +1 -j -1 -j -j -1 +j +1 +j +j +1 -j -j -j +1 -1 +1 +j +j -1 +1 -1 +j +j -1 +1 -1 +j +j -1<br>+1 -1 -1 -j -j -1 +j +1 +j +j +1 -j +1 +j +j +1 -j +1 +j +j +1 -j +1 +1 +j -j +j +1 +1 +j -j +j +1 +1 +j -j +j -1 -1 -j +j -j +j<br>-1 -1 +j +1 +j -1 -1 +j +1 +j -1 -1 +j +1 -j +1 +1 -j -1 +1 +1 +j -j +j -1 -1 -j +j -j +1 +1 +j -j +j +1 +1 +j -j +j -j +1 +1 -j<br>-1 +j -1 -1 +j +1 -j +1 +1 -j -1 -j +1 +1 -j -1 -j -j +1 -1 +1 -j -j +1 -1 +1 +j +j -1 +1 -1 -j -j +1 -1 +1 +1 +j +j +1 -j +1 +j<br>+j +1 -j -1 -j -j -1 +j +1 +j +j +1 -j -j -j +1 -1 +1 +j +j -1 +1 -1 +j +j -1 +1 -1 +j +j -1 +1 -1 -1 -j -j -1 +j +1 +j +j +1 -j +1<br>+j +j +1 -j +1 +j +j +1 -j +1 +1 +j -j +j +1 +1 +j -j +j +1 +1 +j -j +j -1 -1 -j +j -j +j -1 -1 +j +1 +j -1 -1 +j +1 +j -1 -1 +j<br>+1 -j +1 +1 -j -1 +1 +1 +j -j +j -1 -1 -j +j -j +1 +1 +j -j +j +1 +1 +j -j +j -j +1 +1 -j -1 +j -1 -1 +j +1 -j +1 +1 -j -1 -j +1<br>+1 -j -1 +1 +1 +j -j +j +1 +1 +j -j +j -1 -1 -j +j -j +1 +1 +j -j +j +j -1 -1 +j +1 +j -1 -1 +j +1 -j +1 +1 -j -1 +j -1 -1 +j +1<br>+1 +1 +j -j +j -1 -1 -j +j -j -1 -1 -j +j -j -1 -1 -j +j -j -j +1 +1 -j -1 +j -1 -1 +j +1 +j -1 -1 +j +1 +j -1 -1 +j +1 +j +j -1 +1<br>-1 +j +j -1 +1 -1 +j +j -1 +1 -1 -j -j +1 -1 +1 -1 -j -j -1 +j -1 -j -j -1 +j -1 -j -j -1 +j +1 +j +j +1 -j +j +j -1 +1 -1 -j -j +1 -1<br>+1 +j +j -1 +1 -1 +j +j -1 +1 -1 +1 +j +j +1 -j -1 -j -j -1 +j +1 +j +j +1 -j +1 +j +j +1 -j +j +j -1 +1 -1 +j +j -1 +1 -1 -j -j<br>+1 -1 +1 +j +j -1 +1 -1 -1 -j -j -1 +j -1 -j -j -1 +j +1 +j +j +1 -j -1 -j -j -1 +j +j +j -1 +1 -1 -j -j +1 -1 +1 -j -j +1 -1 +1 -j -j<br>+1 -1 +1 +1 +j +j +1 -j -1 -j -j -1 +j -1 -j -j -1 +j -1 -j -j -1 +j -1 -1 -j +j -j -1 -1 -j +j -j -1 -1 -j +j -j +1 +1 +j -j +j -j +1 +1<br>-j -1 -j +1 +1 -j -1 -j +1 +1 -j -1 +j -1 -1 +j +1 -1 -1 -j +j -j +1 +1 +j -j +j -1 -1 -j +j -j -1 -1 -j +j -j +j -1 -1 +j +1 -j +1 +1<br>-j -1 +j -1 -1 +j +1 +j -1 -1 +j +1 +j -1 +1 +1 |

| The Sequence $Seq^{6}_{right}$, 804(k), to be transmitted from left to right, up to down |
| --- |
| -1 -j -j -1 +j +j -1 -1 +j +1 +1 +j +j +1 -j +j -1 -1 +j +1 -j +1 +1 -j -1 -1 -j -j -1 +j +j -1 -1 +j +1 -1 -j -j -1 +j -1 -1 -j +j -j<br>+j +j -1 +1 -1 -1 -1 -j +j -j -j -j +1 -1 +1 -j -j +1 -1 +1 -1 -1 -j +j -j -j -j +1 -1 +1 +1 +1 +j -j +j -j +1 +1 -j -1 +1 +j +j +1<br>-j +j -1 -1 +j +1 +1 +j +j +1 -j -1 -j -j -1 +j -j +1 +1 -j -1 +1 +j +j +1 -j -j +1 +1 -j -1 -j -j +1 -1 +1 +1 +1 +j -j +j -j -j +1<br>-1 +1 -1 -1 -j +j -j -1 -1 -j +j -j -j -j +1 -1 +1 -1 -1 -j +j -j +j +j -1 +1 -1 +j -1 -1 +j +1 +1 +j +j +1 -j -j +1 +1 -j -1 +1 +j<br>+j +1 -j -1 -j -j -1 +j +j -1 -1 +j +1 +1 +j +j +1 -j +j -1 -1 +j +1 +j +j -1 +1 -1 +1 +1 +j -j +j +j +j -1 +1 -1 -1 -1 -j +j -j -<br>1 -1 -j +j -j +j +j -1 +1 -1 -1 -1 -j +j -j -j -j +1 -1 +1 -1 -j -j -1 +j -j +1 +1 -j -1 +1 +j +j +1 -j -j +1 +1 -j -1 +j -1 -1 +j +1<br>-1 -j -j -1 +j -j +1 +1 -j -1 -1 -j -j -1 +j -1 -1 -j +j -j -j -j +1 -1 +1 -1 -1 -j +j -j +j +j -1 +1 -1 +j +j -1 +1 -1 -1 -1 -j +j -j +j<br>+j -1 +1 -1 +1 +1 +j -j +j +j -1 -1 +j +1 +1 +j +j +1 -j -j +1 +1 -j -1 +1 +j +j +1 -j -1 -j -j -1 +j +j -1 -1 +j +1 +1 +j +j +1<br>-j +j -1 -1 +j +1 +j +j -1 +1 -1 +1 +1 +j -j +j +j +j -1 +1 -1 -1 -1 -j +j -j -1 -1 -j +j -j +j +j -1 +1 -1 -1 -1 -j +j -j -j -j +1 -1<br>+1 -1 -j -j -1 +j -j +1 +1 -j -1 +1 +j +j +1 -j -j +1 +1 -j -1 +j -1 -1 +j +1 -1 -j -j -1 +j -j +1 +1 -j -1 -1 -j -j -1 +j -1 -1 -j +j<br>-j -j -j +1 -1 +1 -1 -1 -j +j -j +j +j -1 +1 -1 +j +j -1 +1 -1 -1 -1 -j +j -j +j +j -1 +1 -1 +1 +1 +j -j +j -1 -j -j -1 +j +j -1 -1<br>+j +1 +1 +j +j +1 -j +j -1 -1 +j +1 -j +1 +1 -j -1 -1 -j -j -1 +j +j -1 -1 +j +1 -1 -j -j -1 +j -1 -1 -j +j -j +j +j -1 +1 -1 -1 -1<br>-j +j -j -j -j +1 -1 +1 -j -j +1 -1 +1 -1 -1 -j +j -j -j -j +1 -1 +1 +1 +1 +j -j +j -j +1 +1 -j -1 +1 +j +j +1 -j +j -1 -1 +j +1 +1<br>+j +j +1 -j -1 -j -j -1 +j -j +1 +1 -j -1 +1 +j +j +1 -j -j +1 +1 -j -1 -j -j +1 -1 +1 +1 +1 +j -j +j -j -j +1 -1 +1 -1 -1 -j +j -j<br>-1 -1 -j +j -j -j -j +1 -1 +1 -1 -1 -j +j -j +j +j -1 +1 -1 -j +1 +1 -j -1 -1 -j -j -1 +j +j -1 -1 +j +1 -1 -j -j -1 +j +1 +j +j +1 -j<br>-j +1 +1 -j -1 -1 -j -j -1 +j -j +1 +1 -j -1 -j -j +1 -1 +1 -1 -1 -j +j -j -j -j +1 -1 +1 +1 +1 +j -j +j +1 +1 +j -j +j -j -j +1 -1<br>+1 +1 +1 +j -j +j +j +j -1 +1 -1 +1 +j +j +1 -j +j -1 -1 +j +1 -1 -j -j -1 +j +j -1 -1 +j +1 -j +1 +1 -j -1 +1 +j +j +1 -j +j -1<br>-1 +j +1 +1 +j +j +1 -j +1 +1 +j -j +j +j +j -1 +1 -1 +1 +1 +j -j +j -j -j +1 -1 +1 -j -j +1 -1 +1 +1 +1 +j -j +j -j -j +1 -1 +1<br>-1 -1 -j +j -j -1 -j +1 +1 |

FIG. 30

The Sequence $Seq^{7}_{right}$, 804(k), to be transmitted from left to right, up to down +j +j -1 +1 -1 -j -j +1 -1 +1 -j +1 +1 -j -1 -j +1 +1 -j -1 -1 -1 -j +j -j +1 +1 +j -j +j +1 +j +j +1 -j +1 +j +j +1 -j -1 -1 -j +j
-j +1 +1 +j -j +j +1 +j +j +1 -j +1 +j +j +1 -j +j +j -1 +1 -1 -j -j +1 -1 +1 -j +1 +1 -j -1 -j +1 +1 -j -1 -1 -1 -j +j -j -1 -1 -j
+j -j +1 +j +j +1 -j -1 -j -j -1 +j +j +j -1 +1 -1 +j +j -1 +1 -1 -j +1 +1 -j -1 +j -1 -1 +j +1 -j -j +1 -1 +1 -j -j +1 -1 +1 +j -1
-1 +j +1 -j +1 +1 -j -1 +1 +1 +j -j +j +1 +1 +j -j +j -1 -j -j -1 +j +1 +j +j +1 -j +1 +1 +j -j +j -1 -1 -j +j -j -1 -j -j -1 +j -1
-j -j -1 +j +j +j -1 +1 -1 -j -j +1 -1 +1 -j +1 +1 -j -1 -j +1 +1 -j -1 +j +j -1 +1 -1 -j -j +1 -1 +1 -j +1 +1 -j -1 -j +1 +1 -j -1
+1 +1 +j -j +j -1 -1 -j +j -j -1 -j -j -1 +j -1 -j -j -1 +j +j +j -1 +1 -1 +j +j -1 +1 -1 -j +1 +1 -j -1 +j -1 -1 +j +1 +1 +1 +j -j
+j +1 +1 +j -j +j -1 -j -j -1 +j +1 +j +j +1 -j -1 -1 -j +j -j -1 -1 -j +j -j +1 +j +j +1 -j -1 -j -j -1 +j -j -j +1 -1 +1 -j -j +1 -1
+1 +j -1 -1 +j +1 -j +1 +1 -j -1 -j -j +1 -1 +1 +j +j -1 +1 -1 +j -1 -1 +j +1 +j -1 -1 +j +1 +1 +1 +j -j +j -1 -1 -j +j -j -1 -j
-j -1 +j -1 -j -j -1 +j +1 +1 +j -j +j -1 -1 -j +j -j -1 -j -j -1 +j -1 -j -j -1 +j -j -j +1 -1 +1 +j +j -1 +1 -1 +j -1 -1 +j +1 +j -1
-1 +j +1 +1 +1 +j -j +j +1 +1 +j -j +j -1 -j -j -1 +j +1 +j +j +1 -j -j -j +1 -1 +1 -j -j +1 -1 +1 +j -1 -1 +j +1 -j +1 +1 -j -1
+j +j -1 +1 -1 +j +j -1 +1 -1 -j +1 +1 -j -1 +j -1 -1 +j +1 -1 -1 -j +j -j -1 -1 -j +j -j +1 +j +j +1 -j -1 -j -j -1 +j -j -j +1 -1
+1 +j +j -1 +1 -1 +j -1 -1 +j +1 +j -1 -1 +j +1 +1 +1 +j -j +j -1 -1 -j +j -j -1 -j -j -1 +j -1 -j -j -1 +j +1 +1 +j -j +j -1 -1 -j
+j -j -1 -j -j -1 +j -1 -j -j -1 +j -j -j +1 -1 +1 +j +j -1 +1 -1 +j -1 -1 +j +1 +j -1 -1 +j +1 +1 +1 +j -j +j +1 +1 +j -j +j -1 -j
-j -1 +j +1 +j +j +1 -j -j -j +1 -1 +1 -j -j +1 -1 +1 +j -1 -1 +j +1 -j +1 +1 -j -1 +j +j -1 +1 -1 +j +j -1 +1 -1 -j +1 +1 -j -1
+j -1 -1 +j +1 -1 -1 -j +j -j -1 -1 -j +j -j +1 +j +j +1 -j -1 -j -j -1 +j +1 +1 +j -j +j -1 -1 -j +j -j -1 -j -j -1 +j -1 -j -j -1 +j +j
+j -1 +1 -1 -j -j +1 -1 +1 -j +1 +1 -j -1 -j +1 +1 -j -1 +j +j -1 +1 -1 -j -j +1 -1 +1 -j +1 +1 -j -1 -j +1 +1 -j -1 +1 +1 +j -j
+j -1 -1 -j +j -j -1 -j -j -1 +j -1 -j -j -1 +j +j +j -1 +1 -1 +j +j -1 +1 -1 -j +1 +1 -j -1 +j -1 -1 +j +1 +1 +1 +j -j +j +1 +1 +j
-j +j -1 -j -j -1 +j +1 +j +j +1 -j -1 -1 -j +j -j -1 -1 -j +j -j +1 +j +j +1 -j -1 -j -j -1 +j -j -j +1 -1 +1 -j -j +1 -1 +1 +j -1 -1
+j +1 -j +1 +1 -j -1 +j -j -1 -j The Sequence $Seq^{8}_{right}$, 804(k), to be transmitted from left to right, up to down +1 +1 +j -j +j -j -j +1 -1 +1 +j +j -1 +1 -1 +1 +1 +j -j +j +1 +j +j +1 -j -j +1 +1 -j -1 +j -1 -1 +j +1 +1 +j +j +1 -j +j +j -1
+1 -1 -1 -1 -j +j -j +1 +1 +j -j +j +j +j -1 +1 -1 +j -1 -1 +j +1 -1 -j -j -1 +j +1 +j +j +1 -j +j -1 -1 +j +1 -1 -1 -j +j -j -j -j
+1 -1 +1 -j -j +1 -1 +1 +1 +1 +j -j +j +1 +j +j +1 -j +j -1 -1 +j +1 +j -1 -1 +j +1 -1 -j -j -1 +j -j -j +1 -1 +1 -1 -1 -j +j -j
-1 -1 -j +j -j +j +j -1 +1 -1 +j -1 -1 +j +1 +1 +j +j +1 -j +1 +j +j +1 -j -j +1 +1 -j -1 -j -j +1 -1 +1 -1 -1 -j +j -j +1 +1 +j
-j +j -j -j +1 -1 +1 -j +1 +1 -j -1 -1 -j -j -1 +j +1 +j +j +1 -j -j +1 +1 -j -1 +1 +1 +j -j +j +j +j -1 +1 -1 -j -j +1 -1 +1 +1 +1
+j -j +j +1 +j +j +1 -j +j -1 -1 +j +1 -j +1 +1 -j -1 +1 +j +j +1 -j +j +j -1 +1 -1 -1 -1 -j +j -j -1 -1 -j +j -j -j -j +1 -1 +1 -j
+1 +1 -j -1 +1 +j +j +1 -j +1 +j +j +1 -j +j -1 -1 +j +1 -1 -1 -j +j -j +j +j -1 +1 -1 +j +j -1 +1 -1 +1 +1 +j -j +j +1 +j +j
+1 -j -j +1 +1 -j -1 -j +1 +1 -j -1 -1 -j -j -1 +j -1 -1 -j +j -j +j +j -1 +1 -1 -j -j +1 -1 +1 -1 -1 -j +j -j -1 -j -j -1 +j +j -1 -1
+j +1 -j +1 +1 -j -1 -1 -j -j -1 +j -j -j +1 -1 +1 +1 +1 +j -j +j -1 -1 -j +j -j -j -j +1 -1 +1 -j +1 +1 -j -1 +1 +j +j +1 -j -1 -j
-j -1 +j -j +1 +1 -j -1 +1 +1 +j -j +j +j +j -1 +1 -1 +j +j -1 +1 -1 -1 -1 -j +j -j -1 -j -j -1 +j -j +1 +1 -j -1 -j +1 +1 -j -1 +1
+j +j +1 -j +j +j -1 +1 -1 +1 +1 +j -j +j +1 +1 +j -j +j -j -j +1 -1 +1 -j +1 +1 -j -1 -1 -j -j -1 +j -1 -j -j -1 +j +j -1 -1 +j +1
-1 -1 -j +j -j +j +j -1 +1 -1 -j -j +1 -1 +1 -1 -1 -j +j -j -1 -j -j -1 +j +j -1 -1 +j +1 -j +1 +1 -j -1 -1 -j -j -1 +j -j -j +1 -1 +1
+1 +1 +j -j +j -1 -1 -j +j -j -j -j +1 -1 +1 -j +1 +1 -j -1 +1 +j +j +1 -j -1 -j -j -1 +j -j +1 +1 -j -1 +1 +1 +j -j +j +j +j -1 +1
-1 +j +j -1 +1 -1 -1 -1 -j +j -j -1 -j -j -1 +j -j +1 +1 -j -1 -j +1 +1 -j -1 +1 +j +j +1 -j +j +j -1 +1 -1 +1 +1 +j -j +j +1 +1
+j -j +j -j -j +1 -1 +1 -j +1 +1 -j -1 -1 -j -j -1 +j -1 -j -j -1 +j +j -1 -1 +j +1 -j -j +1 -1 +1 -1 -1 -j +j -j +1 +1 +j -j +j -j -j
+1 -1 +1 -j +1 +1 -j -1 -1 -j -j -1 +j +1 +j +j +1 -j -j +1 +1 -j -1 +1 +1 +j -j +j +j +j -1 +1 -1 -j -j +1 -1 +1 +1 +1 +j -j +j
+1 +j +j +1 -j +j -1 -1 +j +1 -j +1 +1 -j -1 +1 +j +j +1 -j +j +j -1 +1 -1 -1 -1 -j +j -j -1 -1 -j +j -j -j -j +1 -1 +1 -j +1 +1 -j
-1 +1 +j +j +1 -j +1 +j +j +1 -j +j -1 -1 +j +1 -1 -1 -j +j -j +j +j -1 +1 -1 +j +j -1 +1 -1 +1 +1 +j -j +j +1 +j +j +1 -j -j +1
+1 -j -1 -j +1 +1 -j -1 -1 -j -j -1 +j -1 -1 +j -1

METHOD FOR TRANSMITTING AND RECEIVING A SIGNAL BASED ON A CHANNEL AGGREGATION TRANSMISSION IN A WIRELESS LOCAL ACCESS NETWORK SYSTEM AND DEVICES SUPPORTING THE SAME

CROSS-REFERENCE TO RELATED APPLICATIONS

Pursuant to 35 U.S.C. § 119(e), this application claims the benefit of U.S. Provisional Patent Application No. 62/588,934, filed on Nov. 21, 2017, the contents of which are all hereby incorporated by reference herein in their entirety.

BACKGROUND OF THE INVENTION

Field of the Invention

The following description relates to an operation configuration of a station or access point in a wireless LAN (WLAN) system, and more particularly, to a method for transmitting and receiving a signal based on channel aggregation transmission in a station or access point in a WLAN system and devices supporting the same.

Discussion of the Related Art

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

SUMMARY OF THE INVENTION

An object of the present invention is to provide a method for transmitting and receiving signal based on a channel aggregation transmission in a wireless local access network system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention provides a method and devices for transmitting and receiving a signal based on a channel aggregation transmission in a wireless local access network system.

In one aspect of the present invention, a method for transmitting a signal by a first station (STA) to a second STA based on a channel aggregation transmission in a wireless local access network (WLAN) system, comprises generating a training field based on a number of transmit chains per channel, and transmitting the signal comprising the training field to the second STA via aggregated channels. Herein, the number of transmit chains per channel is a half of a total number $N_{TX}$ of transmit chains, and the training field transmitted via first aggregated channel is generated based on a mapping matrix for the number of transmit chains per channel and one or more training basic sequences for space-time stream number 1 to $N_{TX}/2$ and the training field transmitted via second aggregated channel is generated based on the mapping matrix for the number of transmit chains per channel and one or more training basic sequences for space-time stream number $N_{TX}/2+1$ to $N_{TX}$.

In another aspect of the present invention, a method for receiving a signal by a first station (STA) from a second STA based on a channel aggregation transmission in a wireless local access network (WLAN) system, comprises receiving the signal comprising a training field from the second STA via aggregated channels, and performing training operation based on the training field. Herein, the training field is generated based on a number of transmit chains per channel, the number of transmit chains per channel is a half of a total number $N_{TX}$ of transmit chains, and the training field transmitted via first aggregated channel is generated based on a mapping matrix for the number of transmit chains per channel and one or more training basic sequences for space-time stream number 1 to $N_{TX}/2$ and the training field transmitted via second aggregated channel is generated based on the mapping matrix for the number of transmit chains per channel and one or more training basic sequences for space-time stream number $N_{TX}/2+1$ to $N_{TX}$.

In another aspect of the present invention, a communication device for transmitting a signal based on a channel aggregation transmission in a wireless local access network (WLAN) system comprises a memory, and a processor operably coupled to the memory, wherein the processor is configured to generate a training field based on a number of transmit chains per channel, and transmit the signal comprising the training field to a different communication device via aggregated channels. Herein, the number of transmit chains per channel is a half of a total number $N_{TX}$ of transmit chains, and the training field transmitted via first aggregated channel is generated based on a mapping matrix for the number of transmit chains per channel and one or more training basic sequences for space-time stream number 1 to $N_{TX}/2$ and the training field transmitted via second aggregated channel is generated based on the mapping matrix for the number of transmit chains per channel and one or more training basic sequences for space-time stream number $N_{TX}/2+1$ to $N_{TX}$.

In another aspect of the present invention, a communication device for receiving a signal based on a channel aggregation transmission in a wireless local access network (WLAN) system comprises a memory, and a processor operably coupled to the memory, wherein the processor is configured to receive the signal comprising a training field from a different communication device via aggregated channels, and perform training operation based on the training field. Herein, the training field is generated based on a number of transmit chains per channel, the number of transmit chains per channel is a half of a total number $N_{TX}$ of transmit chains, and the training field transmitted via first aggregated channel is generated based on a mapping matrix for the number of transmit chains per channel and one or more training basic sequences for space-time stream number 1 to $N_{TX}/2$ and the training field transmitted via second aggregated channel is generated based on the mapping matrix for the number of transmit chains per channel and one or more training basic sequences for space-time stream number $N_{TX}/2+1$ to $N_{TX}$.

In the present invention, the channel aggregation transmission may be 2.16+2.16 GHz channel aggregation transmission or 4.32+4.32 GHz channel aggregation transmission.

If the channel aggregation transmission is the 2.16+2.16 GHz channel aggregation transmission, the training field, which is generated by the transmitting device, is generated based on one or more training basic sequences having a length of 355.

Or, if the channel aggregation transmission is the 4.32+4.32 GHz channel aggregation transmission, the training field, which is generated by the transmitting device, is generated based on one or more training basic sequences having a length of 773.

In the present invention, if $N_{TX}$ is 2, the training field may be configured like below.

The training field comprises a first training subfield for space-time stream number 1 and a second training subfield for space-time stream number 2. Herein, the first training subfield is transmitted via the first aggregated channel and the second training subfield is transmitted via the second aggregated channel.

And, the first training subfield and the second training subfield satisfy below equation.

OFDM_TRN_subfield_1=[OFDM_TRN_basic_1,−OFDM_TRN_basic_1]

OFDM_TRN_subfield_2=[OFDM_TRN_basic_2,−OFDM_TRN_basic_2] [Equation]

Herein, OFDM_TRN_subfield_N denotes a training subfield for space time stream number N, and OFDM_TRN_basic_N denotes a training basic sequence for space time stream number N.

In the present invention, if $N_{TX}$ is 4, the training field may be configured like below.

The training field comprises a first training subfield for space-time stream number 1, a second training subfield for space-time stream number 2, a third training subfield for space-time stream number 3, and a fourth training subfield for space-time stream number 4. Herein, the first training subfield and the second training subfield are transmitted via the first aggregated channel, and the third training subfield and the fourth training subfield are transmitted via the second aggregated channel.

And, the first training subfield, the second training subfield, the third training subfield, and the fourth training subfield satisfy below equation.

OFDM_TRN_subfield_1=[OFDM_TRN_basic_1,−OFDM_TRN_basic_1]

OFDM_TRN_subfield_2=[OFDM_TRN_basic_2,OFDM_TRN_basic_2]

OFDM_TRN_subfield_3=[OFDM_TRN_basic_3,−OFDM_TRN_basic_3]

OFDM_TRN_subfield_4=[OFDM_TRN_basic_4,OFDM_TRN_basic_4] [Equation]

Herein, OFDM_TRN_subfield_N denotes a training subfield for space time stream number N, and OFDM_TRN_basic_N denotes a training basic sequence for space time stream number N.

In the present invention, if $N_{TX}$ is 6, the training field may be configured like below.

The training field comprises a first training subfield for space-time stream number 1, a second training subfield for space-time stream number 2, a third training subfield for space-time stream number 3, a fourth training subfield for space-time stream number 4, and a fifth training subfield for space-time stream number 5, and a sixth training subfield for space-time stream number 6. Herein, the first training subfield, the second training subfield, and the third training subfield are transmitted via the first aggregated channel, and the fourth training subfield, the fifth training subfield, and the sixth training subfield are transmitted via the second aggregated channel.

And, the first training subfield, the second training subfield, the third training subfield, the fourth training subfield, the fifth training subfield, and the sixth training subfield satisfy below equation.

OFDM_TRN_subfield_1=[OFDM_TRN_basic_1,−OFDM_TRN_basic_1,OFDM_TRN_basic_1]

OFDM_TRN_subfield_2=[OFDM_TRN_basic_2,$-w_3^1$*OFDM_TRN_basic_2,$w_3^2$*OFDM_TRN_basic_2]

OFDM_TRN_subfield_3=[OFDM_TRN_basic_3,$-w_3^3$*OFDM_TRN_basic_3,$w_3^4$*OFDM_TRN_basic_3]

OFDM_TRN_subfield_4=[OFDM_TRN_basic_4,−OFDM_TRN_basic_4,OFDM_TRN_basic_4]

OFDM_TRN_subfield_5=[OFDM_TRN_basic_5,$-w_3^1$*OFDM_TRN_basic_5,$w_3^2$*OFDM_TRN_basic_5]

OFDM_TRN_subfield_6=[OFDM_TRN_basic_6,$-w_3^3$*OFDM_TRN_basic_6,$w_3^4$*OFDM_TRN_basic_6] [Equation]

Herein, OFDM_TRN_subfield_N denotes a training subfield for space time stream number N, OFDM_TRN_basic_N denotes a training basic sequence for space time stream number N, and $w_3$=exp(−j*2*pi/3).

In the present invention, if $N_{TX}$ is 8, the training field may be configured like below.

The training field comprises a first training subfield for space-time stream number 1, a second training subfield for space-time stream number 2, a third training subfield for space-time stream number 3, a fourth training subfield for space-time stream number 4, a fifth training subfield for space-time stream number 5, and a sixth training subfield for space-time stream number 6, a seventh training subfield for space-time stream number 7, and an eighth training subfield for space-time stream number 8. Herein, the first training subfield, the second training subfield, the third training subfield, and the fourth training subfield are transmitted via the first aggregated channel and the fifth training subfield, the sixth training subfield, the seventh training subfield, and the third training subfield are transmitted via the second aggregated channel.

And, the first training subfield, the second training subfield, the third training subfield, the fourth training subfield, the fifth training subfield, the sixth training subfield, the seventh training subfield and the eighth training subfield satisfy below equation.

OFDM_TRN_subfield_1=[OFDM_TRN_basic_1,−OFDM_TRN_basic_1,OFDM_TRN_basic_1,−OFDM_TRN_basic_1]

OFDM_TRN_subfield_2=[OFDM_TRN_basic_2,OFDM_TRN_basic_2,−OFDM_TRN_basic_2,OFDM_TRN_basic_2]

OFDM_TRN_subfield_3=[OFDM_TRN_basic_3,OFDM_TRN_basic_3,OFDM_TRN_basic_3,−OFDM_TRN_basic_3]

OFDM_TRN_subfield_4=[−OFDM_TRN_basic_4,OFDM_TRN_basic_4,OFDM_TRN_basic_4,OFDM_TRN_basic_4]

OFDM_TRN_subfield_5=[OFDM_TRN_basic_5,−OFDM_TRN_basic_5,OFDM_TRN_basic_5,OFDM_TRN_basic_5]

OFDM_TRN_subfield_6=[OFDM_TRN_basic_6,OFDM_TRN_basic_6,−OFDM_TRN_basic_6,OFDM_TRN_basic_6]

OFDM_TRN_subfield_7=[OFDM_TRN_basic_7,OFDM_TRN_basic_7,OFDM_TRN_basic_7,−OFDM_TRN_basic_7]

OFDM_TRN_subfield_8=[−OFDM_TRN_basic_8,OFDM_TRN_basic_8,OFDM_TRN_basic_8,OFDM_TRN_basic_8] [Equation]

Herein, OFDM_TRN_subfield_N denotes a training subfield for space time stream number N, and OFDM_TRN_basic_N denotes a training basic sequence for space time stream number N.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to embodiments of the present invention, when a transmitting device transmits the signal comprising the training field based on the channel aggregation transmission, the transmitting device can reduce signaling overhead for the training field based on the channel aggregation transmission.

Especially, comparing with a non-CA case, the transmitting device reduces a method of OFDM TRN subfield without channel estimation performance degradation.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 is a diagram illustrating $Seq^{iSTS}_{left,\ 176}$ per space-time stream, and FIG. 12 is a diagram illustrating $Seq^{iSTS}_{right,\ 176}$ per space-time stream;

FIGS. 13 and 14 are diagrams illustrating $Seq^{iSTS}_{left,\ 385}$ per space-time stream, and FIGS. 15 and 16 are diagrams illustrating $Seq^{iSTS}_{right,\ 385}$ per space-time stream;

FIGS. 17 to 19 are diagrams illustrating $Seq^{iSTS}_{left,\ 595}$ per space-time stream, and FIGS. 20 to 22 are diagrams illustrating $Seq^{iSTS}_{right,\ 595}$ per space-time stream;

FIGS. 23 to 26 are diagrams illustrating $Seq^{iSTS}_{left,\ 804}$ per space-time stream, and FIGS. 27 to 30 are diagrams illustrating $Seq^{iSTS}_{right,\ 804}$ per space-time stream;

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System

1-1. Generals of WLAN System

Figure 1:
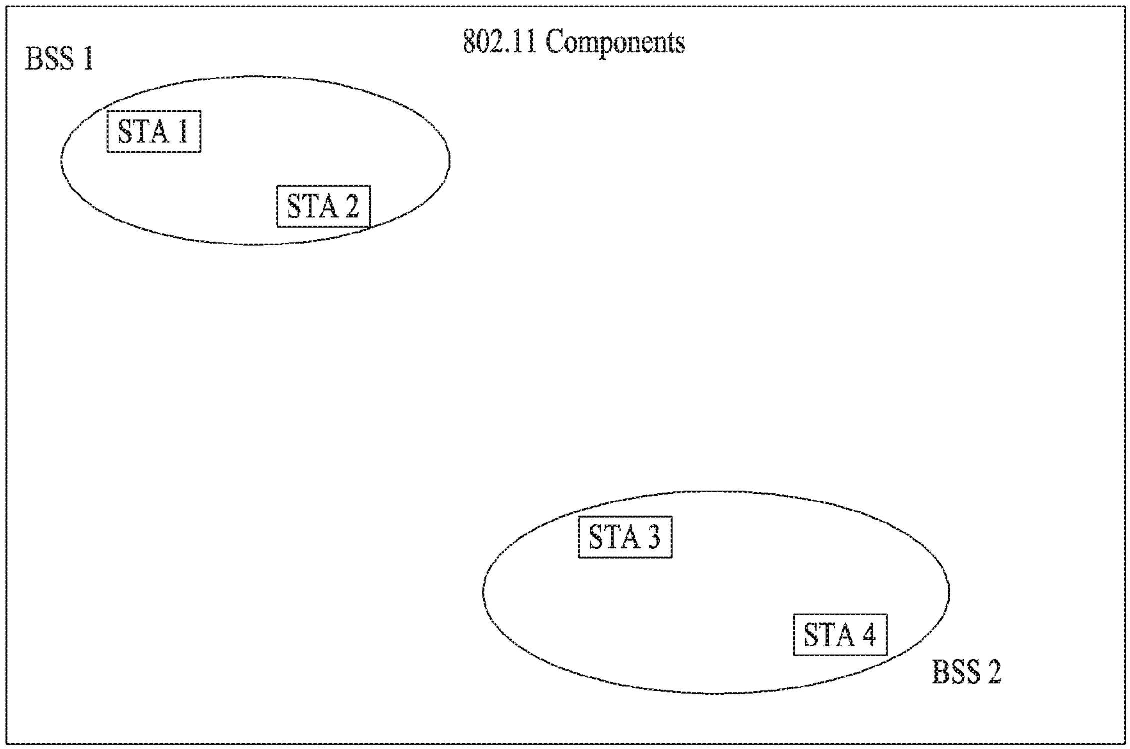
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
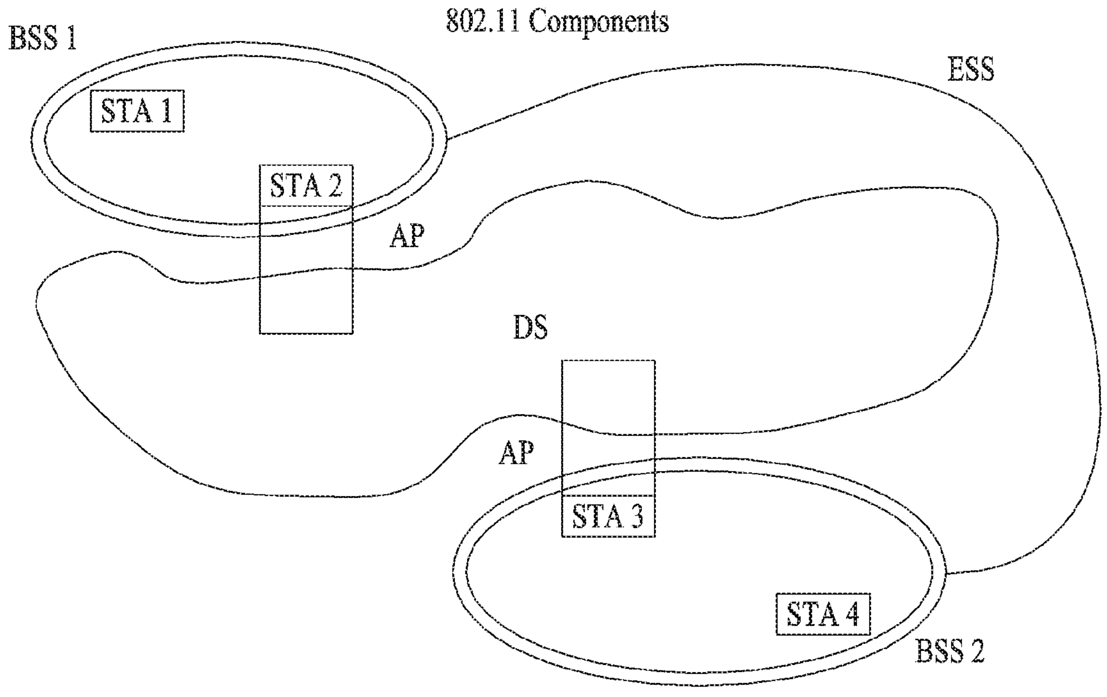
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2 Channel Bonding in WLAN System

Figure 3:
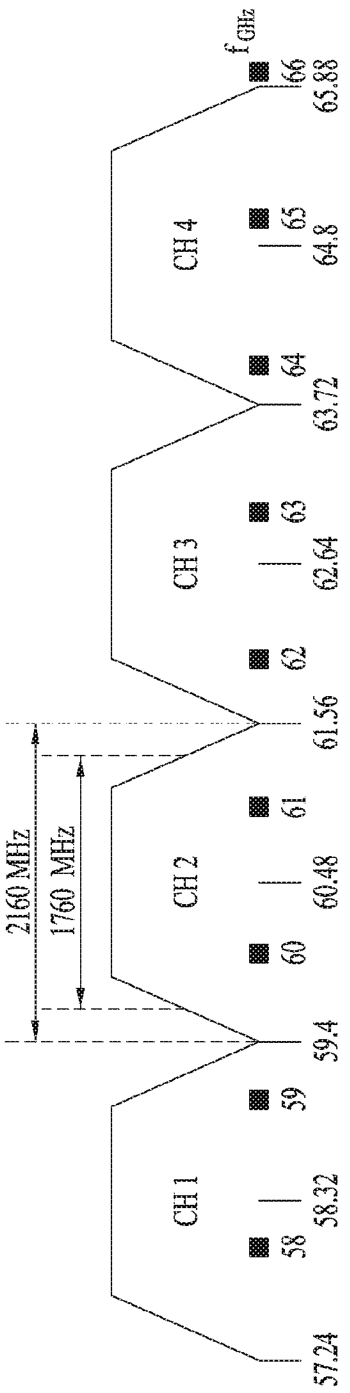
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel Most of the regions, except Australia, may use channels 2 and 3, which may be utilized for channel bonding. However, the channels used for channel bonding may vary, and the present invention is not limited to a specific channel.

Figure 4:
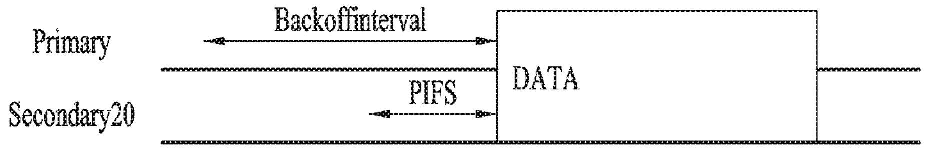
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
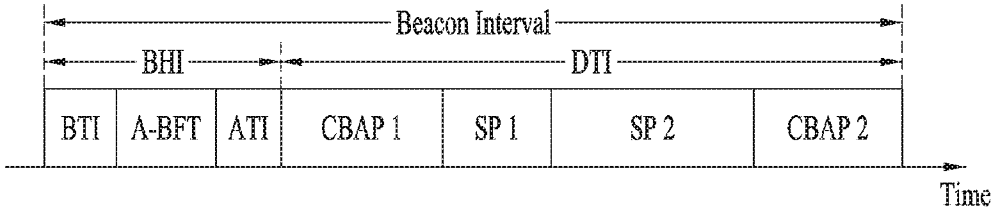
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
|---|---|---|
| Control PHY | 0 | |
| Single carrier PHY | 1 . . . 12 | (low power SC PHY) |
| (SC PHY) | 25 . . . 31 | |
| OFDM PHY | 13 . . . 24 | |

Such modulation modes may be used to satisfy different requirements (e.g., high throughput or stability). Depending on the system, only some of these modes may be supported.

Figure 6:
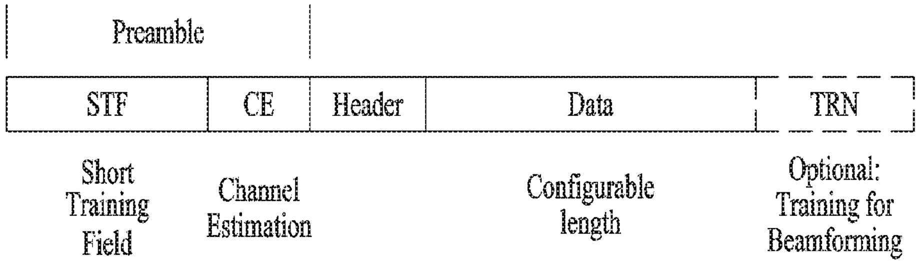
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
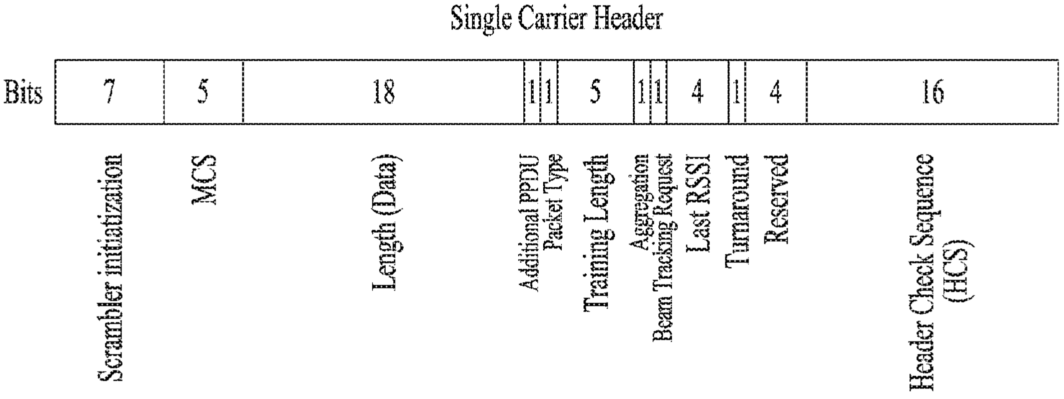
FIGS. 7 and 8 are diagrams illustrating configuration of the header field of the radio frame of FIG. 6.
Figure 8:
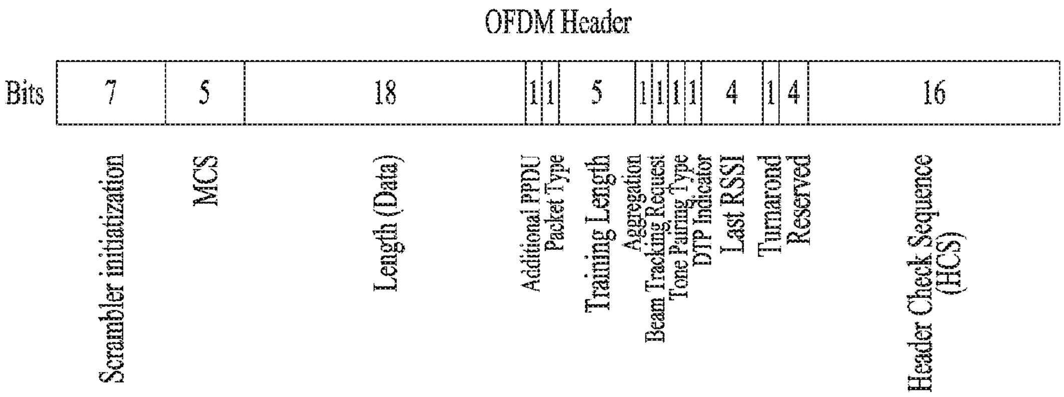

FIGS. 7 and 8 are diagrams illustrating configuration of the header field of the radio frame of FIG. 6.

Specifically, FIG. 7 illustrates a case where an Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam tracking request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam tracking request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

Figure 9:
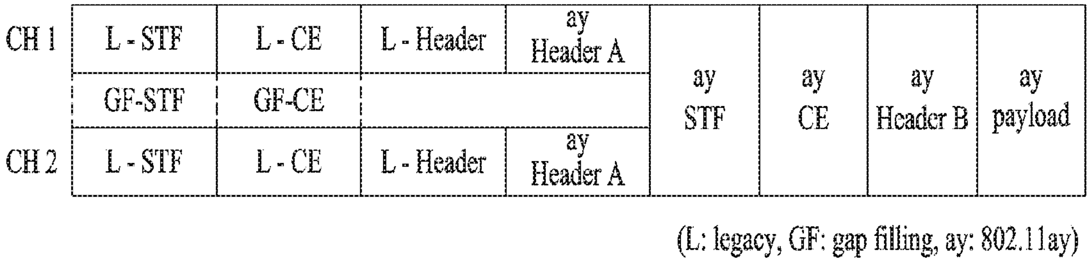
FIG. 9 is a diagram showing a PPDU structure applicable to the present invention.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

Figure 10:
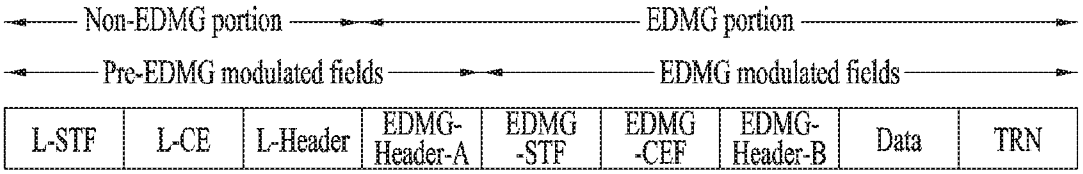
FIG. 10 is a diagram illustrating a PPDU structure applicable to the present invention.

FIG. 10 is a diagram simply illustrating a PPDU structure applicable to the present invention. The aforementioned PPDU format may simply be described with reference to FIG. 10.

As shown in FIG. 10, the PPDU format applicable to an flay system may include L-STF, L-CE, L-Header, EDMG-Header-A, EDMG-STF, EDMG-CEF, EDMG-Header-B, Data, and TRN fields, wherein these fields may selectively be included in the PPDU format in accordance with a format (e.g., SU PPDU, MU PPDU, etc.) of the PPDU.

In this case, a portion that includes and the L-STF, L-CE, and L-header fields may be referred to as a Non-EDMG portion, and the other portions may be referred to as EDMG portions. Also, the L-STF, L-CE, L-Header, and EDMG-Header-A fields may be referred to as pre-EDMG modulated fields, and the other portions may be referred to as EDMG modulated fields.

The (legacy) preamble is the part of the PPDU that is used for packet detection, Automatic Gain Control (AGC), frequency offset estimation, synchronization, indication of modulation (SC or OFDM) and channel estimation. The format of the preamble is common to both OFDM packets and SC packets. The preamble is composed of two parts: the Short Training field and the Channel Estimation field.)

2. OFDM TRN Configuration Applicable to the Present Invention

As described above, the IEEE 802.11 ay system to which the present invention is applicable may support an SC mode and an OFDM mode. At this time, a method for configuring a TRN subfield in an OFDM mode and a method for transmitting and receiving a signal comprising the TRN subfield may be as follows.

In this respect, a TRN subfield structure in an OFDM mode applicable to the present invention will be described in detail.

2.1. TRN Subfield in OFDM Mode 3.1.1. Sequence of OFDM TRN Subfield

According to the present invention, a structure of a TRN subfield (TRN subfield for EDMG OFDM PPDU) for an EMDG OFDM PPDU depends on the number of contiguous 2.16 GHz channels over which an EDMG PPDU is transmitted and the number, $i_{STS}$, of space-time streams.

Sequences $Seq^{i_{STS}}_{left,N}$ and $Seq^{i_{STS}}_{right,N}$ of a length N used for definition of the OFDM TRN subfield are defined in accordance with a value of N as shown in FIGS. 11 to 30. In this case, N may have a value of one of 176, 385, 595 and 804.

FIG. 11 is a diagram illustrating $Seq^{i_{STS}}_{left,\ 176}$ per space-time stream, and FIG. 12 is a diagram illustrating $Seq^{i_{STS}}_{right,\ 176}$ per space-time stream.

FIGS. 13 and 14 are diagrams illustrating $Seq^{i_{STS}}_{left,\ 385}$ per space-time stream, and FIGS. 15 and 16 are diagrams illustrating $Seq^{i_{STS}}_{right,\ 385}$ per space-time stream.

FIGS. 17 to 19 are diagrams illustrating $Seq^{i_{STS}}_{left,\ 595}$ per space-time stream, and FIGS. 20 to 22 are diagrams illustrating $Seq^{i_{STS}}_{right,\ 595}$ per space-time stream.

FIGS. 23 to 26 are diagrams illustrating $Seq^{i_{STS}}_{left,\ 804}$ per space-time stream, and FIGS. 27 to 30 are diagrams illustrating $Seq^{i_{STS}}_{right,\ 804}$ per space-time stream.

At this time, according to one embodiment to which the present invention is applicable, the TRN field (or TRN subfield) of the EDMG OFDM mode may be configured as follows.

For EDMG PPDU transmission which uses the EDMG OFDM mode through 2.16 GHz channel, OFDM TRN_BASIC sequence in a frequency domain for the $i_{TX}$th space-time stream may be defined as expressed by the following Equation. At this time, $Seq^{iTX}_{left,\ 176}$ and $Seq^{iTX}_{right,\ 176}$ may respectively correspond to $Seq^{i_{STS}}_{left,\ 176}$ and $Seq^{i_{STS}}_{right,\ 176}$ of FIGS. 11 and 12.

$$\mathrm{TRN\_BASIC}^{iTX}_{-177,177}=[\mathrm{Seq}^{iTX}_{left,176},0,0,0,\ \mathrm{Seq}^{iTX}_{right,176}],\ \text{for } i_{TX}=1,2,3,4,5,6,7,8 \quad \text{[Equation 1]}$$

For EDMG PPDU transmission which uses the EDMG OFDM mode through 4.32 GHz channel, OFDM TRN_BASIC sequence in a frequency domain for the $i_{TX}$th space-time stream may be defined as expressed by the following Equation. At this time, $Seq^{iTX}_{left,\ 385}$, and $Seq^{iTX}_{right,\ 385}$ may respectively correspond to $Seq^{i_{STS}}_{left,\ 385}$ and $Seq^{i_{STS}}_{right,\ 385}$ of FIGS. 13 to 16.

$$\mathrm{TRN\_BASIC}^{iTX}_{-386,386}=[\mathrm{Seq}^{iTX}_{left,385},0,0,0,\ \mathrm{Seq}^{iTX}_{right,135}],\ \text{for } i_{TX}=1,2,3,4,5,6,7,8 \quad \text{[Equation 2]}$$

For EDMG PPDU transmission which uses the EDMG OFDM mode through 6.48 GHz channel, OFDM TRN_BASIC sequence in a frequency domain for the $i_{TX}$th space-time stream may be defined as expressed by the following Equation. At this time, $Seq^{iTX}_{left,\ 595}$ and $Seq^{iTX}_{right,\ 595}$ may respectively correspond to $Seq^{iTX}_{left,\ 595}$ and $Seq^{i_{STS}}_{right,\ 595}$ of FIGS. 17 to 22.

$$\mathrm{TRN\_BASIC}^{iTX}_{-596,596}=[\mathrm{Seq}^{iTX}_{left,595},0,0,0,\ \mathrm{Seq}^{iTX}_{right,595}],\ \text{for } i_{TX}=1,2,3,4,5,6,7,8 \quad \text{[Equation 3]}$$

For EDMG PPDU transmission which uses the EDMG OFDM mode through 8.64 GHz channel, OFDM TRN_BASIC sequence in a frequency domain for the $i_{TX}$th space-time stream may be defined as expressed by the following Equation. At this time, $Seq^{iTX}_{left,\ 804}$ and $Seq^{iTX}_{right,\ 804}$ may respectively correspond to $Seq^{i_{STS}}_{left,\ 804}$ and $Seq^{i_{STS}}_{right,\ 804}$ of FIGS. 23 to 30.

$$\mathrm{TRN\_BASIC}^{iTX}_{-805,805}=[\mathrm{Seq}^{iTX}_{left,804},0,0,0,\ \mathrm{Seq}^{iTX}_{right,804}],\ \text{for } i_{TX}=1,2,3,4,5,6,7,8 \quad \text{[Equation 4]}$$

If an OFDM sampling rate $F_S=N_{CB}$*2.64 GHz and a sample time length $T_S=1/F_S$ ns, a basic OFDM TRN subfield waveform for the $i_{TX}$ transmission chain (or space-time streams) may be defined as expressed by the following Equation.

$$r^{i_{TX}}_{TRN\_BASIC}(qT_s) = \sum_{n=1}^{N^{N_{TX}}_{TRN}} r^{n,i_{TX}}_{TRN}(qT_s-(n-1)\cdot(T_{DFT}+T_{GI\ long})) \quad \text{[Equation 5]}$$

where:

$$r^{n,i_{TX}}_{TRN}(qT_s) = \frac{1}{\sqrt{N^{Tone}_{TRN}}}w(qT_s)\cdot\sum_{k=-N_{TR}}^{N_{XR}}[P_{TRN}]_{i_{TX}\cdot n}\mathrm{TRN\_BASIC}^{i_{TX}}_{k}\ \exp(j2\pi k\Delta_F(qT_s-T_{GI\ long})),\ 1\le n\le N^{N_{TX}}_{TRN}$$

At this time, a Normal TRN subfield, a Short TRN subfield and a Long TRN subfield according to a value of a TRN Subfield Sequence Length field of the EDMG Header-A field may be defined as expressed by the following Equation.

$$r^{i_{TX}}_{TRN\_NORMAL}(qT_s) = \sum_{n=1}^{2} r^{i_{TX}}_{TRN\_BASIC}(qT_s-(n-1)\cdot T_{BASIC}) \quad \text{[Equation 6]}$$

$$r^{i_{TX}}_{TRN\_SHORT}(qT_s) = r^{i_{TX}}_{TRN\_BASIC}(qT_s)$$

$$r^{i_{TX}}_{TRN\_LONG}(qT_s) = \sum_{n=1}^{4} r^{i_{TX}}_{TRN\_BASIC}(qT_s-(n-1)\cdot T_{BASIC})$$

In the aforementioned Equations, $N_{CB}$ indicates the number of contiguous channels or the number of bonded (or aggregated) channels, and the other parameters may be defined as follows.

$N_{TRN}^{Tone}=N_{ST}-N_{DC}$ is the |total number of active tones [Equation 7]

- $P_{TRN}$ is the TRN mapping matrix (see below)
- $N_{TRN}^{N_{TX}}$ is the number of OFDM symbols in a TRN subfield for the given total number of transmit claims $N_{TX}$ (see below)
- $[\ ]_{m,n}$ is a matrix element from $m^{th}$ row and $n^{th}$ column
- $w(qT_s)$ is window function applied to smooth the transitions between consecutive OFDM symbols; its definition is implementation specific
- q is a time sample index
- $T_{BASIC}$ is the duration of the basic TRN subfield At this time, if Maximum OFDM MCS subfield in PHY capability field is set to greater than 0, a STA shall support 2 repetition of basic TRN subfield. Other repetitions are optional and support is indicated in the STA's EDMG Capabilities element.

Also, in the above configuration, $P_{TPN}$(OFDM TRN mapping matrix) may be defined as expressed by the following Equations in accordance with a value of $N_{TX}$ which is the number of total TX chains.

The OFDM, TRN lmapping matrix for $N_{TX}=1$ is defined as follows:

$$P_{TRN}=[+1\ -1], N_{TRN}^{N_{TX}}=2 \quad \text{[Equation 8]}$$

The OFDM TRN ma wing matrix for $N_{TX}=2$ is defined as follows:

$$P_{TRN}=\begin{bmatrix} +1 & -1 \\ +1 & +1 \end{bmatrix}, N_{TRN}^{N_{TX}}=2 \quad \text{[Equation 9]}$$

The OFDM TRN mapping matrix for $N_{TX}=3$ is defined as follows:

$$P_{TRN}=\begin{bmatrix} +1 & -1 & +1 \\ +1 & -w_3^1 & w_3^2 \\ +1 & -w_3^2 & w_3^4 \end{bmatrix}, w_3=\exp(-j2\pi/3), N_{TRN}^{N_{TX}}=3 \quad \text{[Equation 10]}$$

The OFDM TRN mapping matrix for $N_{TX}=4$ is defined as follows:

$$P_{TRN}=P_{4\times4}=\begin{bmatrix} +1 & -1 & +1 & +1 \\ +1 & +1 & -1 & +1 \\ +1 & +1 & +1 & -1 \\ -1 & +1 & +1 & +1 \end{bmatrix}, N_{TRN}^{N_{TX}}=4 \quad \text{[Equation 11]}$$

The OFDM TRN mapping matrix for $N_{TX}=5$, 6 is defined as follows:

$$P_{TRN}=\begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix}, \quad \text{[Equation 12]}$$

$$w_6=\exp(-j2\pi/6), N_{TRN}^{N_{TX}}=6$$

The OFDM TRN mapping matrix for $N_{TX}=7$, 8 is defined as follows:

$$P_{TRN}=\begin{bmatrix} P_{4\times4} & P_{4\times4} \\ P_{4\times4} & -P_{4\times4} \end{bmatrix}, N_{TRN}^{N_{TX}}=8 \quad \text{[Equation 13]}$$

Figure 31:
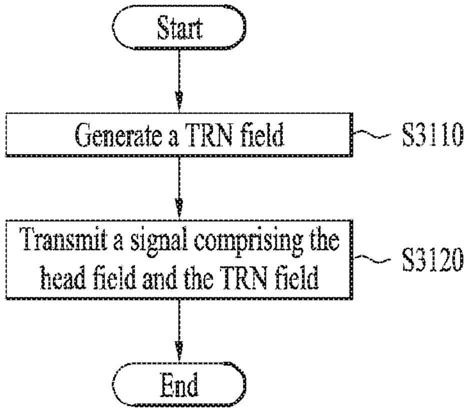
FIG. 31 is a flow chart illustrating a method for transmitting a signal comprising a TRN field by a station applicable to the present invention.

2.2. Method for Transmitting and Receiving a Signal Comprising a TRN Subfield in an OFDM Mode FIG. 31 is a flow chart illustrating a method for transmitting a signal comprising a TRN field, by a station applicable to the present invention.

First of all, a transmitter (e.g., STA) generates a training field included in a signal which is transmitted (S3110).

The transmitter may generate a basic training subfield per space-time stream and a training field, which includes a training subfield per space-time stream, based on the number of total space-time streams. At this time, the basic training subfield per space-time stream may include M OFDM (Orthogonal Frequency Division Multiplexing) symbols (M is a natural number) based on information indicated by a header field.

In more detail, the training field may include a training subfield per space-time stream, wherein the training subfield per space-time stream may be configured using the basic training subfield per space-time stream based on a rule determined in accordance with the number of the total space-time streams.

For example, if the number of the total space-time streams is 1, the training subfield per space-time stream may be configured as follows. In the following description, OFDM_TRN_subfield_N means a training subfield for a space-time stream index N, and OFDM_TRN_basic_N means a basis training subfield for a space-time stream index N.

–OFDM_TRN_subfield_1=[OFDM_TRN_basic_1,–OFDM_TRN_basic_1]

For another example, if the number of the total space-time streams is 2, the training subfield per space-time stream may be configured as follows.

–OFDM_TRN_subfield_1=[OFDM_TRN_basic_1,–OFDM_TRN_basic_1]

–OFDM_TRN_subfield_2=[OFDM_TRN_basic_2,OFDM_TRN_basic_2]

For still another example, if the number of the total space-time streams is 3, the training subfield per space-time stream may be configured as follows. In the following Equation, $w_3$=exp(–j*2*pi/3) may be applied.

–OFDM_TRN_subfield_1=[OFDM_TRN_basic_1,–OFDM_TRN_basic_1,OFDM_TRN_basic_1]

–OFDM_TRN_subfield_2=[OFDM_TRN_basic_2,–$w_3^1$*OFDM_TRN_basic_2,$w_3^2$*OFDM_TRN_basic_2]

–OFDM_TRN_subfield_3=[OFDM_TRN_basic_3,–$w_3^3$*OFDM_TRN_basic_3,$w_3^4$*OFDM_TRN_basic_3]

For further still another example, if the number of the total space-time streams is 4, the training subfield per space-time stream may be configured as follows.

–OFDM_TRN_subfield_1=[OFDM_TRN_basic_1,–OFDM_TRN_basic_1,OFDM_TRN_basic_1,OFDM_TRN_basic_1]

–OFDM_TRN_subfield_2=[OFDM_TRN_basic_2,OFDM_TRN_basic_2,–OFDM_TRN_basic_2,OFDM_TRN_basic_2]

–OFDM_TRN_subfield_3=[OFDM_TRN_basic_3,OFDM_TRN_basic_3,OFDM_TRN_basic_3,–OFDM_TRN_basic_3]

–OFDM_TRN_subfield_4=[–OFDM_TRN_basic_4,OFDM_TRN_basic_4,OFDM_TRN_basic_4,OFDM_TRN_basic_4]

For further still another example, if the number of the total space-time streams is 5, the training subfield per space-time stream may be configured as follows. In the following Equation, $w_6$=exp(–j*2*pi/6) may be applied.

–OFDM_TRN_subfield_1=[OFDM_TRN_basic_1,–OFDM_TRN_basic_1,OFDM_TRN_basic_1,OFDM_TRN_basic_1,OFDM_TRN_basic_1,–OFDM_TRN_basic_1]

–OFDM_TRN_subfield_2=[OFDM_TRN_basic_2,–$w_6^1$*OFDM_TRN_basic_2,$w_6^2$*OFDM_TRN_basic_2,$w_6^3$*OFDM_TRN_basic_2,$w_6^4$*OFDM_TRN_basic_2,–$w_6^5$*OFDM_TRN_basic_2]

–OFDM_TRN_subfield_3=[OFDM_TRN_basic_3,–$w_6^2$*OFDM_TRN_basic_3,$w_6^4$*OFDM_TRN_basic_3,$w_6^6$*OFDM_TRN_basic_3,$w_6^8$*OFDM_TRN_basic_3–$w_6^{10}$*OFDM_TRN_basic_3]

–OFDM_TRN_subfield_4=[OFDM_TRN_basic_4,–$w_6^3$*OFDM_TRN_basic_4,$w_6^6$*OFDM_TRN_basic_4,$w_6^9$*OFDM_TRN_basic_4,$w_6^{12}$*OFDM_TRN_basic_4–$w_6^{15}$*OFDM_TRN_basic_4]

–OFDM_TRN_subfield_5=[OFDM_TRN_basic_5,–$w_6^4$*OFDM_TRN_basic_5,$w_6^8$*OFDM_TRN_basic_5,$w_6^{12}$*OFDM_TRN_basic_5,$w_6^{16}$*OFDM_TRN_basic_5–$w_6^{20}$*OFDM_TRN_basic_5]

For further still another example, if the number of the total space-time streams is 6, the training subfield per space-time stream may be configured as follows.

–OFDM_TRN_subfield_1=[OFDM_TRN_basic_1,–OFDM_TRN_basic_1,OFDM_TRN_basic_1,OFDM_TRN_basic_1,OFDM_TRN_basic_1,–OFDM_TRN_basic_1]

–OFDM_TRN_subfield_2=[OFDM_TRN_basic_2,–$w_6^1$*OFDM_TRN_basic_2,$w_6^2$*OFDM_TRN_basic_2,$w_6^3$*OFDM_TRN_basic_2,$w_6^4$*OFDM_TRN_basic_2,–$w_6^5$*OFDM_TRN_basic_2]

–OFDM_TRN_subfield_3=[OFDM_TRN_basic_3,–$w_6^2$*OFDM_TRN_basic_3,$w_6^4$*OFDM_TRN_basic_3,$w_6^6$*OFDM_TRN_basic_3,$w_6^8$*OFDM_TRN_basic_3–$w_6^{19}$*OFDM_TRN_basic_3]

–OFDM_TRN_subfield_4=[OFDM_TRN_basic_4,–$w_6^3$*OFDM_TRN_basic_4,$w_6^6$*OFDM_TRN_basic_4,$w_6^9$*OFDM_TRN_basic_4,$w_6^{12}$*OFDM_TRN_basic_4–$w_6^{15}$*OFDM_TRN_basic_4]

–OFDM_TRN_subfield_5=[OFDM_TRN_basic_5,–$w_6^4$*OFDM_TRN_basic_5,$w_6^8$*OFDM_TRN_basic_5,$w_6^{12}$*OFDM_TRN_basic_5,$w_6^{16}$*OFDM_TRN_basic_5–$w_6^{29}$*OFDM_TRN_basic_5]

–OFDM_TRN_subfield_6=[OFDM_TRN_basic_6,–$w_6^5$*OFDM_TRN_basic_6,$w_6^{10}$*OFDM_TRN_basic_6,$w_6^{15}$*OFDM_TRN_basic_6,$w_6^{29}$*OFDM_TRN_basic_6–$w_6^{25}$*OFDM_TRN_basic_6]

For further still another example, if the number of the total space-time streams is 7, the training subfield per space-time stream may be configured as follows.

OFDM_TRN_subfield_1=[OFDM_TRN_basic_1,–OFDM_TRN_basic_1,OFDM_TRN_basic_1,OFDM_TRN_basic_1,OFDM_TRN_basic_1,–OFDM_TRN_basic_1,OFDM_TRN_basic_1 OFDM_TRN_basic_1]

–OFDM_TRN_subfield_2=[OFDM_TRN_basic_2,OFDM_TRN_basic_2,–OFDM_TRN_basic_2,OFDM_TRN_basic_2,OFDM_TRN_basic_2,OFDM_TRN_basic_2,–OFDM_TRN_basic_2,OFDM_TRN_basic_2]

–OFDM_TRN_subfield_3=[OFDM_TRN_basic_3,OFDM_TRN_basic_3,OFDM_TRN_basic_3,–OFDM_TRN_basic_3,OFDM_TRN_basic_3,OFDM_TRN_basic_3,OFDM_TRN_basic_3,–OFDM_TRN_basic_3]

–OFDM_TRN_subfield_4=[–OFDM_TRN_basic_4,OFDM_TRN_basic_4,OFDM_TRN_basic_4,OFDM_TRN_basic_4,–OFDM_TRN_basic_4,OFDM_TRN_basic_4,OFDM_TRN_basic_4,OFDM_TRN_basic_4]

–OFDM_TRN_subfield_5=[OFDM_TRN_basic_5,–OFDM_TRN_basic_5,OFDM_TRN_basic_5,OFDM_TRN_basic_5,–OFDM_TRN_basic_5,OFDM_TRN_basic_5,–OFDM_TRN_basic_5,–OFDM_TRN_basic_5]

–OFDM_TRN_subfield_6=[OFDM_TRN_basic_6,OFDM_TRN_basic_6,–OFDM_TRN_basic_6,OFDM_TRN_basic_6,–OFDM_TRN_basic_6,–OFDM_TRN_basic_6,OFDM_TRN_basic_6,–OFDM_TRN_basic_6]

–OFDM_TRN_subfield_7=[OFDM_TRN_basic_7,OFDM_TRN_basic_7,OFDM_TRN_basic_7,–OFDM_TRN_basic_7,–OFDM_TRN_basic_7,–OFDM_TRN_basic_7,–OFDM_TRN_basic_7,OFDM_TRN_basic_7]

For further still another example, if the number of the total space-time streams is 8, the training subfield per space-time stream may be configured as follows.

–OFDM_TRN_subfield_1=[OFDM_TRN_basic_1,–OFDM_TRN_basic_1,OFDM_TRN_basic_1,OFDM_TRN_basic_1,OFDM_TRN_basic_1,–OFDM_TRN_basic_1,OFDM_TRN_basic_1,OFDM_TRN_basic_1]

–OFDM_TRN_subfield_2=[OFDM_TRN_basic_2,OFDM_TRN_basic_2,–OFDM_TRN_basic_2,OFDM_TRN_basic_2,OFDM_TRN_basic_2,OFDM_TRN_basic_2,–OFDM_TRN_basic_2,OFDM_TRN_basic_2]

–OFDM_TRN_subfield_3=[OFDM_TRN_basic_3,OFDM_TRN_basic_3,OFDM_TRN_basic_3,–OFDM_TRN_basic_3,OFDM_TRN_basic_3,OFDM_TRN_basic_3,OFDM_TRN_basic_3,–OFDM_TRN_basic_3]

–OFDM_TRN_subfield_4=[–OFDM_TRN_basic_4,OFDM_TRN_basic_4,OFDM_TRN_basic_4,OFDM_TRN_basic_4,–OFDM_TRN_basic_4,OFDM_TRN_basic_4,OFDM_TRN_basic_4,OFDM_TRN_basic_4]

–OFDM_TRN_subfield_5=[OFDM_TRN_basic_5,–OFDM_TRN_basic_5,OFDM_TRN_basic_5,OFDM_TRN_basic_5,–OFDM_TRN_basic_5,OFDM_TRN_basic_5,–OFDM_TRN_basic_5,–OFDM_TRN_basic_5]

–OFDM_TRN_subfield_6=[OFDM_TRN_basic_6,OFDM_TRN_basic_6,–OFDM_TRN_basic_6,OFDM_TRN_basic_6,–OFDM_TRN_basic_6,–OFDM_TRN_basic_6,OFDM_TRN_basic_6,–OFDM_TRN_basic_6]

–OFDM_TRN_subfield_7=[OFDM_TRN_basic_7,OFDM_TRN_basic_7,OFDM_TRN_basic_7,–

OFDM_TRN_basic_7,−OFDM_TRN_basic_7,−OFDM_TRN_basic_7,−OFDM_TRN_basic_7,OFDM_TRN_basic_7]

−OFDM_TRN_subfield_8=[−OFDM_TRN_basic_8,OFDM_TRN_basic_8,OFDM_TRN_basic_8,OFDM_TRN_basic_8,OFDM_TRN_basic_8,−OFDM_TRN_basic_8,−OFDM_TRN_basic_8,−OFDM_TRN_basic_8]

Also, the basic training subfield per space-time stream may include one, two, or four OFDM symbols based on information indicated by the header field.

At this time, one OFDM symbol included in the one, two, or four OFDM symbols may be configured to include a guard interval which has a length of 72.72 ns or a cyclic prefix (CP).

Also, the header field may include an EDMG (Enhanced Directional Multi Gigabit) training subfield sequence length field indicating an OFDM symbol length of the basic training subfield per space-time stream.

For example, if the EDMG training subfield sequence length field indicates 0, the basic training subfield per space-time stream may include two OFDM symbols, if the EDMG training subfield sequence length field indicates 1, the basic training subfield per space-time stream may include four OFDM symbols, and if the EDMG training subfield sequence length field indicates 2, the basic training subfield per space-time stream may include one 01-DM symbol.

Also, the basic training subfield per space-time stream may include sequences of different lengths in the frequency domain in accordance with the number of contiguous channels to which the signal is transmitted.

For example, if the number of contiguous channels to which the signal is transmitted is 1, the basic training subfield per space-time stream may include a sequence having a length of 355 in the frequency domain. At this time, 512 sized IDFT may be applied to the sequence.

For another example, if the number of contiguous channels to which the signal is transmitted is 2, the basic training subfield per space-time stream may include a sequence having a length of 773 in the frequency domain. At this time, 1024 sized IDFT may be applied to the sequence.

For still another example, if the number of contiguous channels to which the signal is transmitted is 3, the basic training subfield per space-time stream may include a sequence having a length of 596 in the frequency domain. At this time, 1536 sized IDFT may be applied to the sequence.

For still another example, if the number of contiguous channels to which the signal is transmitted is 4, the basic training subfield per space-time stream may include a sequence having a length of 805 in the frequency domain. At this time, 2048 sized IDFT may be applied to the sequence.

Subsequently, the transmitter transmits a signal comprising the training field generated as above and the header field to the receiver through a corresponding space-time stream (S3120).

At this time, if the signal is transmitted through a plurality of channels, the transmitter may transmit the signal through a corresponding space-time stream within the plurality of channels.

Therefore, the receiver first receives the header field included in the signal which is transmitted. Subsequently, the receiver determines the number of OFDM (Orthogonal Frequency Division Multiplexing) symbols of the basic training subfield per space-time stream based on the information indicated by the header field. Subsequently, the receiver the training field, which includes a training subfield per space-time stream configured based on the basic training subfield per space-time stream comprised of the number of total space-time streams and the determined number of OFDM symbols through the corresponding space-time streams.

At this time, the receiver may perform channel measurement in the frequency domain through the training field for a symbol interval for which the training field is transmitted.

The respective training subfields per space-time stream may maintain mutual orthogonal property through the above configuration.

3. Embodiment Suggested in the Present Invention

As described above, the IEEE 802.11 ay system applicable to the present invention may define an OFDM TRN subfield. At this time, the OFDM TRN subfield may be defined based on an OFDM TRN mapping matrix determined by a total number of TX chains ($N_{TX}$).

However, if the above configuration is applied to a channel aggregation (CA) status, a problem may occur in that the OFDM TRN subfield is configured at a length of twice as compared with a non-channel aggregation status. This may cause signaling overhead.

Therefore, in the present invention, a method for reducing signaling overhead by newly defining an OFDM TRN subfield applicable to the CA status will be described in detail. In this case, channel aggregation may be applied to 2.16 GHz+2.16 GHz, 4.32 GHz+4.32 GHz.

In more detail, in case of a channel bonding (CB) status, the number of TX chains per channel is equal to the number of total TX chains. On the other hand, in case of a CA status, the number of TX chains per channel corresponds to a half of the number of total TX chains.

For example, a CB case (2.16 GHz) and a CA case (2.16 GHz+2.16 GHz) will be described respectively.

First of all, in case of the CB case (2.16 GHz), the number of TX chains per channel is 2 equal to the number of total TX chains.

At this time, the TRN subfield is determined based on OFDM TRN mapping matrix $$P_{TRN} = \begin{bmatrix} +1 & -1 \\ +1 & +1 \end{bmatrix}, N_{TRN}^{N_{TX}} = 2.$$

In this regard, the OFDM TRN subfield of the first TX chain is transmitted by being multiplied by [+1 −1].

On the other hand, in case of the CA case (2.16 GHz+2.16 GHz), the number of TX chains per channel is 2, whereas the number of total TX chains is 4. Therefore, according to definition of the aforementioned OFDM TRN subfield, $$P_{TRN} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix},$$

$$N_{TRN}^{N_{TX}} = 4 \text{ not } P_{TRN} = \begin{bmatrix} +1 & -1 \\ +1 & +1 \end{bmatrix}, N_{TRN}^{N_{TX}} = 2$$

should be applied to the OFDM TRN subfield for the CA case (2.16 GHz+2.16 GHz) as an OFDM TRN mapping matrix.

In this case, the OFDM TRN subfield of the first TX chain is transmitted by being multiplied by [+1 −1 +1 +1]. That is, the OFDM TRN subfield transmitted from the first TX chain is comprised of an OFDM TRN subfield twice longer than the CB case (2.16 GHz).

The present invention newly suggests or defines an OFDM TRN mapping matrix applicable to the following CA status due to the above problem.

In more detail, if the number of total TX chains in the CA status is n, the first n/2 TX chain may be mapped into an aggregated channel 1, and the other n/1 TX chain may be mapped into an aggregated channel 2.

For example, if the number of total TX chains is 4, the TX chains 1 and 2 may be mapped into the aggregated channel 1, and the TX chains 3 and 4 are mapped into the aggregated channel 2.

At this time, a different TRN_basic may be mapped into each TX chain mapped into the aggregated channel 1 and the aggregated channel 2.

For example, if the number of total TX chains is 4, TRN_basic1 and TRN_basic2 may be mapped into the aggregated channel 1, and TRN_basic3 and TRN_basic4 may be mapped into the aggregated channel 2.

According to the above rule, the OFDM TRN mapping matrix in the CA status may be defined by one of the following TABLEs.

TABLE 2

| Total number of transmit chain | Transmit chain number | P matrix | |
|---|---|---|---|
| 2 | 1 | $TRN\_BASIC_k^{iTX=1}$ | [1 −1] |
| | 2 | $TRN\_BASIC_k^{iTX=2}$ | [1 −1] |
| 4 | 1<br>2 | $TRN\_BASIC_k^{iTX=1}$<br>$TRN\_BASIC_k^{iTX=2}$ | $\begin{bmatrix} +1 & -1 \\ +1 & +1 \end{bmatrix}$ |
| | 3<br>4 | $TRN\_BASIC_k^{iTX=3}$<br>$TRN\_BASIC_k^{iTX=4}$ | $\begin{bmatrix} +1 & -1 \\ +1 & +1 \end{bmatrix}$ |
| 6 | 1<br>2<br>3 | $TRN\_BASIC_k^{iTX=1}$<br>$TRN\_BASIC_k^{iTX=2}$<br>$TRN\_BASIC_k^{iTX=3}$ | $\begin{bmatrix} +1 & -1 & +1 \\ +1 & -w_3^1 & w_3^2 \\ +1 & -w_3^2 & w_3^4 \end{bmatrix}$, $w_3 = \exp(-j2\pi/3)$ |
| | 4<br>5<br>6 | $TRN\_BASIC_k^{iTX=4}$<br>$TRN\_BASIC_k^{iTX=5}$<br>$TRN\_BASIC_k^{iTX=6}$ | $\begin{bmatrix} +1 & -1 & +1 \\ +1 & -w_3^1 & w_3^2 \\ +1 & -w_3^2 & w_3^4 \end{bmatrix}$, $w_3 = \exp(-j2\pi/3)$ |
| 8 | 1<br>2<br>3<br>4 | $TRN\_BASIC_k^{iTX=1}$<br>$TRN\_BASIC_k^{iTX=2}$<br>$TRN\_BASIC_k^{iTX=3}$<br>$TRN\_BASIC_k^{iTX=4}$ | $\begin{bmatrix} +1 & -1 & +1 & +1 \\ +1 & +1 & -1 & +1 \\ +1 & +1 & +1 & -1 \\ -1 & +1 & +1 & +1 \end{bmatrix}$ |
| | 5<br>6<br>7<br>8 | $TRN\_BASIC_k^{iTX=5}$<br>$TRN\_BASIC_k^{iTX=6}$<br>$TRN\_BASIC_k^{iTX=7}$<br>$TRN\_BASIC_k^{iTX=8}$ | $\begin{bmatrix} +1 & -1 & +1 & +1 \\ +1 & +1 & -1 & +1 \\ +1 & +1 & +1 & -1 \\ -1 & +1 & +1 & +1 \end{bmatrix}$ |

TABLE 3

| Total number of transmit chain | Transmit chain number | P matrix | |
|---|---|---|---|
| 2 | 1<br>2 | $TRN\_BASIC_k^{iTX=1}$<br>$TRN\_BASIC_k^{iTX=2}$ | $\begin{bmatrix} +1 & -1 \\ +1 & +1 \end{bmatrix}$ |
| 4 | 1<br>2<br>3<br>4 | $TRN\_BASIC_k^{iTX=1}$<br>$TRN\_BASIC_k^{iTX=2}$<br>$TRN\_BASIC_k^{iTX=3}$<br>$TRN\_BASIC_k^{iTX=4}$ | $\begin{bmatrix} +1 & -1 \\ +1 & +1 \\ +1 & +1 \\ -1 & +1 \end{bmatrix}$ |
| 6 | 1<br>2<br>3<br>4<br>5<br>6 | $TRN\_BASIC_k^{iTX=1}$<br>$TRN\_BASIC_k^{iTX=2}$<br>$TRN\_BASIC_k^{iTX=3}$<br>$TRN\_BASIC_k^{iTX=4}$<br>$TRN\_BASIC_k^{iTX=5}$<br>$TRN\_BASIC_k^{iTX=6}$ | $\begin{bmatrix} +1 & -1 & +1 \\ +1 & -w_6^1 & w_6^2 \\ +1 & -w_6^2 & w_6^4 \\ +1 & -w_6^3 & w_6^6 \\ +1 & -w_6^4 & w_6^8 \\ +1 & -w_6^5 & w_6^{10} \end{bmatrix}$, $w_6 = \exp(-j2\pi/6)$ |
| 8 | 1<br>2<br>3<br>4<br>5<br>6<br>7<br>8 | $TRN\_BASIC_k^{iTX=1}$<br>$TRN\_BASIC_k^{iTX=2}$<br>$TRN\_BASIC_k^{iTX=3}$<br>$TRN\_BASIC_k^{iTX=4}$<br>$TRN\_BASIC_k^{iTX=5}$<br>$TRN\_BASIC_k^{iTX=6}$<br>$TRN\_BASIC_k^{iTX=7}$<br>$TRN\_BASIC_k^{iTX=8}$ | $\begin{bmatrix} +1 & -1 & +1 & +1 \\ +1 & +1 & -1 & +1 \\ +1 & +1 & +1 & -1 \\ -1 & +1 & +1 & +1 \end{bmatrix}$ |

TABLE 4

| Total number of transmit chain | Transmit chain number | P matrix | |
|---|---|---|---|
| 2 | 1 | $TRN\_BASIC_k^{iTX=1}$ | [1 −1] |
| | 2 | $TRN\_BASIC_k^{iTX=1}$ | [1 −1] |
| 4 | 1<br>2 | $TRN\_BASIC_k^{iTX=1}$<br>$TRN\_BASIC_k^{iTX=2}$ | $\begin{bmatrix} +1 & -1 \\ +1 & +1 \end{bmatrix}$ |
| | 3<br>4 | $TRN\_BASIC_k^{iTX=1}$<br>$TRN\_BASIC_k^{iTX=2}$ | $\begin{bmatrix} +1 & -1 \\ +1 & +1 \end{bmatrix}$ |
| 6 | 1<br>2<br>3 | $TRN\_BASIC_k^{iTX=1}$<br>$TRN\_BASIC_k^{iTX=2}$<br>$TRN\_BASIC_k^{iTX=3}$ | $\begin{bmatrix} +1 & -1 & +1 \\ +1 & -w_3^1 & w_3^2 \\ +1 & -w_3^2 & w_3^4 \end{bmatrix}$, $w_3 = \exp(-j2\pi/3)$ |
| | 4<br>5<br>6 | $TRN\_BASIC_k^{iTX=1}$<br>$TRN\_BASIC_k^{iTX=2}$<br>$TRN\_BASIC_k^{iTX=3}$ | $\begin{bmatrix} +1 & -1 & +1 \\ +1 & -w_3^1 & w_3^2 \\ +1 & -w_3^2 & w_3^4 \end{bmatrix}$, $w_3 = \exp(-j2\pi/3)$ |
| 8 | 1<br>2<br>3<br>4 | $TRN\_BASIC_k^{iTX=1}$<br>$TRN\_BASIC_k^{iTX=2}$<br>$TRN\_BASIC_k^{iTX=3}$<br>$TRN\_BASIC_k^{iTX=4}$ | $\begin{bmatrix} +1 & -1 & +1 & +1 \\ +1 & +1 & -1 & +1 \\ +1 & +1 & +1 & -1 \\ -1 & +1 & +1 & +1 \end{bmatrix}$ |

TABLE 4-continued

| Total number of transmit chain | Transmit chain number | | P matrix |
|---|---|---|---|
| | 5 | $TRN\_BASIC_k^{iTX=1}$ | $\begin{bmatrix} +1 & -1 & +1 & +1 \\ +1 & +1 & -1 & +1 \\ +1 & +1 & +1 & -1 \\ -1 & +1 & +1 & +1 \end{bmatrix}$ |
| | 6 | $TRN\_BASIC_k^{iTX=2}$ | |
| | 7 | $TRN\_BASIC_k^{iTX=3}$ | |
| | 8 | $TRN\_BASIC_k^{iTX=4}$ | |

TABLE 5

| Total number of transmit chain | Transmit chain number | | P matrix |
|---|---|---|---|
| 2 | 1 | $TRN\_BASIC_k^{iTX=1}$ | $\begin{bmatrix} +1 & -1 \\ +1 & +1 \end{bmatrix}$ |
| | 2 | $TRN\_BASIC_k^{iTX=1}$ | |
| 4 | 1 | $TRN\_BASIC_k^{iTX=1}$ | $\begin{bmatrix} +1 & -1 \\ +1 & +1 \\ +1 & +1 \\ -1 & +1 \end{bmatrix}$ |
| | 2 | $TRN\_BASIC_k^{iTX=2}$ | |
| | 3 | $TRN\_BASIC_k^{iTX=1}$ | |
| | 4 | $TRN\_BASIC_k^{iTX=2}$ | |
| 6 | 1 | $TRN\_BASIC_k^{iTX=1}$ | $\begin{bmatrix} +1 & -1 & +1 \\ +1 & -w_6^1 & w_6^2 \\ +1 & -w_6^2 & w_6^4 \\ +1 & -w_6^3 & w_6^6 \\ +1 & -w_6^4 & w_6^8 \\ +1 & -w_6^5 & w_6^{10} \end{bmatrix}$, $w_6 = \exp(-j2\pi/6)$ |
| | 2 | $TRN\_BASIC_k^{iTX=2}$ | |
| | 3 | $TRN\_BASIC_k^{iTX=3}$ | |
| | 4 | $TRN\_BASIC_k^{iTX=1}$ | |
| | 5 | $TRN\_BASIC_k^{iTX=2}$ | |
| | 6 | $TRN\_BASIC_k^{iTX=3}$ | |
| 8 | 1 | $TRN\_BASIC_k^{iTX=1}$ | $\begin{bmatrix} +1 & -1 & +1 & +1 \\ +1 & +1 & -1 & +1 \\ +1 & +1 & +1 & -1 \\ -1 & +1 & +1 & +1 \\ +1 & -1 & +1 & +1 \\ +1 & +1 & -1 & +1 \\ +1 & +1 & +1 & -1 \\ -1 & +1 & +1 & +1 \end{bmatrix}$ |
| | 2 | $TRN\_BASIC_k^{iTX=2}$ | |
| | 3 | $TRN\_BASIC_k^{iTX=3}$ | |
| | 4 | $TRN\_BASIC_k^{iTX=4}$ | |
| | 5 | $TRN\_BASIC_k^{iTX=1}$ | |
| | 6 | $TRN\_BASIC_k^{iTX=2}$ | |
| | 7 | $TRN\_BASIC_k^{iTX=3}$ | |
| | 8 | $TRN\_BASIC_k^{iTX=4}$ | |

According to the OFDM TRN mapping matrix in the CA status as above, overhead may be reduced by reducing a length of the OFDM TRN subfield to a half without channel estimation performance degradation compared with the legacy non-CA.

As one embodiment applicable to the present invention, the OFDM TRN mapping rule for the CA status may be defined as follows.

For 2.16 GHz+2.16 GHz and 4.32 GHz+4.32 GHz PPDU transmission, the OFDM TRN mapping matrix for each channel is determined by the number of transmit chains per channel, which is the half of the total number of transmit chains.

If the number of transmit chains per channel is 1 ($N_{TX}=2$), the OFDM TRN mapping matrix for each channel is defined as follows:

$$P_{TRN}=[+1\ -1], N_{TRN}^{N_{TX}}=2 \quad \text{[Equation 14]}$$

If the number of transmit chains per channel is 2 ($N_{TX}=4$), the OFDM TRN mapping matrix for each channel is defined as follows:

$$P_{TRN} = \begin{bmatrix} +1 & -1 \\ +1 & +1 \end{bmatrix}, N_{TRN}^{N_{TX}} = 2 \quad \text{[Equation 15]}$$

If the number of transmit chains per channel is 3 ($N_{TX}=6$), the OFDM TRN mapping matrix for each channel is defined as follows:

$$P_{TRN} = \begin{bmatrix} +1 & -1 & +1 \\ +1 & -w_3^1 & w_3^2 \\ +1 & -w_3^2 & w_3^4 \end{bmatrix}, \quad \text{[Equation 16]}$$

$$w_3 = \exp(-j2\pi/3), N_{TRN}^{N_{TX}} = 3$$

If the number of transmit chains per channel is 4 ($N_{TX}=8$), the OFDM TRN mapping matrix for each channel is defined as follows:

$$P_{TRN} = P_{4\times 4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix}, N_{TRN}^{N_{TX}} = 4 \quad \text{[Equation 17]}$$

Figure 32:
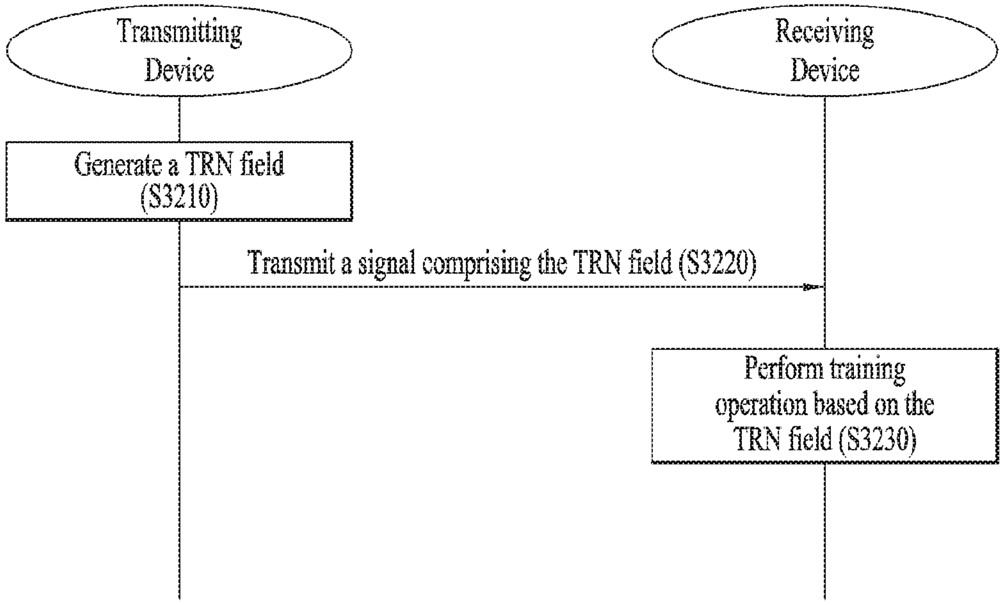
FIG. 32 is a diagram simply illustrating an operation of each of a transmitting device and a reception device according to one embodiment of the present invention.
Figure 33:
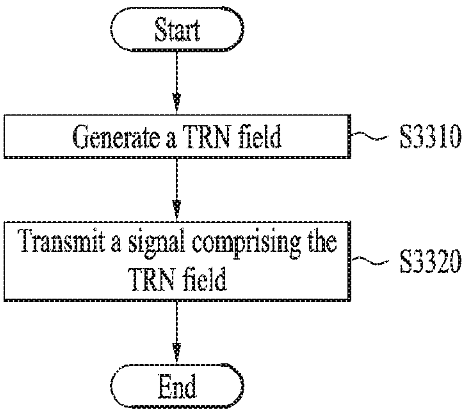
FIG. 33 is a flow chart simply illustrating an operation of a transmitting device according to one embodiment of the present invention.
Figure 34:
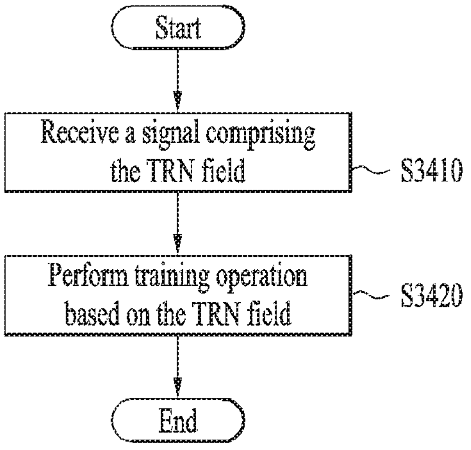
FIG. 34 is a flow chart simply illustrating an operation of a receiving device according to one embodiment of the present invention.

$TRN\_BASIC^{iTX}$ for the first $N_{TX}/2$ transmit chains shall be correspond to the transmit chain number $i_{TX}=1, \ldots, N_{TX}/2$ and $TRN\_BASIC^{iTX}$ for the second $N_{TX}/2$ transmit chains shall be correspond to the transmit chain number $i_{TX}=N_{TX}/2+1, \ldots, N_{TX}$ Sub-Conclusion FIG. 32 is a diagram simply illustrating an operation of each of a transmitting device and a reception device according to one embodiment of the present invention, FIG. 33 is a flow chart simply illustrating an operation of a transmitting device according to one embodiment of the present invention, and FIG. 34 is a flow chart simply illustrating an operation of a receiving device according to one embodiment of the present invention.

As described in FIGS. 32, 33 and 34, the transmitting device (maybe STA or PCP/AP) generates a training field (TRN field) based on a number of transmit chains per channel [S3210 and S3310]. Herein, the number of transmit chains per channel is identical to a half of a total number $N_{TX}$ of transmit chains. And, the training field transmitted via first aggregated channel is generated based on a mapping matrix for the number of transmit chains per channel and one or more training basic sequences for space-time stream number 1 to $N_{TX}/2$ and the training field transmitted via second aggregated channel is generated based on the mapping matrix for the number of transmit chains per channel and one or more training basic sequences for space-time stream number $N_{TX}/2+1$ to $N_{TX}$.

The transmitting device transmits the signal comprising the training field to the receiving device via aggregated channels [S3220 and S3320].

Accordingly, the receiving device (maybe STA or PCP/AP) receives the signal comprising the training field from the transmitting device via aggregated channels [S3410]. And, the receiving device performs training operation based on the training field [S3230 and S3420].

In the present invention, the channel aggregation transmission may be 2.16+2.16 GHz channel aggregation transmission or 4.32+4.32 GHz channel aggregation transmission.

If the channel aggregation transmission is the 2.16+2.16 GHz channel aggregation transmission, the training field, which is generated by the transmitting device, is generated based on one or more training basic sequences having a length of 355.

Or, if the channel aggregation transmission is the 4.32+4.32 GHz channel aggregation transmission, the training field, which is generated by the transmitting device, is generated based on one or more training basic sequences having a length of 773.

In the present invention, if $N_{TX}$ is 2, the training field may be configured like below.

The training field comprises a first training subfield for space-time stream number 1 and a second training subfield for space-time stream number 2. Herein, the first training subfield is transmitted via the first aggregated channel and the second training subfield is transmitted via the second aggregated channel.

And, the first training subfield and the second training subfield satisfy below equation.

OFDM_TRN_subfield_1=[OFDM_TRN_basic_1,−OFDM_TRN_basic_1]

OFDM_TRN_subfield_2=[OFDM_TRN_basic_2,−OFDM_TRN_basic_2] [Equation 18]

Herein, OFDM_TRN_subfield_N denotes a training subfield for space time stream number N, and OFDM_TRN_basic_N denotes a training basic sequence for space time stream number N.

In the present invention, if $N_{TX}$ is 4, the training field may be configured like below.

The training field comprises a first training subfield for space-time stream number 1, a second training subfield for space-time stream number 2, a third training subfield for space-time stream number 3, and a fourth training subfield for space-time stream number 4. Herein, the first training subfield and the second training subfield are transmitted via the first aggregated channel, and the third training subfield and the fourth training subfield are transmitted via the second aggregated channel.

And, the first training subfield, the second training subfield, the third training subfield, and the fourth training subfield satisfy below equation.

OFDM_TRN_subfield_1=[OFDM_TRN_basic_1,−OFDM_TRN_basic_1]

OFDM_TRN_subfield_2=[OFDM_TRN_basic_2,OFDM_TRN_basic_2]

OFDM_TRN_subfield_3=[OFDM_TRN_basic_3,−OFDM_TRN_basic_3]

OFDM_TRN_subfield_4=[OFDM_TRN_basic_4,OFDM_TRN_basic_4] [Equation 19]

Herein, OFDM_TRN_subfield_N denotes a training subfield for space time stream number N, and OFDM_TRN_basic_N denotes a training basic sequence for space time stream number N.

In the present invention, if $N_{TX}$ is 6, the training field may be configured like below.

The training field comprises a first training subfield for space-time stream number 1, a second training subfield for space-time stream number 2, a third training subfield for space-time stream number 3, a fourth training subfield for space-time stream number 4, and a fifth training subfield for space-time stream number 5, and a sixth training subfield for space-time stream number 6. Herein, the first training subfield, the second training subfield, and the third training subfield are transmitted via the first aggregated channel, and the fourth training subfield, the fifth training subfield, and the sixth training subfield are transmitted via the second aggregated channel.

And, the first training subfield, the second training subfield, the third training subfield, the fourth training subfield, the fifth training subfield, and the sixth training subfield satisfy below equation.

OFDM_TRN_subfield_1=[OFDM_TRN_basic_1,−OFDM_TRN_basic_1,OFDM_TRN_basic_1]

OFDM_TRN_subfield_2=[OFDM_TRN_basic_2,−$w_3^1$*OFDM_TRN_basic_2,$w_3^2$*OFDM_TRN_basic_2]

OFDM_TRN_subfield_3=[OFDM_TRN_basic_3,−$w_3^3$*OFDM_TRN_basic_3,$w_3^4$*OFDM_TRN_basic_3]

OFDM_TRN_subfield_4=[OFDM_TRN_basic_4,−OFDM_TRN_basic_4,OFDM_TRN_basic_4]

OFDM_TRN_subfield_5=[OFDM_TRN_basic_5,−$w_3^1$*OFDM_TRN_basic_5,$w_3^2$*OFDM_TRN_basic_5]

OFDM_TRN_subfield_6=[OFDM_TRN_basic_6,−$w_3^3$*OFDM_TRN_basic_6,$w_3^4$*OFDM_TRN_basic_6] [Equation 20]

Herein, OFDM_TRN_subfield_N denotes a training subfield for space time stream number N, OFDM_TRN_basic_N denotes a training basic sequence for space time stream number N, and $w_3$=exp(−j*2*pi/3).

In the present invention, if $N_{TX}$ is 8, the training field may be configured like below.

The training field comprises a first training subfield for space-time stream number 1, a second training subfield for space-time stream number 2, a third training subfield for space-time stream number 3, a fourth training subfield for space-time stream number 4, a fifth training subfield for space-time stream number 5, and a sixth training subfield for space-time stream number 6, a seventh training subfield for space-time stream number 7, and an eighth training subfield for space-time stream number 8. Herein, the first training subfield, the second training subfield, the third training subfield, and the fourth training subfield are transmitted via the first aggregated channel and the fifth training subfield, the sixth training subfield, the seventh training subfield, and the third training subfield are transmitted via the second aggregated channel.

And, the first training subfield, the second training subfield, the third training subfield, the fourth training subfield, the fifth training subfield, the sixth training subfield, the seventh training subfield and the eighth training subfield satisfy below equation.

OFDM_TRN_subfield_1=[OFDM_TRN_basic_1,−OFDM_TRN_basic_1,OFDM_TRN_basic_1,OFDM_TRN_basic_1]

OFDM_TRN_subfield_2=[OFDM_TRN_basic_2,OFDM_TRN_basic_2,−OFDM_TRN_basic_2,OFDM_TRN_basic_2]

OFDM_TRN_subfield_3=[OFDM_TRN_basic_3,OFDM_TRN_basic_3,OFDM_TRN_basic_3,−OFDM_TRN_basic_3]

OFDM_TRN_subfield_4=[−OFDM_TRN_basic_4,OFDM_TRN_basic_4,OFDM_TRN_basic_4,OFDM_TRN_basic_4]

OFDM_TRN_subfield_5=[OFDM_TRN_basic_5,−OFDM_TRN_basic_5,OFDM_TRN_basic_5,OFDM_TRN_basic_5]

OFDM_TRN_subfield_6=[OFDM_TRN_basic_6,OFDM_TRN_basic_6,−OFDM_TRN_basic_6,OFDM_TRN_basic_6]

OFDM_TRN_subfield_7=[OFDM_TRN_basic_7,OFDM_TRN_basic_7,OFDM_TRN_basic_7,−OFDM_TRN_basic_7]

OFDM_TRN_subfield_8=[−OFDM_TRN_basic_8,OFDM_TRN_basic_8,OFDM_TRN_basic_8,OFDM_TRN_basic_8] [Equation 21]

Herein, OFDM_TRN_subfield_N denotes a training subfield for space time stream number N, and OFDM_TRN_basic_N denotes a training basic sequence for space time stream number N.

4. Device Configuration

Figure 35:
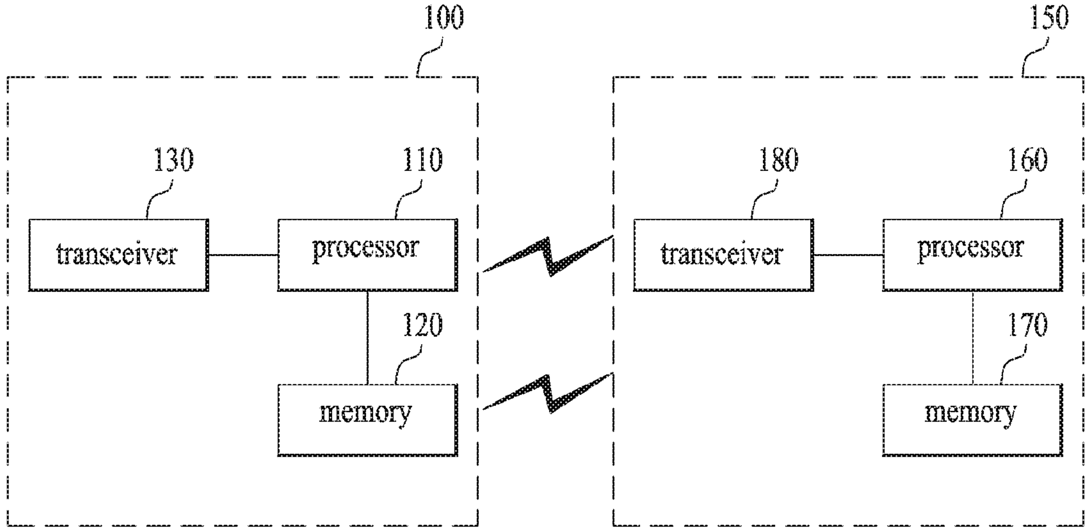
FIG. 35 is a diagram illustrating devices for implementing the above-described method.

FIG. 35 is a diagram illustrating devices for implementing the above-described method.

The wireless device 100 of FIG. 35 may correspond to a transmitting device of the above description, and the wireless device 150 may correspond to the receiving device of the above description.

The transmitting device 100 may include a processor 110, a memory 120 and a transceiver 130. The receiving device 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180 and the memory 120 and 170.

Herein, each of the transmitting device 100 and the receiving device 150 include transceiver 130 and 180 and processor 110 and 160. In this case, the processor is operably connected to the transceiver and the memory. Herein, the memory 120 and 170 may be located inside or outside of the transmitting device 100 and the receiving device 150.

Or, each of the transmitting device 100 and the receiving device 150 include processor 110 and 160 and memory 120 and 170. In this case, the processor is operably connected to the transceiver and the memory. Herein, the transceiver 130 and 180 may be located inside or outside of the transmitting device 100 and the receiving device 150.

In the present invention, the communication device comprises a memory and a processor operably coupled to the memory. Herein, the processor is configured to generate a training field based on a number of transmit chains per channel and transmit the signal comprising the training field to a different communication device via aggregated channels. Herein, the number of transmit chains per channel is a half of a total number $N_{TX}$ of transmit chains, and the training field transmitted via first aggregated channel is generated based on a mapping matrix for the number of transmit chains per channel and one or more training basic sequences for space-time stream number 1 to $N_{TX}/2$ and the training field transmitted via second aggregated channel is generated based on the mapping matrix for the number of transmit chains per channel and one or more training basic sequences for space-time stream number $N_{TX}/2+1$ to $N_{TX}$.

Further, the receiving device comprises a memory and a processor operably coupled to the memory. Herein, the processor is configured to receive the signal comprising a training field from a different communication device via aggregated channels and perform training operation based on the training field. Herein, the training field is generated based on a number of transmit chains per channel, the number of transmit chains per channel is a half of a total number $N_{TX}$ of transmit chains, and the training field transmitted via first aggregated channel is generated based on a mapping matrix for the number of transmit chains per channel and one or more training basic sequences for space-time stream number 1 to $N_{TX}/2$ and the training field transmitted via second aggregated channel is generated based on the mapping matrix for the number of transmit chains per channel and one or more training basic sequences for space-time stream number $N_{TX}/2+1$ to $N_{TX}$.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

What is claimed is:

1. A method for transmitting a signal by a first station (STA) to a second STA based on a channel aggregation transmission in a wireless local access network (WLAN) system, the method comprising:

generating a training field for aggregated channels in which a first channel and a second channel are aggregated, wherein a number of transmit chains for the first channel and a number of transmit chains for the second channel are a half of a total number $N_{TX}$ of transmit chains, wherein the training field transmitted via the first channel is generated based on a first mapping matrix, wherein the first mapping matrix includes training basic sequences for the transmit chains for the first channel, wherein the transmit chains for the first channel is related to space-time stream number 1 to $N_{TX}/2$, wherein the training field transmitted via the second channel is generated based on a second mapping matrix, wherein the second mapping matrix includes training basic sequences for the transmit chains for the second channel, wherein the transmit chains for the second channel is related to space-time stream number $N_{TX}/2+1$ to $N_{TX}$; and transmitting the signal comprising the training field to the second STA via the aggregated channels.

2. The method of claim 1, wherein the channel aggregation transmission is 2.16+2.16 GHz channel aggregation transmission or 4.32+4.32 GHz channel aggregation transmission.

3. The method of claim 2, wherein when the channel aggregation transmission is the 2.16+2.16 GHz channel aggregation transmission, the training field is generated based on one or more training basic sequences having a length of 355.

4. The method of claim 2, wherein when the channel aggregation transmission is the 4.32+4.32 GHz channel aggregation transmission, the training field is generated based on one or more training basic sequences having a length of 773.

5. The method of claim 1, wherein when $N_{TX}$ is 2:

the training field comprises a first training subfield for space-time stream number 1 and a second training subfield for space-time stream number 2, the first training subfield is transmitted via the first channel and the second training subfield is transmitted via the second channel, the first training subfield and the second training subfield satisfy below equation, OFDM_TRN_subfield_1=[OFDM_TRN_basic_1,−OFDM_TRN_basic_1]

OFDM_TRN_subfield_2=[OFDM_TRN_basic_2,−OFDM_TRN_basic_2] [equation]

where, OFDM_TRN_subfield_N denotes a training subfield for space time stream number N, and OFDM_TRN_basic_N denotes a training basic sequence for space time stream number N.

6. The method of claim 1, wherein when $N_{TX}$ is 4:

the training field comprises a first training subfield for space-time stream number 1, a second training subfield for space-time stream number 2, a third training subfield for space-time stream number 3, and a fourth training subfield for space-time stream number 4, the first training subfield and the second training subfield are transmitted via the first channel, and the third training subfield and the fourth training subfield are transmitted via the second channel, the first training subfield, the second training subfield, the third training subfield, and the fourth training subfield satisfy below equation, OFDM_TRN_subfield_1=[OFDM_TRN_basic_1,−OFDM_TRN_basic_1]

OFDM_TRN_subfield_2=[OFDM_TRN_basic_2,OFDM_TRN_basic_2]

OFDM_TRN_subfield_3=[OFDM_TRN_basic_3,−OFDM_TRN_basic_3]

OFDM_TRN_subfield_4=[OFDM_TRN_basic_4,OFDM_TRN_basic_4] [equation]

where, OFDM_TRN_subfield_N denotes a training subfield for space time stream number N, and OFDM_TRN_basic_N denotes a training basic sequence for space time stream number N.

7. The method of claim 1, wherein when $N_{TX}$ is 6:

the training field comprises a first training subfield for space-time stream number 1, a second training subfield for space-time stream number 2, a third training subfield for space-time stream number 3, a fourth training subfield for space-time stream number 4, and a fifth training subfield for space-time stream number 5, and a sixth training subfield for space-time stream number 6, the first training subfield, the second training subfield, and the third training subfield are transmitted via the first channel, and the fourth training subfield, the fifth training subfield, and the sixth training subfield are transmitted via the second channel, the first training subfield, the second training subfield, the third training subfield, the fourth training subfield, the fifth training subfield, and the sixth training subfield satisfy below equation, OFDM_TRN_subfield_1=[OFDM_TRN_basic_1,−OFDM_TRN_basic_1,OFDM_TRN_basic_1]

OFDM_TRN_subfield_2=[OFDM_TRN_basic_2,$-w_3^1$*OFDM_TRN_basic_2,$w_3^2$*OFDM_TRN_basic_2]

OFDM_TRN_subfield_3=[OFDM_TRN_basic_3,$-w_3^3$*OFDM_TRN_basic_3,$w_3^4$*OFDM_TRN_basic_3]

OFDM_TRN_subfield_4=[OFDM_TRN_basic_4,−OFDM_TRN_basic_4,OFDM_TRN_basic_4]

OFDM_TRN_subfield_5=[OFDM_TRN_basic_5,$-w_3^1$*OFDM_TRN_basic_5,$w_3^2$*OFDM_TRN_basic_5]

OFDM_TRN_subfield_6=[OFDM_TRN_basic_6,$-w_3^3$*OFDM_TRN_basic_6,$w_3^4$*OFDM_TRN_basic_6] [equation]

where, OFDM_TRN_subfield_N denotes a training subfield for space time stream number N, OFDM_TRN_basic_N denotes a training basic sequence for space time stream number N, and $w_3$=exp(−j*2*pi/3).

8. The method of claim 1, wherein when $N_{TX}$ is 8:

the training field comprises a first training subfield for space-time stream number 1, a second training subfield for space-time stream number 2, a third training subfield for space-time stream number 3, a fourth training subfield for space-time stream number 4, a fifth training subfield for space-time stream number 5, and a sixth training subfield for space-time stream number 6, a seventh training subfield for space-time stream number 7, and an eighth training subfield for space-time stream number 8, the first training subfield, the second training subfield, the third training subfield, and the fourth training subfield are transmitted via the first channel and the fifth training subfield, the sixth training subfield, the seventh training subfield, and the third training subfield are transmitted via the second channel, the first training subfield, the second training subfield, the third training subfield, the fourth training subfield, the fifth training subfield, the sixth training subfield, the seventh training subfield and the eighth training subfield satisfy below equation, OFDM_TRN_subfield_1=[OFDM_TRN_basic_1,−OFDM_TRN_basic_1,OFDM_TRN_basic_1,OFDM_TRN_basic_1]

OFDM_TRN_subfield_2=[OFDM_TRN_basic_2,OFDM_TRN_basic_2,−OFDM_TRN_basic_2,OFDM_TRN_basic_2]

OFDM_TRN_subfield_3=[OFDM_TRN_basic_3,OFDM_TRN_basic_3,OFDM_TRN_basic_3,−OFDM_TRN_basic_3]

OFDM_TRN_subfield_4=[−OFDM_TRN_basic_4, OFDM_TRN_basic_4,OFDM_TRN_basic_4, OFDM_TRN_basic_4]

OFDM_TRN_subfield_5=[OFDM_TRN_basic_5,−OFDM_TRN_basic_5,OFDM_TRN_basic_5, OFDM_TRN_basic_5]

OFDM_TRN_subfield_6=[OFDM_TRN_basic_6, OFDM_TRN_basic_6,−OFDM_TRN_basic_6, OFDM_TRN_basic_6]

OFDM_TRN_subfield_7=[OFDM_TRN_basic_7, OFDM_TRN_basic_7,OFDM_TRN_basic_7,−OFDM_TRN_basic_7]

OFDM_TRN_subfield_8=[−OFDM_TRN_basic_8, OFDM_TRN_basic_8,OFDM_TRN_basic_8, OFDM_TRN_basic_8] [equation]

where, OFDM_TRN_subfield_N denotes a training subfield for space time stream number N, and OFDM_TRN_basic_N denotes a training basic sequence for space time stream number N.

9. A communication device for transmitting a signal based on a channel aggregation transmission in a wireless local access network (WLAN) system, the communication device comprising:

a memory; and a processor operably coupled to the memory and configured to:

generate a training field for aggregated channels in which a first channel and a second channel are aggregated, wherein a number of transmit chains for the first channel and a number of transmit chains for the second channel are a half of a total number $N_{TX}$ of transmit chains, wherein the training field transmitted via the first channel is generated based on a first mapping matrix, wherein the first mapping matrix includes training basic sequences for the transmit chains for the first channel, wherein the transmit chains for the first channel is related to space-time stream number 1 to $N_{TX}/2$, and wherein the training field transmitted via the second channel is generated based on a second mapping matrix, wherein the second mapping matrix includes training basic sequences for the transmit chains for the second channel, wherein the transmit chains for the second channel is related to space-time stream number $N_{TX}/2+1$ to $N_{TX}$; and transmit the signal comprising the training field to a different communication device via the aggregated channels.

10. The communication device of claim 9, wherein the channel aggregation transmission is 2.16+2.16 GHz channel aggregation transmission or 4.32+4.32 GHz channel aggregation transmission.

11. The communication device of claim 10, wherein when the channel aggregation transmission is the 2.16+2.16 GHz channel aggregation transmission, the training field is generated based on one or more training basic sequences having a length of 355.

12. The communication device of claim 10, wherein when the channel aggregation transmission is the 4.32+4.32 GHz channel aggregation transmission, the training field is generated based on one or more training basic sequences having a length of 773.

13. The communication device of claim 9, wherein when $N_{TX}$ is 2:

the training field comprises a first training subfield for space-time stream number 1 and a second training subfield for space-time stream number 2, the first training subfield is transmitted via the first channel and the second training subfield is transmitted via the second channel, the first training subfield and the second training subfield satisfy below equation, OFDM_TRN_subfield_1=[OFDM_TRN_basic_1,−OFDM_TRN_basic_1]

OFDM_TRN_subfield_2=[OFDM_TRN_basic_2,−OFDM_TRN_basic_2]

where, OFDM_TRN_subfield_N denotes a training subfield for space time stream number N, and OFDM_TRN_basic_N denotes a training basic sequence for space time stream number N.

14. The communication device of claim 9, wherein when $N_{TX}$ is 4:

the training field comprises a first training subfield for space-time stream number 1, a second training subfield for space-time stream number 2, a third training subfield for space-time stream number 3, and a fourth training subfield for space-time stream number 4, the first training subfield and the second training subfield are transmitted via the first channel, and the third training subfield and the fourth training subfield are transmitted via the second channel, the first training subfield, the second training subfield, the third training subfield, and the fourth training subfield satisfy below equation, OFDM_TRN_subfield_1=[OFDM_TRN_basic_1,−OFDM_TRN_basic_1]

OFDM_TRN_subfield_2=[OFDM_TRN_basic_2, OFDM_TRN_basic_2]

OFDM_TRN_subfield_3=[OFDM_TRN_basic_3,−OFDM_TRN_basic_3]

OFDM_TRN_subfield_4=[OFDM_TRN_basic_4, OFDM_TRN_basic_4] [equation]

where, OFDM_TRN_subfield_N denotes a training subfield for space time stream number N, and OFDM_TRN_basic_N denotes a training basic sequence for space time stream number N.

15. The communication device of claim 9, wherein when $N_{TX}$ is 6:

the training field comprises a first training subfield for space-time stream number 1, a second training subfield for space-time stream number 2, a third training subfield for space-time stream number 3, a fourth training subfield for space-time stream number 4, and a fifth training subfield for space-time stream number 5, and a sixth training subfield for space-time stream number 6, the first training subfield, the second training subfield, and the third training subfield are transmitted via the first channel, and the fourth training subfield, the fifth training subfield, and the sixth training subfield are transmitted via the second channel, the first training subfield, the second training subfield, the third training subfield, the fourth training subfield, the fifth training subfield, and the sixth training subfield satisfy below equation, OFDM_TRN_subfield_1=[OFDM_TRN_basic_1,−OFDM_TRN_basic_1,OFDM_TRN_basic_1]

$$\text{OFDM\_TRN\_subfield\_2}=[\text{OFDM\_TRN\_basic\_2}, -w_3^{1}*\text{OFDM\_TRN\_basic\_2}, w_3^{2}*\text{OFDM\_TRN\_basic\_2}]$$

$$\text{OFDM\_TRN\_subfield\_3}=[\text{OFDM\_TRN\_basic\_3}, -w_3^{3}*\text{OFDM\_TRN\_basic\_3}, w_3^{4}*\text{OFDM\_TRN\_basic\_3}]$$

$$\text{OFDM\_TRN\_subfield\_4}=[\text{OFDM\_TRN\_basic\_4}, -\text{OFDM\_TRN\_basic\_4}, \text{OFDM\_TRN\_basic\_4}]$$

$$\text{OFDM\_TRN\_subfield\_5}=[\text{OFDM\_TRN\_basic\_5}, -w_3^{1}*\text{OFDM\_TRN\_basic\_5}, w_3^{2}*\text{OFDM\_TRN\_basic\_5}]$$

$$\text{OFDM\_TRN\_subfield\_6}=[\text{OFDM\_TRN\_basic\_6}, -w_3^{3}*\text{OFDM\_TRN\_basic\_6}, w_3^{4}*\text{OFDM\_TRN\_basic\_6}] \quad \text{[equation]}$$

where, OFDM_TRN_subfield_N denotes a training subfield for space time stream number N, OFDM_TRN_basic_N denotes a training basic sequence for space time stream number N, and $w_3=\exp(-j*2*pi/3)$.

16. The communication device of claim 9, wherein when $N_{TX}$ is 8:

the training field comprises a first training subfield for space-time stream number 1, a second training subfield for space-time stream number 2, a third training subfield for space-time stream number 3, a fourth training subfield for space-time stream number 4, a fifth training subfield for space-time stream number 5, and a sixth training subfield for space-time stream number 6, a seventh training subfield for space-time stream number 7, and an eighth training subfield for space-time stream number 8, the first training subfield, the second training subfield, the third training subfield, and the fourth training subfield are transmitted via the first channel and the fifth training subfield, the sixth training subfield, the seventh training subfield, and the third training subfield are transmitted via the second channel, the first training subfield, the second training subfield, the third training subfield, the fourth training subfield, the fifth training subfield, the sixth training subfield, the seventh training subfield and the eighth training subfield satisfy below equation, $$\text{OFDM\_TRN\_subfield\_1}=[\text{OFDM\_TRN\_basic\_1}, -\text{OFDM\_TRN\_basic\_1}, \text{OFDM\_TRN\_basic\_1}, \text{OFDM\_TRN\_basic\_1}]$$

$$\text{OFDM\_TRN\_subfield\_2}=[\text{OFDM\_TRN\_basic\_2}, \text{OFDM\_TRN\_basic\_2}, -\text{OFDM\_TRN\_basic\_2}, \text{OFDM\_TRN\_basic\_2}]$$

$$\text{OFDM\_TRN\_subfield\_3}=[\text{OFDM\_TRN\_basic\_3}, \text{OFDM\_TRN\_basic\_3}, \text{OFDM\_TRN\_basic\_3}, -\text{OFDM\_TRN\_basic\_3}]$$

$$\text{OFDM\_TRN\_subfield\_4}=[-\text{OFDM\_TRN\_basic\_4}, \text{OFDM\_TRN\_basic\_4}, \text{OFDM\_TRN\_basic\_4}, \text{OFDM\_TRN\_basic\_4}]$$

$$\text{OFDM\_TRN\_subfield\_5}=[\text{OFDM\_TRN\_basic\_5}, -\text{OFDM\_TRN\_basic\_5}, \text{OFDM\_TRN\_basic\_5}, \text{OFDM\_TRN\_basic\_5}]$$

$$\text{OFDM\_TRN\_subfield\_6}=[\text{OFDM\_TRN\_basic\_6}, \text{OFDM\_TRN\_basic\_6}, -\text{OFDM\_TRN\_basic\_6}, \text{OFDM\_TRN\_basic\_6}]$$

$$\text{OFDM\_TRN\_subfield\_7}=[\text{OFDM\_TRN\_basic\_7}, \text{OFDM\_TRN\_basic\_7}, \text{OFDM\_TRN\_basic\_7}, -\text{OFDM\_TRN\_basic\_7}]$$

$$\text{OFDM\_TRN\_subfield\_8}=[-\text{OFDM\_TRN\_basic\_8}, \text{OFDM\_TRN\_basic\_8}, \text{OFDM\_TRN\_basic\_8}, \text{OFDM\_TRN\_basic\_8}] \quad \text{[equation]}$$

where, OFDM_TRN_subfield_N denotes a training subfield for space time stream number N, and OFDM_TRN_basic_N denotes a training basic sequence for space time stream number N.

17. A communication device for receiving a signal based on a channel aggregation transmission in a wireless local access network (WLAN) system, the communication device comprising:

a memory; and a processor operably coupled to the memory and configured to:

receive the signal comprising a training field from a different communication device via aggregated channels in which a first channel and a second channel are aggregated, wherein the training field is generated for the aggregated channels, wherein a number of transmit chains for the first channel and a number of transmit chains for the second channel are a half of a total number $N_{TX}$ of transmit chains, wherein the training field transmitted via the first channel is generated based on a first mapping matrix, wherein the first mapping matrix includes training basic sequences for the transmit chains for the first channel, wherein the transmit chains for the first channel is related to space-time stream number 1 to $N_{TX}/2$, wherein the training field transmitted via the second channel is generated based on a second mapping matrix, wherein the second mapping matrix includes training basic sequences for the transmit chains for the second channel, wherein the transmit chains for the second channel is related to space-time stream number $N_{TX}/2+1$ to $N_{TX}$; and perform training operation based on the training field.

* * * * *